(12) United States Patent
Fujisaki

(10) Patent No.: US 8,241,128 B1
(45) Date of Patent: Aug. 14, 2012

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 987 days.

(21) Appl. No.: 11/539,615

(22) Filed: Oct. 6, 2006

Related U.S. Application Data

(63) Continuation of application No. 10/708,285, filed on Feb. 23, 2004, now abandoned.

(60) Provisional application No. 60/461,033, filed on Apr. 3, 2003.

(51) Int. Cl.
*A63F 13/00* (2006.01)

(52) U.S. Cl. ............................................ 463/40; 463/42

(58) Field of Classification Search ............. 463/40–42; 455/90.3; 273/148 B; 705/26
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A * | 4/1995 | Katanics et al. | 463/2 |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |
| 5,530,472 A | 6/1996 | Bregman et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,550,754 A | 8/1996 | McNelley et al. | |
| 5,559,554 A | 9/1996 | Uekane et al. | |
| 5,625,675 A | 4/1997 | Katsumaru et al. | |
| 5,629,741 A | 5/1997 | Hopper | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,758,280 A | 5/1998 | Kimura | |
| 5,772,586 A | 6/1998 | Heinonen et al. | |
| 5,778,304 A | 7/1998 | Grube et al. | |
| 5,786,846 A | 7/1998 | Hiroaki | |

(Continued)

FOREIGN PATENT DOCUMENTS
JP  H11/195137 A1  7/1999

(Continued)

OTHER PUBLICATIONS

Gamespot, "Super Mario Bros. 3", Feb 12, 1990, <http://www.gamespot.com/nes/action/supermariobros3/index.html?tag=tabs%3Bsummary>.*

(Continued)

*Primary Examiner* — Paul A. D'Agostino
*Assistant Examiner* — Ankit Doshi

(57) ABSTRACT

A video game device which has a mobile phone functionality, wherein a game vibrator which is activated when the game object entering detector identifies that the user controlled game object enters a certain two-dimensional area by identifying the locations of the user controlled game object and the certain two-dimensional area in the computer-generated three-dimensional virtual space is also activated when receiving a phone call.

3 Claims, 1 Drawing Sheet

U.S. PATENT DOCUMENTS

| | | |
|---|---|---|
| 5,802,460 A | 9/1998 | Parvulescu et al. |
| 5,805,672 A | 9/1998 | Barkat et al. |
| 5,812,930 A | 9/1998 | Zavrel |
| 5,825,408 A | 10/1998 | Yuyama et al. |
| 5,844,824 A | 12/1998 | Newman et al. |
| 5,902,349 A | 5/1999 | Endo et al. |
| 5,903,706 A | 5/1999 | Wakabayashi et al. |
| 5,916,024 A * | 6/1999 | Von Kohorn .............. 463/40 |
| 5,918,180 A | 6/1999 | Dimino |
| 5,959,661 A | 9/1999 | Isono |
| 6,009,336 A | 12/1999 | Harris et al. |
| 6,011,973 A | 1/2000 | Valentine et al. |
| 6,034,715 A | 3/2000 | Ishida et al. |
| 6,043,752 A | 3/2000 | Hisada et al. |
| 6,069,648 A | 5/2000 | Suso et al. |
| 6,073,034 A | 6/2000 | Jacobsen et al. |
| 6,081,265 A | 6/2000 | Nakayama et al. |
| 6,115,597 A | 9/2000 | Kroll et al. |
| 6,128,594 A | 10/2000 | Gulli et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,222,482 B1 | 4/2001 | Gueziec |
| 6,223,029 B1 | 4/2001 | Stenman et al. |
| 6,225,944 B1 | 5/2001 | Hayes |
| 6,236,832 B1 | 5/2001 | Ito |
| 6,243,039 B1 | 6/2001 | Elliot |
| 6,249,720 B1 | 6/2001 | Kubota et al. |
| 6,253,075 B1 | 6/2001 | Beghtol et al. |
| 6,265,988 B1 | 7/2001 | LeMense et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,292,747 B1 | 9/2001 | Amro et al. |
| 6,311,011 B1 | 10/2001 | Kuroda |
| 6,311,077 B1 | 10/2001 | Bien |
| 6,332,122 B1 | 12/2001 | Ortega et al. |
| 6,333,684 B1 | 12/2001 | Kang |
| 6,363,320 B1 | 3/2002 | Chou |
| 6,366,651 B1 | 4/2002 | Griffith et al. |
| 6,366,782 B1 | 4/2002 | Fumarolo et al. |
| 6,374,221 B1 | 4/2002 | Haimi-Cohen |
| 6,385,465 B1 | 5/2002 | Yoshioka |
| 6,385,466 B1 | 5/2002 | Hirai et al. |
| 6,385,541 B1 | 5/2002 | Blumberg et al. |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,411,822 B1 | 6/2002 | Kraft |
| 6,415,138 B2 | 7/2002 | Sirola et al. |
| 6,421,470 B1 | 7/2002 | Nozaki et al. |
| 6,421,602 B1 | 7/2002 | Bullock et al. |
| 6,430,498 B1 | 8/2002 | Maruyama et al. |
| 6,438,380 B1 | 8/2002 | Bi et al. |
| 6,442,404 B1 | 8/2002 | Sakajiri |
| 6,445,802 B1 | 9/2002 | Dan |
| 6,477,387 B1 | 11/2002 | Jackson et al. |
| 6,486,867 B1 | 11/2002 | Kopp et al. |
| 6,487,422 B1 | 11/2002 | Lee |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,529,742 B1 | 3/2003 | Yang |
| 6,532,035 B1 | 3/2003 | Saari et al. |
| 6,538,558 B2 | 3/2003 | Sakazume et al. |
| 6,542,750 B2 | 4/2003 | Hendrey et al. |
| 6,542,814 B2 | 4/2003 | Polidi et al. |
| 6,549,215 B2 | 4/2003 | Jouppi |
| 6,553,309 B2 | 4/2003 | Uchida et al. |
| 6,553,310 B1 | 4/2003 | Lopke |
| 6,567,745 B2 | 5/2003 | Fuchs et al. |
| 6,567,984 B1 | 5/2003 | Allport |
| 6,600,975 B2 | 7/2003 | Moriguchi et al. |
| 6,606,504 B1 | 8/2003 | Mooney et al. |
| 6,611,753 B1 | 8/2003 | Millington |
| 6,615,186 B1 | 9/2003 | Kolls |
| 6,618,704 B2 | 9/2003 | Kanevsky et al. |
| 6,622,018 B1 | 9/2003 | Erekson |
| 6,630,958 B2 | 10/2003 | Tanaka et al. |
| 6,631,271 B1 | 10/2003 | Logan |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,681,120 B1 | 1/2004 | Kim |
| 6,687,515 B1 | 2/2004 | Kosaka |
| 6,690,932 B1 | 2/2004 | Barnier et al. |
| 6,701,148 B1 | 3/2004 | Wilson et al. |
| 6,707,942 B1 | 3/2004 | Cortopassi et al. |
| 6,725,022 B1 | 4/2004 | Clayton et al. |
| 6,728,531 B1 | 4/2004 | Lee et al. |
| 6,738,643 B1 | 5/2004 | Harris |
| 6,738,711 B2 | 5/2004 | Ohmura et al. |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,819,939 B2 | 11/2004 | Masamura |
| 6,820,055 B2 | 11/2004 | Saindon et al. |
| 6,836,654 B2 | 12/2004 | Decotignie |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,256 B2 | 5/2005 | Harma et al. |
| 6,895,259 B1 | 5/2005 | Blank nee Keller et al. |
| 6,898,321 B1 | 5/2005 | Knee et al. |
| 6,898,765 B2 | 5/2005 | Matthews, III et al. |
| 6,901,383 B1 | 5/2005 | Ricketts et al. |
| 6,904,298 B2 | 6/2005 | Arai et al. |
| 6,912,544 B1 | 6/2005 | Weiner |
| 6,922,212 B2 | 7/2005 | Nakakubo et al. |
| 6,922,630 B2 | 7/2005 | Maruyama et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,968,184 B2 | 11/2005 | Criss et al. |
| 6,968,206 B1 | 11/2005 | Whitsey-Anderson |
| 6,970,178 B2 | 11/2005 | Tanioka et al. |
| 6,970,703 B2 | 11/2005 | Fuchs et al. |
| 6,992,699 B1 | 1/2006 | Vance et al. |
| 6,999,757 B2 | 2/2006 | Bates et al. |
| 6,999,802 B2 | 2/2006 | Kim |
| 7,003,598 B2 | 2/2006 | Kavanagh |
| 7,007,239 B1 | 2/2006 | Hawkins et al. |
| 7,012,999 B2 | 3/2006 | Ruckart |
| 7,019,770 B1 | 3/2006 | Katz |
| 7,028,077 B2 | 4/2006 | Toshimitsu et al. |
| 7,030,880 B2 | 4/2006 | Tanioka et al. |
| 7,035,666 B2 | 4/2006 | Silberfenig |
| 7,058,356 B2 | 6/2006 | Slotznick |
| 7,076,052 B2 | 7/2006 | Yoshimura |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |

| | | | | | |
|---|---|---|---|---|---|
| 7,117,152 B1 | 10/2006 | Mukherji et al. | 2002/0120589 A1 | 8/2002 | Aoki |
| 7,117,504 B2 | 10/2006 | Smith et al. | 2002/0120718 A1 | 8/2002 | Lee |
| 7,126,951 B2 | 10/2006 | Belcea et al. | 2002/0123336 A1 | 9/2002 | Kamada |
| 7,127,271 B1 | 10/2006 | Fujisaki | 2002/0127997 A1 | 9/2002 | Karlstedt et al. |
| 7,130,630 B1 | 10/2006 | Enzmann et al. | 2002/0128000 A1 | 9/2002 | do Nascimento |
| 7,142,890 B2 | 11/2006 | Irimajiri et al. | 2002/0133342 A1 | 9/2002 | McKenna |
| 7,190,880 B2 | 3/2007 | Cookson et al. | 2002/0137470 A1 | 9/2002 | Baron et al. |
| 7,218,916 B2 | 5/2007 | Nonami | 2002/0137503 A1 | 9/2002 | Roderique |
| 7,224,851 B2 | 5/2007 | Kinjo | 2002/0137526 A1 | 9/2002 | Shinohara |
| 7,224,987 B1 | 5/2007 | Bhela et al. | 2002/0141086 A1 | 10/2002 | Lang et al. |
| 7,233,781 B2 | 6/2007 | Hunter et al. | 2002/0142763 A1 | 10/2002 | Kolsky |
| 7,233,795 B1 | 6/2007 | Ryden | 2002/0147645 A1 | 10/2002 | Alao et al. |
| 7,239,742 B2 | 7/2007 | Ohtani et al. | 2002/0151326 A1 | 10/2002 | Awada et al. |
| 7,251,255 B1 | 7/2007 | Young | 2002/0151327 A1 | 10/2002 | Levitt |
| 7,260,416 B2 | 8/2007 | Shippee | 2002/0154632 A1 | 10/2002 | Wang et al. |
| 7,266,186 B1 | 9/2007 | Henderson | 2002/0157101 A1 | 10/2002 | Schrader et al. |
| 7,274,952 B2 | 9/2007 | Hayashi | 2002/0164996 A1 | 11/2002 | Dorenbosch |
| 7,277,711 B2 | 10/2007 | Nyu | 2002/0165850 A1 | 11/2002 | Roberts et al. |
| 7,321,783 B2 | 1/2008 | Kim | 2002/0168959 A1 | 11/2002 | Noguchi et al. |
| 7,346,373 B2 | 3/2008 | Kim | 2002/0173344 A1 | 11/2002 | Cupps et al. |
| 7,426,264 B2 | 9/2008 | Henderson | 2002/0177407 A1 | 11/2002 | Mitsumoto |
| 7,433,845 B1 | 10/2008 | Flitcroft et al. | 2002/0178009 A1 | 11/2002 | Firman |
| 7,444,168 B2 | 10/2008 | Nakagawa et al. | 2002/0178225 A1 | 11/2002 | Madenberg et al. |
| 7,450,709 B2 | 11/2008 | Gonzalez et al. | 2002/0183045 A1 | 12/2002 | Emmerson et al. |
| 7,489,768 B1 | 2/2009 | Strietzel | 2002/0191951 A1 | 12/2002 | Sodeyama et al. |
| 7,551,899 B1 | 6/2009 | Nicolas et al. | 2002/0196378 A1 | 12/2002 | Slobodin et al. |
| 7,707,602 B2 | 4/2010 | Cragun et al. | 2002/0198813 A1 | 12/2002 | Patterson et al. |
| 7,787,887 B2 | 8/2010 | Gupta et al. | 2002/0198936 A1 | 12/2002 | McIntyre et al. |
| 7,853,295 B1 | 12/2010 | Fujisaki | 2003/0003967 A1 | 1/2003 | Ito |
| 2001/0000249 A1 | 4/2001 | Oba et al. | 2003/0006879 A1 | 1/2003 | Kang et al. |
| 2001/0005826 A1 | 6/2001 | Shibuya | 2003/0007556 A1 | 1/2003 | Oura et al. |
| 2001/0011293 A1 | 8/2001 | Murakami et al. | 2003/0013483 A1* | 1/2003 | Ausems et al. ............... 455/556 |
| 2001/0029425 A1 | 10/2001 | Myr | 2003/0014286 A1 | 1/2003 | Cappellini |
| 2001/0035829 A1 | 11/2001 | Yu et al. | 2003/0016189 A1 | 1/2003 | Abe et al. |
| 2001/0037191 A1 | 11/2001 | Furuta et al. | 2003/0017857 A1 | 1/2003 | Kitson et al. |
| 2001/0041590 A1 | 11/2001 | Silberfenig et al. | 2003/0018744 A1 | 1/2003 | Johanson et al. |
| 2001/0048364 A1 | 12/2001 | Kalthoff et al. | 2003/0018748 A1 | 1/2003 | McKenna, Jr. |
| 2001/0049470 A1 | 12/2001 | Mault et al. | 2003/0032389 A1 | 2/2003 | Kim et al. |
| 2002/0002044 A1 | 1/2002 | Naruse et al. | 2003/0032406 A1 | 2/2003 | Minear et al. |
| 2002/0002705 A1 | 1/2002 | Byrnes et al. | 2003/0033214 A1* | 2/2003 | Mikkelsen et al. ............. 705/26 |
| 2002/0004701 A1 | 1/2002 | Nakano | 2003/0038800 A1* | 2/2003 | Kawahara ..................... 345/420 |
| 2002/0006804 A1 | 1/2002 | Mukai et al. | 2003/0045301 A1 | 3/2003 | Wollrab |
| 2002/0009978 A1 | 1/2002 | Dukach et al. | 2003/0045311 A1 | 3/2003 | Larikka et al. |
| 2002/0016724 A1 | 2/2002 | Yang et al. | 2003/0045329 A1 | 3/2003 | Kinoshita |
| 2002/0019225 A1 | 2/2002 | Miyashita | 2003/0045996 A1 | 3/2003 | Yamazaki et al. |
| 2002/0026348 A1 | 2/2002 | Fowler et al. | 2003/0050776 A1 | 3/2003 | Blair |
| 2002/0028690 A1 | 3/2002 | McKenna et al. | 2003/0052964 A1 | 3/2003 | Priestman et al. |
| 2002/0031120 A1 | 3/2002 | Rakib | 2003/0054830 A1 | 3/2003 | Williams et al. |
| 2002/0034292 A1 | 3/2002 | Tuoriniemi et al. | 2003/0055994 A1 | 3/2003 | Herrmann et al. |
| 2002/0036231 A1 | 3/2002 | Monaghan et al. | 2003/0061606 A1 | 3/2003 | Hartwig et al. |
| 2002/0036642 A1 | 3/2002 | Kwon et al. | 2003/0063580 A1 | 4/2003 | Pond |
| 2002/0038219 A1 | 3/2002 | Yanay et al. | 2003/0063732 A1 | 4/2003 | Mcknight |
| 2002/0039914 A1 | 4/2002 | Hama et al. | 2003/0065784 A1 | 4/2003 | Herrod |
| 2002/0041262 A1 | 4/2002 | Mukai et al. | 2003/0065805 A1 | 4/2003 | Barnes, Jr. |
| 2002/0047787 A1 | 4/2002 | Mikkola et al. | 2003/0069693 A1 | 4/2003 | Snapp et al. |
| 2002/0049630 A1 | 4/2002 | Furuta et al. | 2003/0073432 A1 | 4/2003 | Meade, II |
| 2002/0049742 A1 | 4/2002 | Chan et al. | 2003/0083055 A1 | 5/2003 | Riordan et al. |
| 2002/0054068 A1 | 5/2002 | Ellis et al. | 2003/0083873 A1 | 5/2003 | Ross et al. |
| 2002/0055350 A1 | 5/2002 | Gupte et al. | 2003/0084121 A1 | 5/2003 | De Boor et al. |
| 2002/0058497 A1 | 5/2002 | Jeong | 2003/0093503 A1 | 5/2003 | Yamaki et al. |
| 2002/0058531 A1 | 5/2002 | Terasaki et al. | 2003/0093790 A1 | 5/2003 | Logan et al. |
| 2002/0061767 A1 | 5/2002 | Sladen et al. | 2003/0099367 A1 | 5/2003 | Okamura |
| 2002/0065037 A1 | 5/2002 | Messina et al. | 2003/0100326 A1 | 5/2003 | Grube et al. |
| 2002/0065604 A1 | 5/2002 | Sekiyama | 2003/0107580 A1 | 6/2003 | Egawa et al. |
| 2002/0066115 A1 | 5/2002 | Wendelrup | 2003/0109251 A1 | 6/2003 | Fujito et al. |
| 2002/0068558 A1 | 6/2002 | Janik | 2003/0114191 A1 | 6/2003 | Nishimura |
| 2002/0068585 A1 | 6/2002 | Chan et al. | 2003/0115240 A1 | 6/2003 | Cho |
| 2002/0068599 A1 | 6/2002 | Rodriguez et al. | 2003/0117316 A1 | 6/2003 | Tischer |
| 2002/0072395 A1 | 6/2002 | Miramontes | 2003/0117376 A1 | 6/2003 | Ghulam |
| 2002/0082059 A1* | 6/2002 | Nariai et al. ................... 455/573 | 2003/0119479 A1 | 6/2003 | Arima et al. |
| 2002/0085700 A1 | 7/2002 | Metcalf | 2003/0119485 A1 | 6/2003 | Ogasawara |
| 2002/0094806 A1 | 7/2002 | Kamimura | 2003/0119562 A1 | 6/2003 | Kokubo |
| 2002/0097984 A1 | 7/2002 | Abecassis | 2003/0120784 A1 | 6/2003 | Johnson et al. |
| 2002/0098857 A1 | 7/2002 | Ishii | 2003/0122779 A1* | 7/2003 | Martin et al. .................. 345/156 |
| 2002/0102960 A1 | 8/2002 | Lechner | 2003/0125008 A1 | 7/2003 | Shimamura |
| 2002/0103872 A1 | 8/2002 | Watanabe | 2003/0132928 A1 | 7/2003 | Kori |
| 2002/0104095 A1 | 8/2002 | Nguyen et al. | 2003/0135563 A1 | 7/2003 | Bodin et al. |
| 2002/0110246 A1 | 8/2002 | Gosior et al. | 2003/0137970 A1 | 7/2003 | Odman |
| 2002/0115469 A1 | 8/2002 | Rekimoto et al. | 2003/0142957 A1 | 7/2003 | Young et al. |

| | | |
|---|---|---|
| 2003/0144024 A1 | 7/2003 | Luo |
| 2003/0148772 A1 | 8/2003 | Ben-Ari |
| 2003/0153355 A1 | 8/2003 | Warren |
| 2003/0153364 A1 | 8/2003 | Osann, Jr. |
| 2003/0155413 A1 | 8/2003 | Kovesdi et al. |
| 2003/0157929 A1 | 8/2003 | Janssen et al. |
| 2003/0166399 A1 | 9/2003 | Tokkonen et al. |
| 2003/0169329 A1 | 9/2003 | Parker et al. |
| 2003/0171113 A1 | 9/2003 | Choi |
| 2003/0174685 A1 | 9/2003 | Hasebe |
| 2003/0181201 A1 | 9/2003 | Bomze et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236866 A1 | 12/2003 | Light |
| 2004/0003307 A1 | 1/2004 | Tsuji |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0072595 A1 | 4/2004 | Anson et al. |
| 2004/0082321 A1 | 4/2004 | Kontianinen |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0132445 A1 | 7/2004 | Rogalski et al. |
| 2004/0137893 A1 | 7/2004 | Muthuswamy et al. |
| 2004/0137983 A1* | 7/2004 | Kerr et al. ................ 463/29 |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0198374 A1 | 10/2004 | Bajikar |
| 2004/0203490 A1* | 10/2004 | Kaplan ................ 455/90.1 |
| 2004/0203520 A1* | 10/2004 | Schirtzinger et al. ........ 455/90.3 |
| 2004/0203577 A1 | 10/2004 | Forman et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0204821 A1 | 10/2004 | Tu |
| 2004/0204848 A1 | 10/2004 | Matsuo et al. |
| 2004/0209649 A1 | 10/2004 | Lord |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0222988 A1 | 11/2004 | Donnelly |
| 2004/0235513 A1 | 11/2004 | O'Connell |
| 2004/0235520 A1 | 11/2004 | Cadiz et al. |
| 2004/0242269 A1 | 12/2004 | Fadell |
| 2004/0248586 A1 | 12/2004 | Patel et al. |
| 2004/0252197 A1 | 12/2004 | Fraley et al. |
| 2004/0257208 A1 | 12/2004 | Huang et al. |
| 2004/0267628 A1 | 12/2004 | Stillman |
| 2005/0004749 A1 | 1/2005 | Park |
| 2005/0020301 A1 | 1/2005 | Lee |
| 2005/0026629 A1 | 2/2005 | Contractor |
| 2005/0036509 A1 | 2/2005 | Acharya et al. |
| 2005/0048987 A1 | 3/2005 | Glass |
| 2005/0070257 A1 | 3/2005 | Saarinen et al. |
| 2005/0090768 A1 | 4/2005 | Brattesani et al. |
| 2005/0097038 A1 | 5/2005 | Yu et al. |
| 2005/0107119 A1 | 5/2005 | Lee et al. |
| 2005/0113080 A1 | 5/2005 | Nishimura |
| 2005/0120225 A1 | 6/2005 | Kirsch et al. |
| 2005/0136949 A1 | 6/2005 | Barnes, Jr. |
| 2005/0144560 A1 | 6/2005 | Gruen et al. |
| 2005/0151877 A1 | 7/2005 | Fisher |
| 2005/0153681 A1 | 7/2005 | Hanson |
| 2005/0153745 A1 | 7/2005 | Smethers |
| 2005/0164684 A1 | 7/2005 | Chen et al. |
| 2005/0165871 A1 | 7/2005 | Barrs, II et al. |
| 2005/0166242 A1 | 7/2005 | Matsumoto et al. |
| 2005/0186954 A1 | 8/2005 | Kenney |
| 2005/0191969 A1 | 9/2005 | Mousseau |
| 2005/0235312 A1 | 10/2005 | Karaoguz et al. |
| 2005/0257149 A1 | 11/2005 | Kamiya et al. |
| 2005/0261945 A1 | 11/2005 | Mougin et al. |
| 2005/0272504 A1 | 12/2005 | Eguchi et al. |
| 2005/0282582 A1 | 12/2005 | Slotznick et al. |
| 2006/0015819 A1 | 1/2006 | Hawkins et al. |
| 2006/0031407 A1 | 2/2006 | Dispensa et al. |
| 2006/0041923 A1 | 2/2006 | McQuaide, Jr. |
| 2006/0052100 A1 | 3/2006 | Almgren |
| 2006/0073820 A1 | 4/2006 | Craswell et al. |
| 2006/0126284 A1 | 6/2006 | Moscovitch |
| 2006/0133590 A1 | 6/2006 | Jiang |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0199571 A1 | 9/2006 | Chin et al. |
| 2006/0206913 A1 | 9/2006 | Jerding et al. |
| 2006/0234693 A1 | 10/2006 | Isidore et al. |
| 2006/0234758 A1 | 10/2006 | Parupudi et al. |
| 2006/0284732 A1 | 12/2006 | Brock-Fisher |
| 2007/0061845 A1 | 3/2007 | Barnes, Jr. |
| 2007/0109262 A1 | 5/2007 | Oshima et al. |
| 2007/0121596 A1 | 5/2007 | Kurapati et al. |
| 2007/0135145 A1 | 6/2007 | Lee et al. |
| 2007/0142047 A1 | 6/2007 | Heeschen |
| 2007/0190944 A1 | 8/2007 | Doan et al. |
| 2007/0204014 A1 | 8/2007 | Greer et al. |
| 2007/0218891 A1 | 9/2007 | Cox |
| 2007/0260456 A1 | 11/2007 | Proux et al. |
| 2007/0262848 A1 | 11/2007 | Berstis et al. |
| 2008/0014917 A1 | 1/2008 | Rhoads et al. |
| 2008/0016526 A1 | 1/2008 | Asmussen |
| 2008/0016534 A1 | 1/2008 | Ortiz et al. |
| 2008/0058005 A1 | 3/2008 | Zicker et al. |
| 2008/0194273 A1 | 8/2008 | Kansal et al. |
| 2008/0242283 A1 | 10/2008 | Ruckart |
| 2008/0250459 A1 | 10/2008 | Roman |
| 2009/0124243 A1 | 5/2009 | Routley et al. |
| 2009/0153490 A1 | 6/2009 | Nymark et al. |
| 2009/0197641 A1 | 8/2009 | Rofougaran et al. |
| 2009/0221330 A1 | 9/2009 | Tomimori |
| 2009/0290369 A1 | 11/2009 | Schofield et al. |
| 2010/0030557 A1 | 2/2010 | Molloy et al. |
| 2010/0062740 A1 | 3/2010 | Ellis et al. |
| 2010/0099457 A1 | 4/2010 | Kim |
| 2010/0145700 A1 | 6/2010 | Kennewick et al. |

FOREIGN PATENT DOCUMENTS

| | | |
|---|---|---|
| JP | 2005/216149 A1 | 8/2005 |
| WO | WO03001457 A1 | 1/2003 |

OTHER PUBLICATIONS

HI Corporation's company history (http://www.hicorp.co.jp/english/corporate/history.html).

Audiovox, "POcket PC Phone User Manual", published on Mar. 19, 2004.

Gamespot, "Super Mario Bros. 3", Feb 12, 1990, <http://www.gamespot.com/nes/action/supermariobros3/index.html?tag=tabs%3Bsummary>.

* cited by examiner

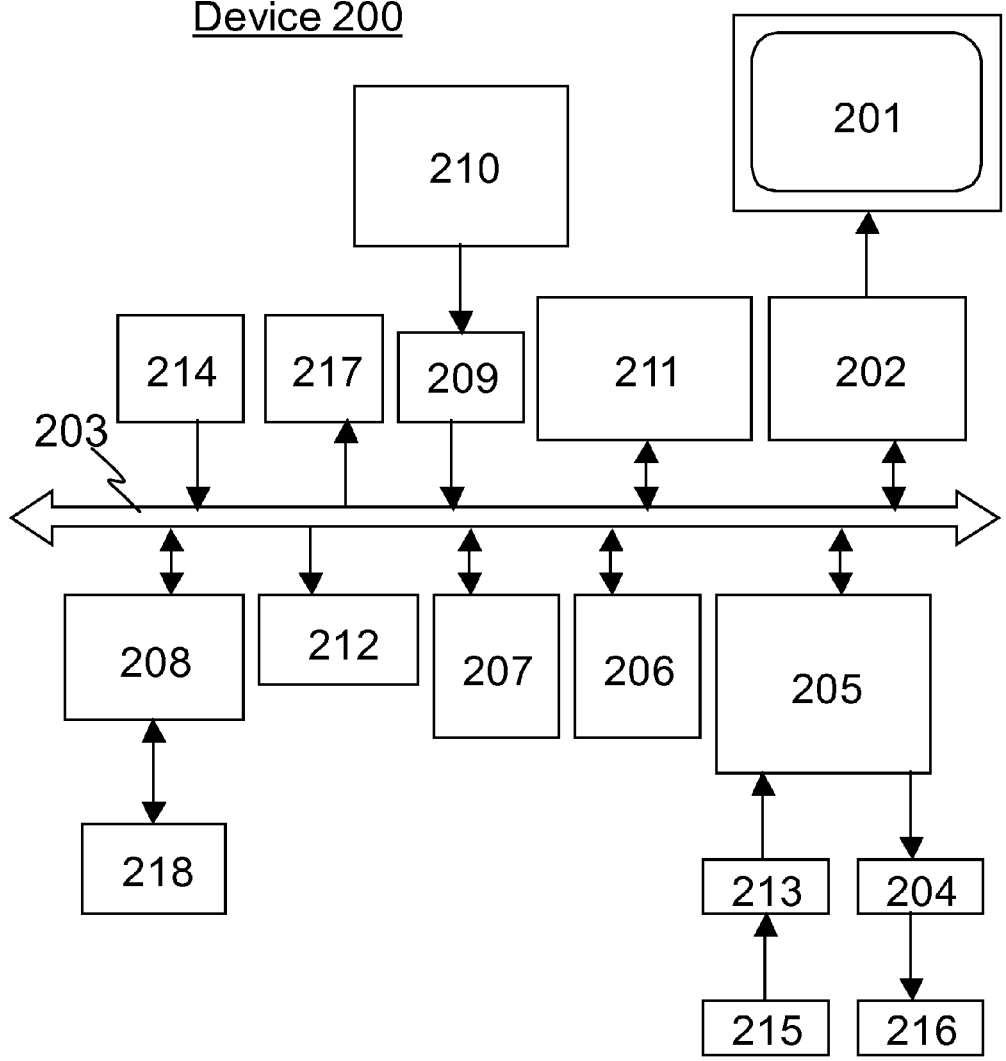

COMMUNICATION DEVICE

CROSS REFERENCE TO RELATED APPLICATIONS

The application is a continuation of U.S. Ser. No. 10/708,285, filed 2004 Jan. 23, which claims the benefit of U.S. Provisional Application No. 60/461,033, filed 2003 Apr. 3, both of which are hereby incorporated herein by reference in their entirety.

BACKGROUND OF INVENTION

The invention relates to a communication device and more particularly to the communication device which has a capability to communicate with another communication device in a wireless fashion.

U.S. Patent Publication No. 20020115469 is introduced as prior art of the present invention of which the summary is the following: "A user interface by which contents of what is being processed can be confirmed with the sense of touch is provided. On a first surface of a portable phone, first piezoelectric devices are arranged, and on a second surface of the portable phone, second piezoelectric devices are arranged. When radio waves are transmitted, a displacement is generated from the first and second last piezoelectric devices at the same time when radio waves are transmitted from an antenna, and the displacement moves in sequence to the piezoelectric devices of the upper portion. When the displacement moves to the first and second initial piezoelectric devices, a displacement is generated repeatedly from the first and second last piezoelectric devices, and is continued until the other party to which a call is being originated responds." However, the prior art does not disclose the video game device comprising a game object entering detector and a game vibrator, wherein the game object entering detector identifies whether a user controlled game object enters a certain two-dimensional area by executing a game vibrator activating software and implements overall control of the video game device; the game object entering detector activates the game vibrator when the game object entering detector identifies that the user controlled game object enters the certain two-dimensional area; and when the game object entering detector detects a phone call, the game object entering detector activates the game vibrator and generates a specific pattern of vibration where the specific pattern is determined by the game object entering detector."However, this prior art does not disclose the video game device which has a mobile phone functionality, wherein a game vibrator which is activated when the game object entering detector identifies that the user controlled game object enters a certain two-dimensional area by identifying the locations of the user controlled game object and the certain two-dimensional area in the computer-generated three-dimensional virtual space is also activated when receiving a phone call.

SUMMARY OF INVENTION

It is an object of the present invention to provide a device capable of implementing a plurality of functions where the functions.

It is another object of the present invention to provide merchandise to merchants attractive to the consumers in the U.S.

It is another object of the present invention to provide mobility to the users of the device in which the present invention is incorporated.

It is another object of the present invention to provide more convenience to the users of the device compared to the prior art.

It is another object of the present invention to overcome the shortcomings associated with the prior art.

It is another object of the present invention to provide a convenient device capable to implement the functions of both voice communication and audio(visual) player to consumers.

The present invention provides the video game device which has a mobile phone functionality, wherein a game vibrator which is activated when the game object entering detector identifies that the user controlled game object enters a certain two-dimensional area by identifying the locations of the user controlled game object and the certain two-dimensional area in the computer-generated three-dimensional virtual space is also activated when receiving a phone call.

BRIEF DESCRIPTION OF DRAWING

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the paragraph number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

This FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph [0022] illustrates one of the preferred methods of the communication between two Communication Device 200. Both Device A and Device B represents Communication Device 200 in FIG. 1. Device A transfers wireless data to Transmitter 301 which Relays the data to Host H via Cable 302. The data is transferred to Transmitter 308 (e.g., a satellite dish) via Cable 320 and then to Artificial Satellite 304. Artificial Satellite 304 transfers the data to Transmitter 309 which transfers the data to Host H via Cable 321. The data is then transferred to Transmitter 307 via Cable 306 and to Device B in a wireless fashion. Device B transfers wireless data to Device A in the same manner.

This paragraph [0023] illustrates another preferred method of the communication between two Communication Devices 200. In this example, Device A directly transfers the wireless data to Host H, an artificial satellite, which transfers the data directly to Device B. Device B transfers wireless data to Device A in the same manner.

This paragraph [0024] illustrates another preferred method of the communication between two Communication Devices 200. In this example, Device A transfers wireless data to Transmitter 312, an artificial satellite, which Relays the data to Host H, which is also an artificial satellite, in a wireless fashion. The data is transferred to Transmitter 314, an artificial satellite, which Relays the data to Device B in a wireless fashion. Device B transfers wireless data to Device A in the same manner.

<<Voice Recognition System>>

Communication Device 200 (FIG. 1) has the function to operate the device by the user's voice or convert the user's voice into a text format (i.e., the voice recognition). The voice recognition function can be performed in terms of software by using Area 261, the voice recognition working area, of RAM 206 (FIG. 1) which is specifically allocated to perform such function, or can also be performed in terms of hardware circuit where such space is specifically allocated in Area 282 of Sound Processor 205 (FIG. 1) for the voice recognition system.

This paragraph [0027] illustrates how the voice recognition function is activated. CPU 211 (FIG. 1) periodically checks the input status of Input Device 210 (FIG. 1) (S1). If CPU 211 detects a specific signal input from Input Device 210 (S2) the voice recognition system which is described in paragraph [0022], paragraph [0023], paragraph [0024], and/or paragraph [0026] is activated. As another embodiment, the voice recognition system can also be activated by entering predetermined phrase, such as 'start voice recognition system' via Microphone 215 (FIG. 1).

<<Voice Recognition—Dialing/Auto-Off During Call Function>>

This paragraph [0029] illustrates the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

<<Voice Recognition Tag Function>>

Paragraph [0033] through paragraph [0034] describes the method of inputting the numeric information in a convenient manner.

As described in this paragraph [0033], RAM 206 includes Table #1 and Table #2. Audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' Tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' Once the audio data is processed as described in S4 of paragraph [0029], CPU 211 scans Table #1 (S1). If the retrieved audio data matches with one of the audio information registered in Table #1 (S2), CPU 211 scans Table #2 (S3) and retrieves the corresponding numeric information from Table #2 (S4).

This paragraph [0034] illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' Once the audio data is processed as described in S4 of paragraph [0029], CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained in paragraph [0026] through paragraph [0030]. Namely, once the audio data is processed by CPU 211 (FIG. 1) as described in S4 of paragraph [0029] and retrieves the text data therefrom and detects one of the tags registered in Table #2 (e.g., 'Scot'), CPU 211 retrieves the corresponding numeric information (e.g., '(916) 411-2526') from the same table.

<<Voice Recognition Noise Filtering Function>>

Paragraph [0038] through paragraph [0041] describes the method of minimizing the undesired effect of the background noise when utilizing the voice recognition system. As described in this paragraph [0038], RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256. This paragraph [0039] describes the method to utilize the data stored in Area 255 and Area 256 described in paragraph [0038]. When the voice recognition system is activated as described in paragraph [0027], the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1). If the digital audio data matches to the data stored in Area 255 and/or Area 256, the filtering process is initiated and the matched portion of the digital audio data is deleted as background noise. Such sequence of process is done before retrieving text and numeric information from the digital audio data.

This paragraph [0040] describes the method of updating Area 255. When the voice recognition system is activated as described in paragraph [0027], the analog audio data is input from Microphone 215 (FIG. 1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

This paragraph [0041] describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

<<Voice Recognition Auto-Off Function>>

The voice recognition system can be automatically turned off to avoid glitch as described in this paragraph [0043]. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition Email Function (1)>>

This paragraph [0045] illustrates the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

<<Voice Recognition—Speech-to-text Function>>

Paragraph [0048] illustrates the speech-to-text function of Communication Device 200 (FIG. 1).

As described in this paragraph [0048], once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

This paragraph [0049] illustrates how the text and numeric information as well as the tag are displayed. On LCD 201 the text and numeric information 702 ('XXXXXXXXX') are displayed with the predetermined font and color as well as with the tag 701 ('John').

<<Auto Backup System>>

Paragraph [0052] through paragraph [0056] illustrate the automatic backup system of Communication Device 200 (FIG. 1).

As illustrated in this paragraph [0052], RAM 206 (FIG. 1) includes areas to store the data essential to the user of Communication Device 200, such as Area 278 for a phone list, Area 279 for an address book, Area 280 for email data, Area 281 for software A, Area 282 for software B, Area 283 for software C, Area 284 for Data D, Area 285 for Data E. RAM 206 also includes Area 264, i.e., the selected data info storage area, which will be explained in details hereinafter.

As described in this paragraph [0053], the user selects data by utilizing Input Device 210 (FIG. 1) or the voice recognition system which he/she intends to be automatically backed up (S1). The selected data are written in Area 264, the selected data info storage area (S2).

The overall operation of this function is illustrated in this paragraph [0054]. First of all, a timer (not shown) is set by a specific input signal produced by Input Device 210 (FIG. 1) or by the voice recognition system (S1). The timer is incremented periodically (S2) and when the incremented value equals the predetermined value (S3), CPU 211 (FIG. 1) initiates the dialing process (S4). The dialing process continues until Communication Device 200 is connected to Host H explained in paragraph [0056] (S5). Once the line is connected, CPU 211 reads the information stored in Area 264 (S6) and based on such information it initiates to transfer the selected data from RAM 206 to Host H (S7). The transfer continues until all of the selected data are transferred to Host H (S8), and the line is disconnected thereafter (S9). This backup sequence can be initiated automatically and periodically by using a timer or manually. As another embodiment of the present invention, instead of selecting the data that are to be backed up, all data in RAM 206 (FIG. 1) can be transferred to Host H.

This paragraph [0055] illustrates the basic structure of the data transferred to Host H. Transferred data 601 includes Header 602, device ID 603, selected data 604 and Footer 605. Device ID 603 is the identification number of Communication Device 200 preferably its phone number, and selected data 604 is a pack of data which is transferred from RAM 206 to Host H based on information stored in Area 264. Header 602 and Footer 605 indicates the beginning and the end of the Transferred Data 601 respectively.

This paragraph [0056] illustrates the basic structure of Host H. Host H includes backup data storage Area 401 which is used to backup all of the backup data transferred from all Communication Devices 200. Host H stores the Transferred Data 601 (paragraph [0055]) to the designated area based on the device ID included in Transferred Data 601. For example, Transferred Data 601 transferred from Device A is stored in Area 412 as Backup Data A. In the same manner Transferred Data 601 transferred from Device B is stored in Area 413 as Backup Data B; Transferred Data 601 transferred from Device C is stored in Area 414 as Backup Data C; Transferred Data 601 transferred from device D is stored in Area 415 as Backup Data D; Transferred Data 601 transferred from device E is stored in Area 416 as Backup Data E; and Transferred Data 601 transferred from device F is stored in Area 417 as Backup Data F.

<<Audio/Video Data Capturing System>>

Paragraph [0060] through paragraph [0065] illustrate the audio/video capturing system of Communication Device 200 (FIG. 1).

Assuming that Device A, a Communication Device 200, captures audio/video data and transfers such data to Device B, another Communication Device 200, via a host (not shown). Primarily video data is input from CCD Unit 214 (FIG. 1) and audio data is input from Microphone 215 of (FIG. 1) of Device A.

As illustrated in this paragraph [0060], RAM 206 (FIG. 1) includes Area 267 which stores video data, Area 268 which stores audio data, and Area 265 which is a work area utilized for the process explained hereinafter.

As described in this paragraph [0061], the video data input from CCD Unit 214 (FIG. 1) (S1a) is converted from analog data to digital data (S2a) and is processed by Video Processor 202 (FIG. 1) (S3a). Area 265 (paragraph [0060]) is used as work area for such process. The processed video data is stored in Area 267 (paragraph [0060]) of RAM 206 (S4a) and is displayed on LCD 201 (FIG. 1) (S5a). The audio data input from Microphone 215 (FIG. 1) (S1b) is converted from analog data to digital data by A/D 213 (FIG. 1) (S2b) and is processed by Sound Processor 205 (FIG. 1) (S3b). Area 265 is used as work area for such process. The processed audio data is stored in Area 268 (paragraph [0060]) of RAM 206 (S4b) and is transferred to Sound Processor 205 and is output from Speaker 216 (FIG. 1) via D/A 204 (FIG. 1) (S5b). The sequences of S1a through S5a and S1b through S5b are continued until a specific signal indicating to stop such sequence is input from Input Device 210 (FIG. 1) or by the voice recognition system (S6).

This paragraph [0062] illustrates the sequence to transfer the video data and the audio data via Antenna 218 (FIG. 1) in a wireless fashion. CPU 211 (FIG. 1) of Device A initiates a dialing process (S1) until the line is connected to a host (not shown) (S2). As soon as the line is connected, CPU 211 reads the video data and the audio data stored in Area 267 (paragraph [0060]) and Area 268 (paragraph [0060]) (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

This paragraph [0063] illustrates the basic structure of the transferred data which is transferred from Device A as described in S4 and S5 of paragraph [0062]. Transferred data 610 is primarily composed of Header 611, video data 612, audio data 613, relevant data 614, and Footer 615. Video data 612 corresponds to the video data stored in Area 267 (paragraph [0060]) of RAM 206, and audio data 613 corresponds to the audio data stored in Area 268 (paragraph [0060]) of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

This paragraph [0064] illustrates the data contained in RAM 206 (FIG. 1) of Device B. RAM 206 includes Area 269 which stores video data, Area 270 which stores audio data, and Area 266 which is a work area utilized for the process explained hereinafter. As described in this paragraph [0065], CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 (paragraph [0064]) and Area 270 (paragraph [0064]) of RAM 206 respectively (S5). The video data stored in Area 269 is processed by Video Processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in Area 270 is processed by Sound Processor 205 (FIG. 1) (S6b). The processed audio data is converted into analog data by D/A 204 (FIG. 1) (S7b) and output from Speaker 216 (FIG. 1) (S8b). The sequences of S6a through S8a and S6b through S8b are continued until a specific signal indicating to stop such sequence is input from Input Device 210 (FIG. 1) or via the voice recognition system (S9).

<<Digital Mirror Function (1)>>

Paragraph [0068] through paragraph [0070] illustrate the first embodiment of digital mirror function of Communication Device 200 (FIG. 1).

In this embodiment, Communication Device 200 includes Rotator 291 as described in this paragraph [0068] through paragraph [0070]. Rotator 291 is fixed to the side of Communication Device 200 and rotates CCD Unit 214 (FIG. 1) and thereby CCD Unit 214 is enabled to face multi-direction. CPU 211 (FIG. 1) reads the video data stored in Area 267 (paragraph [0060]) from left to right as described in this paragraph [0068] through paragraph [0070] when CCD Unit 214 is facing the opposite direction from LCD 201 (FIG. 1). However, when CCD Unit 214 is facing the same direction with LCD 201, CPU 211 reads the video data stored in Area 267 from right to left as described in this paragraph [0068] through paragraph [0070] thereby producing a 'mirror image' on LCD 201. As another embodiment, more than one area in RAM 206 (FIG. 1) may be utilized instead of one area, i.e., Area 267. First Area and Second Area in RAM 206 (FIG. 1) are utilized in this embodiment. First of all, CPU 211 stores the video data taken from CCD Unit 214 into both First Area and Second Area. Here, the video data stored in First Area and Second Area are identical. CPU 211 reads the video data stored in First Area from left to right as described in this paragraph through paragraph [0070]. CPU 211 reads the video data stored in Second Area from right to left as described in this paragraph [0068] through paragraph [0070]. CPU 211 displays the video data stored in First Area on LCD 201 when CCD Unit 214 is facing the opposite direction from LCD 201. CPU 211 displays the video data stored in Second Area on LCD 201 when CCD Unit 214 is facing the same direction with LCD 201.

As another embodiment of the present invention, more than one CCD unit which face multi-direction may be utilized instead of enabling one CCD unit to rotate in the manner described hereinbefore. First CCD Unit and Second CCD Unit are utilized in this embodiment. Here, First CCD Unit faces the opposite direction from LCD 201 (FIG. 1), and Second CCD Unit faces the same direction with LCD 201. CPU 211 (FIG. 1) reads the video data stored in Area 267 (paragraph [0060]) from left to right as described in paragraph [0068] through paragraph [0070] when First CCD Unit is activated. CPU 211 reads the video data stored in Area 267 (paragraph [0060]) from right to left as described in paragraph [0068] through paragraph [0070] when Second CCD Unit is activated thereby producing a 'mirror image' on LCD 201. Such activations may be rendered automatically by CPU 211 or manually by the user of Communication Device 200 utilizing input device 210 (FIG. 1) or via voice recognition system. As another embodiment, more than one area in RAM 206 (FIG. 1) may be utilized instead of one area, i.e., Area 267 (paragraph [0060]). First Area and Second Area in RAM 206 (FIG. 1) are utilized in this embodiment. Here, First Area is designed to be read from left to right as described in paragraph [0068] through paragraph [0070], and Second Area is designed to be read from right to left as described in paragraph [0068] through paragraph [0070]. CPU 211 stores the video data taken from First CCD Unit and Second CCD Unit into First Area and Second Area respectively. CPU 211 displays the video data stored in First Area on LCD 201 when First CCD Unit is activated, and also displays the video data stored in Second Area on LCD 201 when Second CCD Unit is activated.

As another embodiment of the present invention, more than one LCD unit which face multi-direction may be utilized instead of one LCD 201 (FIG. 1). First LCD and Second LCD are utilized in this embodiment. Here, First LCD faces the opposite direction from CCD Unit 214 (FIG. 1), and Second LCD faces the same direction with CCD Unit 214. CPU 211 (FIG. 1) reads the video data stored in Area 267 (paragraph [0060]) from left to right as described in paragraph through this paragraph [0070] when First LCD is activated. CPU 211 (FIG. 1) reads the video data stored in Area 267 (paragraph [0060]) from right to left as described in paragraph through this paragraph [0070] when Second LCD is activated thereby producing a 'mirror image' thereon. Such activations may be rendered automatically by CPU 211 or manually by the user of Communication Device 200 utilizing input device 210 (FIG. 1) or via voice recognition system. As another embodiment, more than one area in RAM 206 (FIG. 1) may be utilized instead of one area, i.e., Area 267 (paragraph [0060]). First Area and Second Area in RAM 206 (FIG. 1) are utilized in this embodiment. CPU 211 stores the video data taken from CCD Unit 214 into both First Area and Second Area. Here, the video data stored in First Area and Second Area are identical. CPU 211 reads the video data stored in First Area from left to right as described in paragraph through this paragraph [0070], and also reads the video data stored in Second Area from right to left as described in paragraph [0068] through this paragraph [0070]. The video data stored in First Area is displayed on First LCD, and the video data stored in Second Area is displayed on Second LCD.

<<Caller ID System>>

Paragraph [0073] through paragraph [0075] illustrate the caller ID system of Communication Device 200 (FIG. 1).

As illustrated in this paragraph [0073], RAM 206 includes Table C. Each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

As illustrated in this paragraph [0074], the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

As illustrated in this paragraph [0075], CPU 211 (FIG. 1) periodically checks whether it has received a call from other communication devices (S1). If it receives a call (S2), CPU 211 scans Table C (paragraph [0073]) to see whether the phone number of the caller device is registered in the table (S3). If there is a match (S4), the designated color is output from Indicator 212 (FIG. 1) and the designated sound is output from Speaker 216 (FIG. 1) (S5). For example if the incoming call is from Phone #1, Color A is output from Indicator 212 and Sound E is output from Speaker 216.

<<Stock Purchasing Function>>

Paragraph [0078] through paragraph [0082] illustrate the method of purchasing stocks by utilizing Communication Device 200 (FIG. 1).

This paragraph [0078] illustrates the data stored in ROM 207 (FIG. 1) necessary to set the notice mode. Area 251 stores the program regarding the vibration mode (i.e., vibration mode ON/vibration mode OFF); Area 252 stores the program regarding sound which is emitted from Speaker 216 (FIG. 1) and several types of sound data, such as Sound Data I, Sound Data J, and Sound Data K are stored therein; Area 253 stores the program regarding the color emitted from Indicator 212 (FIG. 1) and several types of color data, such as Color Data L, Color Data M, and Color Data N are stored therein.

As illustrated in this paragraph [0079], the notice mode is activated in the manner in compliance with the settings stored in setting data Area 271 of RAM 206 (FIG. 1). When the notice mode is activated, Vibrator 217 (FIG. 1) is turned on in compliance with the data stored in Area 251*a*, Speaker 216 (FIG. 1) is turned on and Sound Data J is emitted therefrom in compliance with the data stored in Area 252*a*, and Indicator 212 (FIG. 1) is turned on and Color M is emitted therefrom in compliance with the data stored in Area 253*a*. Area 292 stores the stock purchase data, i.e., the name of the brand, the amount of limited price, the name of the stock market (such as NASDAQ and/or NYSE) and other relevant information regarding the stock purchase.

As illustrated in this paragraph [0080], the user of Communication Device 200 inputs the stock purchase data from Input Device 210 (FIG. 1) or by the voice recognition system, which is stored in Area 292 of RAM 206 (paragraph [0079]) (S1). By way of inputting specific data from Input Device 210, the property of notice mode (i.e., vibration ON/OFF, sound ON/OFF and the type of sound, indicator ON/OFF, and the type of color) is set and the relevant data are stored in Area 271 (i.e., Areas 251*a*, 252*a*, 253*a*) (paragraph [0079]) of RAM 206 by the programs stored in Areas 251, 252, 253 of ROM 207 (paragraph [0078]) (S2). Communication Device 200 initiates a dialing process (S3) until it is connected to Host H (described hereinafter) (S4) and sends the stock purchase data thereto.

This paragraph [0081] illustrates the operation of Host H (not shown). As soon as Host H receives the stock purchase data from Communication Device 200 (S1), it initiates to monitor the stock markets which is specified in the stock purchase data (S2). If Host H detects that the price of the certain brand specified in the stock purchase data meets the limited price specified in the stock purchase data, (in the present example if the price of brand x is y) (S3), it initiates a dialing process (S4) until it is connected to Communication Device 200 (S5) and sends a notice data thereto (S6). As illustrated in this paragraph [0082], Communication Device 200 periodically monitors the data received from Host H (not shown) (S1). If the data received is a notice data (S2), the notice mode is activated in the manner in compliance with the settings stored in setting data Area 271 (paragraph [0079]) of RAM 206 (S3). In the example illustrated in paragraph [0079], Vibrator 217 (FIG. 1) is turned on, Sound Data J is emitted from Speaker 216 (FIG. 1), and Indicator 212 (FIG. 1) emits Color M.

<<Timer Email Function>>

Paragraph [0085] illustrate the method of sending emails from Communication Device 200 (FIG. 1) by utilizing a timer.

As illustrated in this paragraph [0085], address data, i.e., email address is input by utilizing Input Device 210 (FIG. 1) or via voice recognition system explained in paragraph [0026], paragraph [0026], paragraph [0027], paragraph [0038], paragraph [0039], paragraph [0040], paragraph [0041], paragraph [0043] (S1) and the text data, the text of the email message is input by the same manner (S2). The address data and the text data are automatically saved in RAM 206 (FIG. 1) (S3). The sequence of S1 through S3 is repeated (i.e., writing more than one email) until a specified input signal is input from Input Device 210 (FIG. 1) or by utilizing the voice recognition system explained above. Once inputting both the address data and the text data (which also includes numeric data, images and programs) are completed a timer (not shown) is set by Input Device 210 or by utilizing the voice recognition system (S5), and the timer is incremented periodically (S6) until the timer value equals the predetermined value specified in S5 (S7). A dialing process is continued (S8) until the line is connected (S9) and the text data are sent thereafter to email addresses specified in S1 (S10). All of the emails are sent (S11) and the line is disconnected thereafter (S12).

As another embodiment of the present invention a specific time may be input by Input Device 210 and send the text data on the specific time (i.e., a broad meaning of 'timer').

<<Navigation System>>

Paragraph [0089] through paragraph [0101] illustrate the navigation system of Communication Device 200 (FIG. 1).

As illustrated in this paragraph [0089], RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

As illustrated in this paragraph [0090], Video Processor 202 (FIG. 1) includes texture mapping processor 290. Texture mapping processor 290 produces polygons in a three-dimensional space and 'pastes' textures to each polygon. The concept of such method is described in the following patents and the references cited thereof: U.S. Pat. No. 5,870,101, U.S. Pat. No. 6,157,384, U.S. Pat. No. 5,774,125, U.S. Pat. No. 5,375,206, and/or U.S. Pat. No. 5,925,127.

As illustrated in this paragraph [0091], the voice recognition system is activated when CPU 211 (FIG. 1) detects a specific signal input from Input Device 210 (FIG. 1) (S1). After the voice recognition system is activated, the input current position mode starts and the current position of Communication Device 200 is input by voice recognition system explained in paragraph [0026], paragraph [0026], paragraph [0027], paragraph [0038], paragraph [0039], paragraph [0040], paragraph [0041], paragraph [0043] (S2). The current position can also be input from Input Device 210. As another embodiment of the present invention, the current position can automatically be detected by the method so-called 'global positioning system' or 'GPS' and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

This paragraph [0092] illustrates the sequence of the input current position mode described in S2 of paragraph [0091]. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

This paragraph [0093] illustrates the sequence of the input destination mode described in S3 of paragraph [0091]. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

This paragraph [0094] illustrates the sequence of displaying the shortest route from the current position to the destination. CPU 211 (FIG. 1) retrieves both the current position data and the Destination Data which are input by the method described in paragraph [0091] through paragraph from Area 277 (paragraph [0089]) of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 (paragraph [0089]) of RAM 206 (S2).

As another embodiment of the present invention, by way of utilizing the location data stored in Area 277, CPU 211 may produce a three-dimensional map by composing the three dimensional objects (by method so-called 'texture mapping' as described above) which are stored in Area 276 (paragraph [0089]) of RAM 206. The two-dimensional map and/or the three dimensional map is displayed on LCD 201 (FIG. 1) (S3).

As another embodiment of the present invention, the attribution data stored in Area 295 (paragraph [0089]) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 (paragraph [0089]) of RAM 206. Then CPU 211 retrieves a plurality of object data which correspond to such location data from Area 276 (paragraph [0089]) of RAM 206 and displays a plurality of objects on LCD 201 based on such object data in a manner the user of Communication Device 200 may observe from the current location.

This paragraph [0098] illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 (paragraph [0089]) of RAM 206 (S3). Instead, by way of utilizing the location data stored in Area 277 (paragraph [0089]), CPU 211 may produce a three-dimensional map by composing the three dimensional objects by method so-called 'texture mapping' which are stored in Area 276 (paragraph [0089]) of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

This paragraph [0099] illustrates the method of finding the shortest location of the desired facility, such as restaurant, hotel, gas station, etc. The voice recognition system is activated in the manner described in paragraph [0091] (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in paragraph [0092] and/or paragraph [0098] (S3). From the data selected in S2, CPU 211 scans Area 277 (paragraph [0089]) of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (paragraph [0089]) (S5). Instead, by way of utilizing the location data stored in 277 (paragraph [0089]), CPU 211 may produce a three-dimensional map by composing the three dimensional objects by method so-called 'texture mapping' which are stored in Area 276 (paragraph [0089]) of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

This paragraph [0100] illustrates the method of displaying the time and distance to the destination. CPU 211 (FIG. 1) calculates the current position wherein the source data can be input from the method described in paragraph [0092] and/or paragraph [0098] (S1). The distance is calculated from the method described in paragraph [0094] (S2). The speed is calculated from the distance which Communication Device 200 has proceeded within specific period of time (S3). The distance to the destination and the time left are displayed on LCD 201 (FIGS. 1) (S4 and S5).

This paragraph [0101] illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method described in this paragraph [0101] is repeated for a certain period of time. If the deviation still exists after such period of time has passed, CPU 211 (FIG. 1) initiates the sequence described in paragraph [0094] and calculates the shortest route to the destination and display it on LCD 201. The details of such sequence is as same as the one explained in paragraph [0094].

This paragraph [0102] illustrates the overall operation of Communication Device 200 regarding the navigation system and the communication system. When Communication Device 200 receives data from Antenna 218 (FIG. 1) (S1), CPU 211 (FIG. 1) determines whether the data is navigation data, i.e., data necessary to operate the navigation system (S2). If the data received is a navigation data, the navigation system described in paragraph [0091] through paragraph [0101] is performed (S3). On the other hand, if the data received is a communication data (S4), the communication system, i.e., the system necessary for wireless communication which is mainly described in FIG. 1 is performed (S5).

<<Remote Controlling System>>

Paragraph [0105] through paragraph [0113] illustrate the remote controlling system utilizing Communication Device 200 (FIG. 1).

As illustrated in this paragraph [0105], Communication Device 200 is connected to Network NT. Network NT may be the internet or have the same or similar structure described in paragraph [0022], paragraph [0023] and/or paragraph [0024] except 'Device B' is substituted to 'Sub-host SH'. Network NT is connected to Sub-host SH in a wireless fashion. Sub-host SH administers various kinds of equipment installed in building 801, such as TV 802, Microwave Oven 803, VCR 804, Bathroom 805, Room Light 806, AC 807, Heater 808, Door 809, and CCD camera 810. Communication Device 200 transfers a control signal to Network NT in a wireless fashion via Antenna 218 (FIG. 1), and Network NT forwards the control signal in a wireless fashion to Sub-host SH, which controls the selected equipment based on the control signal. Communication Device 200 is also capable to connect to Sub-host SH without going through Network NT and transfer directly the control signal to Sub-host SH in a wireless fashion via Antenna 218.

As illustrated in this paragraph [0106], Communication Device 200 is enabled to perform the remote controlling system when the device is set to the home equipment controlling mode. Once Communication Device 200 is set to the home equipment controlling mode, LCD 201 (FIG. 1) displays all pieces of equipment which are remotely controllable by Communication Device 200. Each equipment can be controllable by the following method.

This paragraph [0107] illustrates the method of remotely controlling TV 802. In order to check the status of TV 802, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of TV 802, i.e., the status of the power (ON/OFF), the channel, and the timer of TV 802 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3a), selects the channel (S3b), and/or sets the timer of TV 802 (S3c). The sequence of S2 and S3 can be repeated (S4).

This paragraph [0108] illustrates the method of remotely controlling Microwave Oven 803. In order to check the status of Microwave Oven 803, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Microwave Oven 803, i.e., the status of the power (ON/OFF), the status of temperature, and the timer of Microwave Oven 803 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3a), selects the temperature (S3b), and/or sets the timer of Microwave Oven 803 (S3c). The sequence of S2 and S3 can be repeated (S4).

This paragraph [0109] illustrates the method of remotely controlling VCR 804. In order to check the status of VCR 804, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of VCR 804, i.e., the status of the power (ON/OFF), the channel, the timer, and the status of the recording mode (e.g., one day, weekdays, or weekly) of VCR 804 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3a), selects the TV channel (S3b), sets the timer (S3c), and/or selects the recording mode of VCR 804 (S3d). The sequence of S2 and S3 can be repeated (S4).

This paragraph [0110] illustrates the method of remotely controlling Bathroom 805. In order to check the status of Bathroom 805, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Bathroom 805, i.e., the status of the bath plug (or the stopper for bathtub) (OPEN/CLOSE), the temperature, the amount of hot water, and the timer of Bathroom 805 (S1), and returns the results to Communication Device 200 via Network NT, which are displayed on LCD 201 (FIG. 1) (S2). Based on the control signal produced by Communication Device 200, which is transferred via Network NT, Sub-host SH opens (or closes) the bath plug (S3a), selects the temperature (S3b), selects the amount of hot water (S3c), and/or sets the timer of Bathroom 805 (S3d). The sequence of S2 and S3 can be repeated (S4).

This paragraph [0111] illustrates the method of remotely controlling AC 807 and Heater 808. In order to check the status of AC 807 and/or Heater 808 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of AC 807 and/or Heater 808, i.e., the status of the power (ON/OFF), the status of temperature, and the timer of AC 807 and/or Heater 808 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3a), selects the temperature (S3b), and/or sets the timer of AC 807 and/or Heater 808 (S3c). The sequence of S2 and S3 can be repeated (S4).

This paragraph [0112] illustrates the method of remotely controlling Door 809. In order to check the status of Door 809 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Door 809, i.e., the status of the door lock (LOCKED/UNLOCKED), and the timer of door lock (S1), and returns the results to Communication Device 200 via Network NT, which are displayed on LCD 201 (FIG. 1) (S2). Based on the control signal produced by Communication Device 200, which is transferred via Network NT, Sub-host SH locks (or unlocks) the door (S3a), and/or sets the timer of the door lock (S3b). The sequence of S2 and S3 can be repeated (S4).

This paragraph [0113] illustrates the method of CCD Camera 810. In order to check the status of CCD Camera 810 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of CCD Camera 810, i.e., the status of the camera angle, zoom and pan, and the timer of CCD Camera 810 (S1), and returns the results to Communication Device 200 via Network NT, which are displayed on LCD 201 (FIG. 1) (S2). Based on the control signal produced by Communication Device 200, which is transferred via Network NT, Sub-host SH selects the camera angle (S3a), selects zoom or pan (S3b), and/or sets the timer of CCD Camera 810 (S3c). The sequence of S2 and S3 can be repeated (S4).

This paragraph [0114] illustrates the overall operation of Communication Device 200 regarding the remote controlling system and communication system. CPU 211 (FIG. 1) periodically checks the input signal from Input Device 210 (FIG. 1) (S1). If the input signal indicates that the remote controlling system is selected (S2), CPU 211 initiates the process for the remote controlling system (S3). On the other hand, if the input signal indicates that the communication system is selected (S4), CPU 211 initiates the process for the communication system (S5).

This paragraph [0115] is a further description of the communication performed between Sub-host SH and Door 809 which is described in paragraph [0112]. When Sub-host SH receives a check request signal as described in paragraph [0112], Sub-host SH sends a check status signal which is received by Controller 831 via Transmitter 830. Controller 831 checks the status of Door Lock 832 and sends back a response signal to Sub-host SH via Transmitter 830 in a wireless fashion indicating that Door Lock 832 is locked or unlocked. Upon receiving the response signal from Controller 832, Sub-host SH sends a result signal to Communication Device 200 in a wireless fashion as described in paragraph [0112]. When Sub-host SH receives a control signal from Communication Device 200 in a wireless fashion as described in paragraph [0112], it sends a door control signal which is received by Controller 831 via Transmitter 830. Controller 831 locks or unlocks Door Lock 832 in conformity with the door control signal. As another embodiment of the present invention, Controller 831 may owe the task of both Sub-host SH and itself and communicate directly with Communication Device 200 via Network NT.

As another embodiment of the present invention each equipment, i.e., TV 802, Microwave Oven 803, VCR 804, Bathroom 805, Room Light 806, AC 807, Heater 808, Door Lock 809, and CCD Camera 810, may carry a computer which directly administers its own equipment and directly communicates with Communication Device 200 via Network NT instead of Sub-host SH administering all pieces of equipment and communicate with Communication Device 200.

The above-mentioned invention is not limited to equipment installed in building 801 (paragraph [0105]), i.e., it is also applicable to the ones installed in all carriers in general, such as automobiles, airplanes, space shuttles, ships, motor cycles and trains.

<<Auto Emergency Calling System>>

Paragraph [0120] and paragraph [0121] illustrate the automatic emergency calling system utilizing Communication Device 200 (FIG. 1).

This paragraph [0120] illustrates the overall structure of the automatic emergency calling system. Communication Device 200 is connected to Network NT in a wireless fashion. Network NT may be the Internet or have the same or similar structure described in paragraph [0022], and/or paragraph [0024]. Network NT is connected to Automobile 835 thereby enabling Automobile 835 to communicate with Communication Device 200 in a wireless fashion. Emergency Center EC, a host computer, is also connected to Automobile 835 in a wireless fashion via Network NT. Airbag 838 which prevents persons in Automobile 835 from being physically injured or minimizes such injury in case traffic accidents occur is connected to Activator 840 which activates Airbag 838 when it detects an impact of more than certain level. Detector 837 sends an emergency signal via Transmitter 836 in a wireless fashion when Activator 840 is activated. The activation signal is sent to both Emergency Center EC and Communication Device 200. In lieu of Airbag 838 any equipment may be used so long as such equipment prevents from or minimizes physical injuries of the persons in Automobile 835.

This paragraph [0121] illustrates the overall process of the automatic emergency calling system. Detector 837 (paragraph [0120]) periodically checks the status of Activator 840 (paragraph [0120]) (S1). If the Activator 840 is activated (S2), Detector 837 transmits an emergency signal via Transmitter 836 in a wireless fashion (S3a). The emergency signal is transferred via Network NT and received by Emergency Center EC (paragraph [0120]) and by Communication Device 200 in a wireless fashion (S3b).

As another embodiment of the present invention, the power of Detector 837 (paragraph [0120]) may be usually turned off, and Activator 840 (paragraph [0120]) may turn on the power of Detector 837 by the activation of Activator 840 thereby enabling Detector 837 to send the emergency signal to both Emergency Center EC (paragraph [0120]) and to Communication Device 200 as described above.

This invention is also applicable to any carriers including airplanes, space shuttles, ships, motor cycles and trains.

<<3D Video Game Function>>

Paragraph [0126] through paragraph [0133] illustrate the video game function of Communication Device 200 (FIG. 1).

As described in this paragraph [0126] Host H includes Host Game Data Storage Area Ha. In Host Game Data Storage Area Ha, a plurality of game data are stored for downloading purposes. Games G1, G2, G3, and G4 are stored in Host Game Data Storage Area Ha.

This paragraph [0127] illustrates the sequence to initiate the game function. First of all, a list of modes is displayed on LCD 201 (FIG. 1) (S1). When an input signal is input by utilizing Input Device 210 (FIG. 1) or via voice recognition system to select a specific mode (S2), the selected mode is activated. The communication mode is activated (S3*a*) when the communication mode is selected in the previous step, the game download mode is activated (S3*b*) when the game download mode is selected in the previous step, and the game play mode is activated (S3*c*) when game play mode is selected in the previous step. The modes displayed on LCD 201 in S1 which are selected and activated in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4). Here, communication mode is a mode which enables Communication Device 200 to communicate (i.e., send and/or receive audio data, text data, image data, video data, and/or other types of data in a wireless fashion via Antenna 218) in a wireless fashion with other Communication Devices 200 or with other devices in the manner, for example, described in paragraph [0022], paragraph [0023], and paragraph [0024]. The same meaning applies hereinafter.

This paragraph [0128] illustrates the data stored in RAM 206 (FIG. 1). As described in this paragraph [0128], the data to activate (as described in S3*a* of the previous paragraph) and to perform the communication mode is stored in Communication Data Storage Area 2061*a*, the data to activate (as described in S3*b* of the previous paragraph) and to perform game download mode is stored in Game DL Data Storage Area 2061*b*, and the data to activate (as described in S3*c* of the previous paragraph) and to perform game play mode is stored in 2061*c*.

This paragraph [0129] illustrates the method of activating and deactivating the game mode by utilizing the voice recognition system explained hereinbefore. The voice recognition system is turned on, in the first place (S1), and the game mode is activated by utilizing the voice recognition system (S2). When utilizing the game mode is over, it is deactivated by utilizing the voice recognition system, and the system is turned off thereafter (S3).

This paragraph [0130] illustrates the sequence of downloading a game data, i.e., a game software program, from Host H (paragraph [0126]). A list of game data is displayed on LCD 201 (FIG. 1) (S1). When an input signal is input from Input Device 210 or by the voice recognition system to select a specific game data (S2), the selected game data is downloaded to Communication Device 200 and is stored in Game DL Data Storage Area 2061*b* (paragraph [0128]) (S3). The downloaded game data is decompressed thereafter by CPU 211 (FIG. 1).

This paragraph [0131] illustrates the data stored in Game Play Data Storage Area 2061*c* (paragraph [0128]). The decompressed game data are allocated to the predetermined areas, i.e., Game Software Storage Area 2061*d*, 3D Object Data Storage Area 2061*e*, Texture Data Storage Area 2061*f*, and Game Process Data Storage Area 2061*g*. Here, Game Software Storage Area 2061*d* stores a series of software program to perform the game function of Communication Device 200. 3D Object Data Storage Area 2061*e* stores the three-dimensional data of the three-dimensional objects displayed on LCD 201 (FIG. 1), such as the shape of each three-dimensional object in a polygon form (or in a wire frame form), and the three-dimensional data of all parts (components) of each three-dimensional object. Texture Data Storage Area 2061*f* stores a plurality of data of textures which are 'pasted' on each three-dimensional object (or on each part thereof) when such three-dimensional object is displayed on LCD 201. Game Process Data Storage Area 2061*g* stores a plurality of data necessary to process the game software program, such as the strength and speed of each three-dimensional object, the layout of the background displayed on LCD 201, the weather described in the game, the property of each shadow displayed adjacent to the three-dimensional object, the movement of the objects which are controllable by the user of Communication Device 200, and the movement of the objects which are not controllable by the user of Communication Device 200.

This paragraph [0132] illustrates the sequence of the game software program stored in Game Software Storage Area 2061*d* (paragraph [0131]). When the game mode is started by voice recognition system as described in S1 and S2 of paragraph [0129], the game initiation process is initiated by CPU 211 (FIG. 1) (S1). Here, CPU 211 reads, by following the instructions written in the game software program stored in Game Software Storage Area 2061*d*, all the address data stored in 3D Object Data Storage Area 2061*e*, Texture Data Storage Area 2061*f*, and Game Process Data Storage Area 2061*g* to promptly retrieve the required data to process the game when necessary. During the game initiation process, an initiation screen is displayed on LCD 201. Once the game is started, CPU 211 checks the status of the input signal from Input Device 210 (FIG. 1) or by the voice recognition system. If an input signal is detected (S2), a response to such input signal is processed by CPU 211 by retrieving data from Game Process Data Storage Area 2061*g* (paragraph [0131]) (S3). For example, if the input signal instructs to move forward the three-dimensional object, CPU 211 calculates the next action of its body parts (e.g., pushing forward its right leg) by retrieving data from Game Process Data Storage Area 2061*g*. CPU 211 also processes with the three-dimensional objects which are irrelevant to the input signal input from Input Device 210 by retrieving data from Game Process Data Storage Area 2061*g*, for example the background objects displayed on LCD 201 including, clouds, pedestrians, buildings, traffic lights, and bridges (S4). CPU 211 also calculates the three-dimensional data of each three-dimensional object and the three-dimensional data of all parts thereof in the three-dimensional game space by retrieving data from three-dimensional object Data Storage Area 2061*e* (S4). CPU 211 then retrieves the designated textures from Texture Data Storage Area 2061*f* (paragraph [0131]) and 'pastes' them to the three-dimensional objects (S4). The three-dimensional objects with textures 'pasted' are displayed on LCD 201 (S5). The sequence of S2 through S5 is repeated until the game is over (S6), and the game termination process, i.e., a process to terminate the game mode is initiated thereafter (S7).

This paragraph [0133] illustrates the process to allocate Input Device 210 (FIG. 1) to perform the game function. When the game initiation process is initiated as explained in S1 of paragraph [0132], the key allocation process is initiated simultaneously. As the result of the key allocation process, Input Device 210 normally utilized for communication purposes, including keypad and buttons, is allocated as input means for performing the game function. Key #1 is assigned for instructing CPU 211 to move up the three-dimensional object, Key #2 is assigned for instructing CPU 211 to move down the three-dimensional object, Key #3 is assigned for instructing CPU 211 to move left the three-dimensional object, Key #4 is assigned for instructing CPU 211 to move right the three-dimensional object, Key #5 is assigned for instructing CPU 211 to make the three-dimensional object to jump, and Key #6 is assigned for instructing CPU 211 to make the three-dimensional object to dash, and all the foregoing data are stored in Key Allocation Data Storage Area 2061*h*.

<<Voice Recognition Sys—E-mail (2)>>

Paragraph [0136] through paragraph [0141] illustrate the second embodiment of typing and sending e-mails by utilizing the voice recognition system.

This paragraph [0136] illustrates the sequence to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in paragraph [0127], and the e-mail producing mode is activated (S3c) when the e-mail producing mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph [0137] illustrates the data stored in RAM 206 (FIG. 1). The data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described in paragraph [0128], and the data to activate (as described in S3c of the previous paragraph) and to perform the e-mail producing mode is stored in E-mail Data Storage Area 2063a.

This paragraph [0138] illustrates the data stored in E-mail Data Storage Area 2063a. E-mail Data Storage Area 2063a includes E-mail Software Storage Area 2063b and E-mail Producing Data Storage Area 2063c. E-mail Software Storage Area 2063b stores software program to implement the e-mail producing mode, and E-mail Producing Data Storage Area 2063c stores a plurality of data regarding email, both of which are explained in details hereinafter.

This paragraph [0139] illustrates the method of activating and deactivating the e-mail producing mode by utilizing the voice recognition system explained hereinbefore. The voice recognition system is turned on, in the first place (S1), and the e-mail producing mode is activated by utilizing the voice recognition system (S2). When utilizing the e-mail producing mode is over, it is deactivated by utilizing the voice recognition system, and the system is turned off thereafter (S3).

This paragraph [0140] illustrates the sequence of the e-mail producing mode explained in paragraph [0139]. First of all, CPU 211 (FIG. 1), by operation of the software program stored in E-mail Software Storage Area 2063b (paragraph [0138]), displays on LCD 201 (FIG. 1) the items which the user of Communication Device 200 should fill in (S1). Here, the items displayed in the present example are the receiver's e-mail address, CC (carbon copy), subject of the e-mail, and the main body text of the e-mail. Next, one of these items is selected by the voice recognition system (S2). If the receiver's e-mail address is selected in the previous step, the user of Communication Device 200 inputs the receiver's e-mail address by utilizing Input Device 210 (FIG. 1) or via voice recognition system (S3a). If CC (carbon copy) is selected in the previous step, the user of Communication Device 200 inputs an e-mail address to which the e-mail is sent other than the receiver's e-mail address by utilizing the voice recognition system (S3b). If the subject of the e-mail is selected in the previous step, the user of Communication Device 200 inputs the subject of the e-mail by utilizing the voice recognition system (S3c). If the main body text of the e-mail is selected in the previous step, the user of Communication Device 200 inputs the main body text of the e-mail by utilizing the voice recognition system (S3d). The user of Communication Device 200 can fill in a portion of one item and go to another item, and come back to the previous one to finish filling out the item (S4). All the input data are stored in E-mail Producing Data Storage Area 2063c (paragraph [0138]).

This paragraph [0141] illustrates the sequence of inputting alphanumeric information to each item explained in paragraph [0140]. First of all, analog audio data is input via Microphone 215 (FIG. 1) (S1). Analog audio data is converted into digital audio data by A/D 213 (FIG. 1) (S2). The digital audio data is processed by Sound Processor 205 (FIG. 1) to convert the digital audio data in a CPU readable form (S3). Then CPU 211 (FIG. 1) retrieves alphanumeric information therefrom (S4), which is displayed on LCD 201 (FIG. 1) and emitted as sound data from Speaker 216 (FIG. 1) (S5). If the retrieved alphanumeric information is not correct (S6), the user can input the correct alphanumeric information manually by utilizing Input Device 210 (FIG. 1), such as a keypad or a dial pad, and the corrected alphanumeric information is displayed on LCD 201 and emitted as sound data from Speaker 216 (S7). The sequence of S1 through S7 is repeated until termination signal by utilizing the voice recognition system is input via Microphone 215 (S8).

The method of sending the produced e-mail is same as the one already explained in paragraph [0045].

<<Shooting Video Game Function>>

Paragraph [0186] through paragraph [0200] illustrate the shooting video game function of Communication Device 200 which enables the user to enjoy a 'shooting video game' by the implementation thereof.

This paragraph [0186] illustrates the typical image displayed on LCD 201 (FIG. 1) at the time the shooting video game function is implemented. Primarily four types of objects are displayed on LCD 201, i.e., CPU Controlled Object CCO, User Controlled Object UCO, User Fired Bullet UFB, and CPU Fired Bullet CFB. Here, CPU Controlled Object CCO is a three-dimensional object of which the movement is controlled by CPU 211 (FIG. 1) and which is not controllable by the operation of the user of Communication Device 200. CPU Controlled Object CCO is primarily programmed to 'attack' User Controlled Object UCO. In the example described in this paragraph [0186], two CPU Controlled Object CCOs are displayed on LCD 201. User Controlled Object UCO is a three-dimensional object of which the movement is controlled by user of Communication Device 200. User Fired Bullet UFB is a three-dimensional object which is fired from User Controlled Object UCO to primarily 'attack' CPU Controlled Object CCO or defend User Controlled Object UCO therefrom. User Fired Bullet UFB is fired by the operation of the user of Communication Device 200. CPU Fired Bullet CFB is a three-dimensional object which is fired from CPU Controlled Object CCO to primarily 'attack' User Controlled Object UCO or defend CPU Controlled Object CCO therefrom. CPU Fired Bullet CFB is fired under the operation of CPU 211 and is not controllable by the operation of the user of Communication Device 200.

This paragraph [0187] illustrates the data transferred from Host H (paragraph [0126]) to Communication Device 200, i.e., Transferred Shooting Game Data TSGD in a wireless fashion, which is stored in Game DL Data Storage Area 2061*b* (paragraph [0128]). Transferred Shooting Game Data TSGD is primarily composed of Header TSGD1, Shooting Video Game Program TSGD2, Object Image Data TSGD3, Background Image Data TSGD4, Sound Data TSGD5, and Footer TSGD6. Here, Shooting Video Game Program TSGD2 is a package of software programs which is decompressed and stored in Game Software Storage Area 2061*d* (paragraph [0131]) wherein each software program is explained in details in paragraph [0189] through paragraph [0200]. Object Image Data TSGD3 is a package of data regarding the three-dimensional objects, such as CPU Controlled Object CCO, User Controlled Object UCO, User Fired Bullet UFB, and CPU Fired Bullet CFB described in paragraph [0186]. Background Image Data TSGD4 is a package of data regarding the two-dimensional and/or three-dimensional image data to display Background BKG described in paragraph [0186]. Sound data TSGD5 is a package of sound data which is designed to be output from Speaker 216 (FIG. 1). Header TSGD1 and Footer TSGD6 represent the beginning and end of Transferred Shooting Game Data TSGD respectively.

Paragraph [0126] through paragraph [0131], and paragraph [0133] apply to implement the shooting video game function. More precisely, the present function is one of the games stored in Host Game Data Storage Area Ha (paragraph [0126]) which is selected and downloaded as described in paragraph [0130].

Paragraph [0133] and this paragraph [0189] illustrate the process to allocate Input Device 210 (FIG. 1) to implement the shooting video game function. As described in this paragraph [0133], when the game initiation process is initiated as explained in S1 of paragraph [0132], the key allocation process is initiated simultaneously. As the result of the key allocation process, Input Device 210 normally utilized for communication purposes, including a keypad and buttons, is allocated as input means for performing the shooting video game function. Key #1 is assigned for instructing CPU 211 (FIG. 1) to move up User Controlled Object UCO (paragraph [0186]), Key #2 is assigned for instructing CPU 211 to move down User Controlled Object UCO, Key #3 is assigned for instructing CPU 211 to move forward User Controlled Object UCO, Key #4 is assigned for instructing CPU 211 to move backward User Controlled Object UCO, and Key #5 is assigned for instructing CPU 211 to fire User Fired Bullet UFB, and all the foregoing data are stored in Key Allocation Data Storage Area 2061*h*.

This paragraph [0190] illustrates the overall process of the software program stored in Game Software Storage Area 2061*d* (paragraph [0131]). CPU 211 (FIG. 1) displays one or more of CPU Controlled Object CCOs (paragraph [0186]) on LCD 201 (FIG. 1) (S1). CPU 211 displays CPU Controlled Object CCO by retrieving the three-dimensional data regarding its shape and all parts thereof stored in 3D Object Data Storage Area 2061*e* (paragraph [0131]), and by 'pasting' the relevant textures thereto stored in Texture Data Storage Area 2061*f* (paragraph [0131]). User Controlled Object UCO (paragraph [0186]) (S2) and Background BKG (paragraph [0186]) (S3) are also displayed on LCD 201 in the same manner by retrieving data from 3D Object Data Storage Area 2061*e* and Texture Data Storage Area 2061*f*.

This paragraph [0191] illustrates the software program stored in Game Software Storage Area 2061*d* (paragraph [0131]) to move User Controlled Object UCO (paragraph [0186]) displayed on LCD 201 (FIG. 1). First of all, the user of Communication Device 200 manipulates Input Device 210 (FIG. 1), and the input control signal produced therefrom is transferred to CPU 211 (FIG. 1) (S1). CPU 211 then moves User Controlled Object UCO displayed on LCD 201 in accordance to the input control signal by referring to Key Allocation Data Storage Area 2061*h* (paragraph [0189]) (S2). For example, CPU 211 moves up User Controlled Object UCO (paragraph [0186]) when the input control signal representing Key #1 is transferred to CPU 211, CPU 211 moves down User Controlled Object UCO (paragraph [0186]) when the input control signal representing Key #2 is transferred to CPU 211, CPU 211 moves forward User Controlled Object UCO (paragraph [0186]) when the input control signal representing Key #3 is transferred to CPU 211, and CPU 211 moves backward User Controlled Object UCO (paragraph [0186]) when the input control signal representing Key #4 is transferred to CPU 211.

This paragraph [0192] illustrates the software program stored in Game Software Storage Area 2061*d* (paragraph [0131]) to move CPU Controlled Object CCO (paragraph [0186]) displayed on LCD 201 (FIG. 1). CPU 211 (FIG. 1) moves CPU Controlled Object CCO in the predetermined manner written in Game Software Storage Area 2061*d* (S1). Unlike User Controlled Object UCO (paragraph [0186]), CPU Controlled Object CCO is not controllable by the operation of the user of Communication Device 200.

This paragraph [0193] illustrates the software program stored in Game Software Storage Area 2061*d* (paragraph [0131]) to display User Fired Bullet UFB (paragraph [0186]) on LCD 201 (FIG. 1). First of all, the user of Communication Device 200 manipulates Input Device 210 (FIG. 1) and the input firing signal produced therefrom is transferred to CPU 211 (FIG. 1) (S1). CPU 211 then initiates the user fired bullet process which is explained in details in paragraph [0194] hereinafter (S2).

This paragraph [0194] illustrates the user fired bullet process described in S2 of paragraph [0193]. When user fired bullet process is initiated, CPU 211 (FIG. 1), first of all, determines the direction of User Fired Bullet UFB (paragraph [0186]) to which it is fired (S1). CPU 211 then displays User Fired Bullet UFB on LCD 201 (FIG. 1) (S2), and moves it with the predetermined velocity to the direction determined in S1 (S3).

This paragraph [0195] illustrates the software program stored in Game Software Storage Area 2061*d* (paragraph [0131]) to determine whether User Fired Bullet UFB (paragraph [0186]) has hit one of CPU Controlled Object CCOs (paragraph [0186]) displayed on LCD 201 (FIG. 1). First of all, CPU 211 (FIG. 1) calculates the current position of User Fired Bullet UFB (S1), and then calculates the current position of each of CPU Controlled Object CCO (S2). If the two values produced from S1 and S2 match (S3), CPU 211 initiates the hit program of which the details are explained in paragraph [0196] hereinafter (S4).

This paragraph [0196] illustrates the hit program described in S4 of paragraph [0195]. When hit program is initiated, CPU 211 (FIG. 1), first of all, displays an explosion image on LCD 201 (FIG. 1) by reading the three-dimensional data of User Fired Bullet UFB from 3D Object Data Storage Area 2061*e* (paragraph [0131]) and by 'pasting' the relevant textures thereto stored in Texture Data Storage Area 2061*f* (paragraph [0131]) (S1). Next, CPU 211 erases the image of CPU Controlled Object CCO (paragraph [0186]) from LCD 201 (S2), and also the explosion image thereafter (S3).

This paragraph [0197] illustrates the software program stored in Game Software Storage Area 2061*d* (paragraph [0131]) to display CPU Fired Bullet CFB (paragraph [0186]) on LCD 201 (FIG. 1). S1 of paragraph [0193] (i.e., the user of Communication Device 200 manipulating Input Device 210 (FIG. 1) and the input firing signal produced therefrom being transferred to CPU 211 (FIG. 1)) is omitted when CPU Controlled Object CCO (paragraph [0186]) fires CPU Fired Bullet CFB. CPU 211 (FIG. 1) initiates the CPU fired bullet process which is explained in details in paragraph [0198] hereinafter (S1).

This paragraph [0198] illustrates the CPU fired bullet process described in S1 of paragraph [0197]. When CPU Fired Bullet CFB (paragraph [0186]) process is initiated, CPU 211 (FIG. 1), first of all, determines the direction of CPU Fired Bullet CFB to which it is fired (S1). CPU 211 then displays CPU Fired Bullet CFB on LCD 201 (FIG. 1) (S2), and moves it with the predetermined velocity to the direction determined in S1 (S3).

This paragraph [0199] illustrates the software program stored in Game Software Storage Area 2061*d* (paragraph [0131]) to determine whether CPU Fired Bullet CFB (paragraph [0186]) has hit User Controlled Object UCO (paragraph [0186]) displayed on LCD 201 (FIG. 1). First of all, CPU 211 (FIG. 1) calculates the current position of CPU Fired Bullet CFB (S1), and then calculates the current position of User Controlled Object UCO (S2). If the two values produced from S1 and S2 match (S3), CPU 211 initiates the hit program of which the details are explained in paragraph hereinafter (S4).

This paragraph [0200] illustrates the hit program described in S4 of paragraph [0199]. When hit program is initiated, CPU 211 (FIG. 1), first of all, displays an explosion image on LCD 201 (FIG. 1) by reading the three-dimensional data of CPU Fired Bullet CFB from 3D Object Data Storage Area 2061*e* (paragraph [0131]) and by 'pasting' the relevant textures thereto stored in Texture Data Storage Area 2061*f* (paragraph [0131]) (S1). Next, CPU 211 erases the image of User Controlled Object UCO (paragraph [0186]) from LCD 201 (S2), and also the explosion image thereafter (S3).

<<Driving Video Game Function>>

Paragraph [0203] through paragraph [0214] illustrate the driving video game function of Communication Device 200. The user of Communication Device 200 is enabled to enjoy a 'driving video game' by the implementation of this function.

This paragraph [0203] illustrates the typical image displayed on LCD 201 (FIG. 1) at the time the driving video game function is implemented. Primarily two types of cars are displayed on LCD 201, i.e., CPU Controlled Car CCC and User Controlled Car UCC. Here, CPU Controlled Car CCC is a three-dimensional image of a car of which the movement is controlled by CPU 211 (FIG. 1) and which is not controllable by the operation of the user of Communication Device 200. CPU Controlled Car CCC is primarily programmed to race with User Controlled Car UCC. Two CPU Controlled Car CCCs are displayed on LCD 201. User Controlled Car UCC is a three-dimensional image of a car of which the movement is controlled by the user of Communication Device 200. In this paragraph [0203], Street Image STIm is a series of images of the circuit on which both CPU Controlled Car CCC and User Controlled Car UCC are programmed to travel. Background Image BGIm is a series of images of the background displayed on LCD 201, such as, but not limited to, spectators, clouds, and trees.

This paragraph [0204] illustrates the data transferred from Host H to Communication Device 200, i.e., Transferred Driving Game Data TDGD in a wireless fashion, which is stored in Game DL Data Storage Area 2061*b* (paragraph [0128]). Transferred Driving Game Data TDGD is primarily composed of Header TDGD1, Driving Video Game Program TDGD2, Driving Video Game Parameter TDGD3, Object Image Data TDGD4, Background Image Data TDGD5, Street Image Data TDGD6, Sound Data TDGD7, and Footer TDGD8. Here, Driving Video Game Program TDGD2 is a package of software programs which is decompressed and stored in Game Software Storage Area 2061*d* (paragraph [0131]) wherein each software program is explained in details hereinafter. Driving Video Game Parameter TDGD3 is a package of parameters which is decompressed and stored in Game Process Data Storage Area 2061*g* (paragraph [0131]). Object Image data TDGD4 is a package of data regarding the three-dimensional objects, such as CPU Controlled Object CCO and User Controlled Object UCO described in paragraph [0203]. Background Image Data TDGD5 is a package of data regarding the two-dimensional and/or three-dimensional image data to display Background Image BGIm (paragraph [0203]), such as spectators, clouds, and trees. Street Image Data TDGD6 is a package of data regarding the two-dimensional and/or three-dimensional image data to display the surface of the circuit, Street Image STIm (paragraph [0203]), on which CPU Controlled Car CCC (paragraph [0203]) and User Controlled Car UCC (paragraph [0203]) travel. Header TDGD1 and Footer TDGD8 represent the beginning and end of Transferred Driving Game Data TDGD respectively.

Paragraph [0126] through paragraph [0131], and paragraph [0133] apply to implement the driving video game function. More precisely, the present function is one of the games stored in Host Game Data Storage Area Ha (paragraph [0126]).

This paragraph [0206] illustrates the data stored in Game Process Data Storage Area 2061*g* (paragraph [0131]). Game Process Data Storage Area 2061*g* includes three storage areas, i.e., CPU Controlled Car Parameter Storage Area 2061*g*1, Street Parameter Storage Area 2061*g*2, and Background Parameter Storage Area 2061*g*3. CPU Controlled Car Parameter Storage Area 2061*g*1 stores a set of parameters for each CPU Controlled Car CCC (paragraph [0203]) displayed on LCD 201 (FIG. 1), such as the maximum speed and the cornering capability thereof. Street parameter storage Area 2061*g*2 stores a set of parameters regarding the road condition of the circuit, i.e., Street Image STIm (paragraph [0203]) displayed on LCD 201. For example, some sections of the circuit are slippery due to the parameter which makes the user of Communication Device 200 difficult to steer the wheel of User Controlled Car UCC (paragraph [0203]). Background parameter storage Area 2061*g*3 stores a set of parameters regarding the Background Image BGIm (paragraph [0203]), such as the climate, the number of spectators, the number of clouds, and the number of trees displayed on LCD 201.

Paragraph [0133] and this paragraph [0207] illustrate the process to allocate Input Device 210 (FIG. 1) to implement the driving video game function. As described in paragraph [0133], when the game initiation process is initiated as explained in S1 of paragraph [0132], the key allocation process is initiated simultaneously. As the result of the key allocation process, Input Device 210 normally utilized for communication purposes, including keypad and buttons, is allocated as input means for performing the game function. Key #1 is assigned for instructing CPU 211 (FIG. 1) to move up User Controlled Car UCC (paragraph [0203]), Key #2 is assigned for instructing CPU 211 to move down User Controlled Car UCC, Key #3 is assigned for instructing CPU 211 to move forward User Controlled Car UCC, Key #4 is assigned for instructing CPU 211 to move backward User Controlled Car UCC, Key #5 is assigned for instructing CPU 211 to increase the traveling speed of User Controlled Car UCC, and Key #6 is assigned for instructing CPU 211 to decrease the traveling speed of User Controlled Car UCC, and all the foregoing data are stored in Key Allocation Data Storage Area 2061h (paragraph [0133]).

This paragraph [0208] illustrates the overall process of the driving video game function of Communication Device 200. CPU 211 (FIG. 1) performs the user controlled car process (S1), the CPU controlled car process for all CPU Controlled Car CCCs (paragraph [0203]) displayed on LCD 201 (FIG. 1) (S2), the street image process (S3), and the background image process (S4). The details of each process are explained in paragraph [0209] through paragraph [0212] respectively.

This paragraph [0209] illustrates the details of the user controlled car process explained in S1 of paragraph [0208]. First of all, the user of Communication Device 200 manipulates the operation of User Controlled Car UCC (paragraph [0203]) displayed on LCD 201 (FIG. 1) by Input Device 210 (FIG. 1) or via voice recognition system, and the input control signal produced therefrom is transferred to CPU 211 (FIG. 1) (S1). Upon receiving the input control signal, CPU 211 refers to Key Allocation Data Storage Area 2061h (paragraph [0207]) and determines the speed and the direction of User Controlled Car UCC (S2), and displays the image of User Controlled Car UCC on LCD 201 perceived from a predetermined view point (S3).

This paragraph [0210] illustrates the details of the CPU controlled car process explained in S2 of paragraph [0208]. First of all, CPU 211 (FIG. 1) periodically refers to CPU Controlled Car Parameter Storage Area 2061g1 (paragraph [0206]) (S1), and determines the speed and the direction of CPU Controlled Car CCC (paragraph [0203]) (S2). CPU 211 then displays the image of CPU Controlled Car CCC on LCD 201 perceived from a predetermined view point (S3). The process from S1 through S3 explained in this paragraph [0210] is performed for each CPU Controlled Car CCC (paragraph [0203]).

This paragraph [0211] illustrates the details of the street image process explained in S3 of paragraph [0208]. First of all, CPU 211 (FIG. 1) periodically refers to Street Parameter Storage Area 2061g2 (paragraph [0206]) (S1), and determines the current road condition by the parameter stored therein (S2). CPU 211 then displays, in accordance with the parameter, Street Image STIm (paragraph [0203]) on LCD 201 (FIG. 1) perceived from a predetermined view point (S3).

This paragraph [0212] illustrates the details of the background image process explained in S4 of paragraph [0208]. First of all, CPU 211 (FIG. 1) periodically refers to Background Parameter Storage Area 2061g3 (paragraph [0206]) (S1), and determines the current layout of Background Image BGIm (paragraph [0203]) by the parameter stored therein (S2). CPU 211 then displays, in accordance with the parameter, Background Image BGIm (paragraph [0203]) on LCD 201 (FIG. 1) perceived from a predetermined view point (S3).

This paragraph [0213] illustrates another embodiment of the present function which enables to display on LCD 201 (FIG. 1) User Controlled Car UCC (paragraph [0203]) and CPU Controlled Car CCC (paragraph [0203]) from a different view point. User Controlled Car UCC and CPU Controlled Car CCC are viewed from the upper side whereas both objects are viewed from the rear side in the example described in paragraph [0203]. The view point is selected by Input Device 210 (FIG. 1) or via voice recognition system.

This paragraph [0214] illustrates the process to select the view point. As described in this paragraph [0214], an input view selection signal is input by Input Device 210 (FIG. 1) or via voice recognition system (S1), and CPU 211 (FIG. 1) changes the view point in accordance with the input view selection signal (S2). As a result of such selection, the displaying process described in S3 of paragraph [0209] (displaying User Controlled Car UCC (paragraph [0203])), S3 of paragraph (displaying CPU Controlled Car CCC (paragraph [0203])), S3 of paragraph [0211] (displaying Street Image STIm), and S4 of paragraph [0212] (displaying Background Image BGIm) are performed respectively from the view point determined in S2.

<<Word Processing Function>>

Paragraph [0217] through paragraph [0230] illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

This paragraph [0217] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in paragraph [0127], and the word processing function is activated (S3c) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph [0218] illustrates the data stored in RAM 206 (FIG. 1). As described in this paragraph [0218], the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described in paragraph [0128], and the data to activate (as described in S3c of the previous paragraph) and to perform the word processing function is stored in Word Processing Information Storage Area 20617a.

This paragraph [0219] illustrates the data stored in Word Processing Information Storage Area 20617a (paragraph [0218]). Word Processing Information Storage Area 20617a includes Word Processing Software Storage Area 20617*b* and Word Processing Data Storage Area 20617*c*. Word processing Software Storage Area 20617*b* stores the software programs described in paragraph [0220] hereinafter, and Word Processing Data Storage Area 20617*c* stores a plurality of data described in paragraph [0221] hereinafter.

This paragraph [0220] illustrates the software programs stored in Word Processing Software Storage Area 20617*b* (paragraph [0219]). Word Processing Software Storage Area 20617*b* stores Alphanumeric Data Input Software 20617*b*1, Bold Formatting Software 20617*b*2, Italic Formatting Software 20617*b*3, Image Pasting Software 20617*b*4, Font Formatting Software 20617*b*5, Spell Check Software 20617*b*6, Underlining Software 20617*b*7, Page Numbering Software 20617*b*8, and Bullets And Numbering Software 20617*b*9. Alphanumeric Data Input Software 20617*b*1 inputs to a document a series of alphanumeric data in accordance to the input signals produced by utilizing Input Device 210 (FIG. 1) or via voice recognition system. Bold Formatting Software 20617*b*2 implements the bold formatting function which makes the selected alphanumeric data bold of which the sequence is described in paragraph [0223]. Italic Formatting Software 20617*b*3 implements the italic formatting function which makes the selected alphanumeric data italic of which the sequence is described in paragraph [0224]. Image Pasting Software 20617*b*4 implements the image pasting function which pastes the selected image to a document to the selected location of which the sequence is described in paragraph [0225]. Font Formatting Software 20617*b*5 implements the font formatting function which changes the selected alphanumeric data to the selected font of which the sequence is described in paragraph [0226]. Spell Check Software 20617*b*6 implements the spell check function which fixes spelling and grammatical errors of the alphanumeric data in a document of which the sequence is described in paragraph [0227]. Underlining Software 20617*b*7 implements the underlining function which adds the selected underlines to the selected alphanumeric data of which the sequence is described in paragraph [0228]. Page Numbering Software 20617*b*8 implements the page numbering function which adds page numbers at the selected location to each page of a document of which the sequence is described in paragraph [0229]. Bullets And Numbering Software 20617*b*9 implements the bullets and numbering function which adds the selected type of bullets and numbers to the selected paragraphs of which the sequence is described in paragraph [0230].

This paragraph [0221] illustrates the data stored in Word Processing Data Storage Area 20617*c* (paragraph [0219]). Word Processing Data Storage Area 20617*c* includes Alphanumeric Data Storage Area 20617*c*1, Bold Formatting Data Storage Area 20617*c*2, Italic Formatting Data Storage Area 20617*c*3, Image Data Storage Area 20617*c*4, Font Formatting Data Storage Area 20617*c*5, Spell Check Data Storage Area 20617*c*6, Underlining Data Storage Area 20617*c*7, Page Numbering Data Storage Area 20617*c*8, and Bullets And Numbering Data Storage Area 20617*c*9. Alphanumeric Data Storage Area 20617*c*1 stores the basic text and numeric data which are not decorated by bold and/or italic (the default font may be courier new). Bold Formatting Data Storage Area 20617*c*2 stores the text and numeric data which are decorated by bold. Italic Formatting Data Storage Area 20617*c*3 stores the text and numeric data which are decorated by italic. Image Data Storage Area 20617*c*4 stores the data representing the location of the image data pasted in a document and the image data itself. Font Formatting Data Storage Area 20617*c*5 stores a plurality of types of fonts, such as arial, century, courier new, tahoma, and times new roman, of all text and numeric data stored in Alphanumeric Data Storage Area 20617*c*1. Spell check Data Storage Area 20617*c*6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617*c*7 stores a plurality of data representing underlines of different types. Page Numbering Data Storage Area 20617*c*8 stores the data representing the location of page numbers to be displayed in a document and the page number of each page of a document. Bullets And Numbering Data Storage Area 20617*c*9 stores a plurality of data representing different types of bullets and numbering and the location which they are added.

This paragraph [0222] illustrates the sequence of the software program stored in Alphanumeric Data Input Software 20617*b*1. A plurality of alphanumeric data is input by utilizing Input Device 210 (FIG. 1) or via voice recognition system (S1). The corresponding alphanumeric data is retrieved from Alphanumeric Data Storage Area 20617*c*1 (paragraph [0221]) (S2), and the document including the alphanumeric data retrieved in S2 is displayed on LCD 201 (FIG. 1) (S3).

This paragraph [0223] illustrates the sequence of the software program stored in Bold Formatting Software 20617*b*2. One or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617*c*2 (paragraph [0221]) (S3), and replaces the alphanumeric data selected in S1 with the bold formatting data retrieved in S3 (S4). The document with the replaced bold formatting data is displayed on LCD 201 thereafter (S5).

This paragraph [0224] illustrates the sequence of the software program stored in Italic Formatting Software 20617*b*3. One or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617*c*3 (paragraph [0221]) (S3), and replaces the alphanumeric data selected in S1 with the italic formatting data retrieved in S3 (S4). The document with the replaced italic formatting data is displayed on LCD 201 thereafter (S5).

This paragraph [0225] illustrates the sequence of the software program stored in Image Pasting Software 20617*b*4. The image to be pasted is selected by utilizing Input Device 210 (FIG. 1) or via voice recognition system (S1). Here, the image may be of any type, such as JPEG, GIF, and TIFF. Next the location in a document where the image is to be pasted is selected by utilizing Input Device 210 or via voice recognition system (S2). The data representing the location is stored in Image Pasting Data Storage Area 20617*c*4 (paragraph [0221]). The image is pasted at the location selected in S2 and the image is stored in Image Pasting Data Storage Area 20617*c*4 (S3). The document with the pasted image is displayed on LCD 201 (FIG. 1) thereafter (S4).

This paragraph [0226] illustrates the sequence of the software program stored in Font Formatting Software 20617*b*5. One or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617c5 (paragraph [0221]) (S3), and replaces the alphanumeric data selected in S1 with the font formatting data retrieved in S3 (S4). The document with the replaced font formatting data is displayed on LCD 201 thereafter (S5).

This paragraph [0227] illustrates the sequence of the software program stored in Spell Check Software 20617b6. CPU 211 (FIG. 1) scans all alphanumeric data in a document (S1). CPU 211 then compares the alphanumeric data with the spell check data stored in Spell Check Data Storage Area 20617c6 (paragraph [0221]), i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4).

This paragraph [0228] illustrates the sequence of the software program stored in Underlining Software 20617b7. One or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617c7 (paragraph [0221]) (S3), and adds to the alphanumeric data selected in S1 (S4). The document with underlines added to the selected alphanumeric data is displayed on LCD 201 thereafter (S5).

This paragraph [0229] illustrates the sequence of the software program stored in Page Numbering Software 20617b8. A page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617c8 (paragraph [0221]), and adds the page number to each page of a document at the selected location (S3). The document with page numbers is displayed on LCD 201 thereafter (S4). This paragraph [0230] illustrates the sequence of the software program stored in Bullets And Numbering Software 20617b9. A paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617c9 (paragraph [0221]), and adds the bullets and/or numbering to the selected paragraph of a document (S3). The document with the bullets and/or numbering is displayed on LCD 201 thereafter (S4).

<<TV Remote Controller Function>>

Paragraph [0233] through paragraph [0253] illustrate the TV remote controller function which enables Communication Device 200 to be utilized as a TV remote controller. This paragraph [0233] illustrates the connection between Communication Device 200 and TV 802. Communication Device 200 is connected in a wireless fashion to Network NT, such as the Internet, and Network NT is connected to TV 802 in a wireless fashion. Communication Device 200 may be connected to TV 802 via one or more of artificial satellites, for example, in the manner described in paragraph [0022], paragraph [0023], and paragraph [0024]. Communication Device 200 may also be connected to TV 802 via Sub-host as described in paragraph [0105].

This paragraph [0234] illustrates another embodiment of connecting Communication Device 200 with TV 802. Communication Device 200 may directly connect to TV 802 in a wireless fashion. Here, Communication Device 200 may utilize Antenna 218 (FIG. 1) and/or LED 219 as described in paragraph [0239] hereinafter to be connected with TV 802 in a wireless fashion.

This paragraph [0235] illustrates the connection between Communication Device 200 and TV Server TVS. Communication Device 200 is connected in a wireless fashion to Network NT, such as the Internet, and Network NT is connected to TV Server TVS in a wireless fashion. Communication Device 200 may be connected to TV Server TVS via one or more of artificial satellites and/or TV Server TVS may be carried by an artificial satellite, for example, in the manner described in paragraph [0022], paragraph [0023], and paragraph [0024].

This paragraph [0236] illustrates the data stored in TV Server TVS (paragraph [0235]). TV Server TVS includes TV Program Information Storage Area H18b of which the details are explained in paragraph [0237] hereinafter, and TV Program Listing Storage Area H18c of which the details are explained in paragraph [0238] hereinafter.

This paragraph [0237] illustrates the data stored in TV Program Information Storage Area H18b (paragraph [0236]). TV Program Information Storage Area H18b includes five types of data: 'CH', 'Title', 'Sum', 'Start', 'Stop', and 'Cat'. Here, 'CH' represents the channel number of the TV programs available on TV 802 (paragraph [0234]); 'Title' represents the title of each TV program; 'Sum' represents the summary of each TV program; 'Start' represents the starting time of each TV program; 'Stop' represents the ending time of each TV program, and 'Cat' represents the category to which each TV program pertains.

This paragraph [0238] illustrates the data stored in TV Program Listing Storage Area H18c (paragraph [0236]). TV Program Listing Storage Area H18c includes four types of data: 'CH', 'Title', 'Start', and 'Stop'. Here, 'CH' represents the channel number of the TV programs available on TV 802 (paragraph [0234]); 'Title' represents the title of each TV program; 'Start' represents the starting time of each TV program; and 'Stop' represents the ending time of each TV program. The data stored in TV Program Listing Storage Area H18c are designed to be 'clipped' and to be displayed on LCD 201 (FIG. 1) of Communication Device 200 in the manner described in paragraph [0248] and paragraph [0250]. As another embodiment, TV Program Listing Storage Area H18c may be combined with TV Program Information Storage Area H18b (paragraph [0237]) and extract the data of 'CH', 'Title', 'Start', and 'Stop' therefrom.

This paragraph [0239] illustrates the elements of Communication Device 200. The elements of Communication Device 200 is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph [0240] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in paragraph [0127], and the TV remote controller function is activated (S3c) when the TV remote controller function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph [0241] illustrates the data stored in RAM 206 (FIG. 1). The data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described in paragraph [0128], and the data to activate (as described in S3c of the previous paragraph) and to perform the TV remote controller function is stored in TV Remote Controller Information Storage Area 20618a.

This paragraph [0242] illustrates the data stored in TV Remote Controller Information Storage Area 20618a. TV Remote Controller Information Storage Area 20618a includes TV Remote Controller Software Storage Area 20618b and TV Remote Controller Data Storage Area 20618c. TV Remote Controller Software Storage Area 20618b stores a plurality of software programs to implement the present function, such as the ones described in paragraph [0245], paragraph [0247], paragraph [0249], paragraph [0251], and paragraph [0253], and TV Remote Controller Data Storage Area 20618c stores a plurality of data to implement the present function such as the ones described in paragraph [0243] hereinafter.

This paragraph [0243] illustrates the data stored in TV Remote Controller Data Storage Area 20618c (paragraph [0242]). TV Remote Controller Data Storage Area 20618c includes, Channel List Data Storage Area 20618c1, TV Program Information Storage Area 20618c2, and TV Program Listing Storage Area 20618c3. Channel list Data Storage Area 20618c1 stores a list of channel numbers available on TV 802 (paragraph [0234]). TV Program Information Storage Area 20618c2 stores the data transferred from TV Program Information Storage Area H18b of TV Server TVS (paragraph [0236]). The data stored in TV Program Information Storage Area 20618c2 is identical to the ones stored in TV Program Information Storage Area H18b or may be the portion thereof. TV Program Listing Storage Area 20618c3 stores the data transferred from TV Program Listing Storage Area H18c of TV Server TVS. The data stored in TV Program Listing Storage Area 20618c3 is identical to the ones stored in TV Program Listing Storage Area H18c or may be the portion thereof.

This paragraph [0244] illustrates the Channel Numbers 20118a displayed on LCD 201 (paragraph [0239]). Ten channel numbers are displayed on LCD 201, i.e., channel numbers '1' through '10'. The highlighted Channel Number 20118a is the one which is currently displayed on TV 802 (paragraph [0234]). In the present example, channel number 20188a '4' is highlighted, therefore, Channel 4 is currently shown on TV 802.

This paragraph [0245] illustrates one of the software programs stored in TV Remote Controller Software Storage Area 20618b (paragraph [0242]) to display and select Channel Number 20118a (paragraph [0244]). CPU 211 (paragraph [0239]) displays a channel list comprising a plurality of Channel Numbers 20118a on LCD 201 (paragraph [0239]) (S1). In the example described in paragraph [0243], ten channel numbers are displayed on LCD 201, i.e., channel numbers '1' through '10'. The user of Communication Device 200 inputs a channel selecting signal by utilizing Input Device 210 (paragraph [0239]) or via voice recognition system (S2). CPU 211 highlights the selected channel in the manner described in paragraph [0244] (S3), and sends to TV 802 (paragraph [0234]) via LED 209 in a wireless fashion the TV channel signal (S4). The TV program of Channel 4 is displayed on TV 802 (paragraph [0234]) thereafter.

This paragraph [0246] illustrates TV Program Information 20118c displayed on LCD 201 (paragraph [0239]). When the user of Communication Device 200 inputs a specific signal utilizing Input Device 210 (paragraph [0239]) or via voice recognition system, TV Program Information 20118c currently shown on Channel Number 20118b selected in S2 of paragraph [0245] is displayed on LCD 201. TV Program Information 20118c includes Channel Number 20118b, 'Title', 'Summary', 'Start Time', 'Stop Time', and 'Category'. Here, Channel Number 20118b represents the channel number of the TV program currently shown on Channel Number 20118b (i.e., the channel number selected in S2 of paragraph [0245]), 'Title' represents the title of the TV program currently shown on Channel Number 20118b, 'Summary' represents the summary of the TV program currently shown on Channel Number 20118b, 'Start Time' represents the starting time of the TV program currently shown on Channel Number 20118b, 'Stop Time' represents the ending time of the TV program currently shown on Channel Number 20118b, and 'Category' represents the category to which the TV program currently shown on Channel Number 20118b pertains.

This paragraph [0247] illustrates one of the software programs stored in TV Remote Controller Software Storage Area 20618b (paragraph [0242]) which displays TV Program Information 20118c (paragraph [0246]) on LCD 201 (paragraph [0239]). When the user of Communication Device 200 selects the TV program information display mode by utilizing Input Device 210 (paragraph [0239]) or via voice recognition system (S1), CPU 211 (paragraph [0239]) accesses TV Server TVS (paragraph [0235]) and retrieves the data (i.e., 'Title', 'Summary', 'Start Time', 'Stop Time', and 'Category' described in paragraph [0246]) of TV program currently shown on Channel Number 20118b (paragraph [0246]) from TV Program Information Storage Area H18b (paragraph [0237]) (S2), and displays as TV Program Information 20118c on LCD 201 as described in paragraph [0246] (S3). TV Program Information 20118c may be web-based.

This paragraph [0248] illustrates TV Program Listing 20118d displayed on LCD 201 (FIG. 1). 'PRn' represents a title of a TV program, and 'CHn' represents Channel Number 20118a. TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on Channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (paragraph [0239]) is selected by way of moving the cursor displayed thereon by utilizing Input Device 210 (paragraph [0239]) or via voice recognition system. In the present example, the cursor is located on TV Program Pr 2.

This paragraph [0249] illustrates one of the software programs stored in TV Remote Controller Software Storage Area 20618b (paragraph [0242]) which displays TV Program Listing 20118d (paragraph [0248]) on LCD 201 (paragraph [0239]). When the user of Communication Device 200 selects TV program listing display mode by utilizing Input Device 210 (paragraph [0239]) or via voice recognition system (S1), CPU 211 (paragraph [0239]) accesses TV Server TVS (paragraph [0235]) and retrieves data (i.e., 'Title', 'Start Time', and 'Stop Time') from TV Program Listing Storage Area H18c (paragraph [0238]) (S2), and displays TV Program Listing 20118d (paragraph [0248]) on LCD 201 (S3). TV Program Listing 20118d may be web-based.

This paragraph [0250] illustrates Program Listing 20118d displayed on LCD 201 (FIG. 1) which enables to display TV Program Information 20118c of a selected TV program described in paragraph [0252] hereinafter. 'PRn' represents a title of a TV program, and 'CHn' represents Channel Number 20118a. Referring to the example described in paragraph [0248], TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 1) is selected by way of utilizing the cursor displayed thereon. The cursor can be moved from one TV program to another one by utilizing Input Device 210 (paragraph [0239]) or via voice recognition system. In the present example, the cursor located on Pr 2 (as described in paragraph [0248]) is moved to Pr4.

This paragraph [0251] illustrates the sequence of displaying TV Program Information 20118c (paragraph [0252]) from TV Program Listing 20118d (paragraph [0250]). First, CPU 211 (paragraph [0239]) displays TV Program Listing 20118d (paragraph [0250]) on LCD 201 (paragraph [0239]) (S1). Next, the user of Communication Device 200 selects one of the TV programs listed in TV Program Listing 20118d by moving the cursor displayed on LCD 201 (S2). CPU 211 sends via Antenna 218 (paragraph [0239]) to TV Server TVS (paragraph [0235]) a TV program information request signal indicating TV Server TVS to send TV Program Information 20118c of the selected TV program (S3). CPU 211 retrieves TV Program Information 20118c from TV Server TVS via Antenna 218 (S4), and displays on LCD 201 thereafter as described in paragraph [0252] (S5).

This paragraph [0252] illustrates TV Program Information 20118c displayed on LCD 201 (paragraph [0239]) which is retrieved in S4 of paragraph [0251] hereinbefore. TV Program Information 20118c includes Channel Number 20118b, 'Title', 'Summary', 'Start Time', 'Stop Time', and 'Category'. Here, Channel Number 20118b represents the channel number of the TV program selected in S2 of paragraph [0251], 'Title' represents the title of the TV program selected in S2 of paragraph [0251], 'Summary' represents the summary of the TV program selected in S2 of paragraph [0251], 'Start Time' represents the starting time of the TV program selected in S2 of paragraph [0251], 'Stop Time' represents the ending time of the TV program selected in S2 of paragraph [0251], and 'Category' represents the category to which the TV program selected in S2 of paragraph [0251] pertains.

This paragraph [0253] illustrates another embodiment of the method to display Channel Number 20118a. Instead of displaying all the available Channel Numbers 20118a as described in paragraph [0244], only Channel Number 20118a currently shown on TV 802 (paragraph [0234]) may be displayed on LCD 201 (paragraph [0239]), Channel Number 20118a '4' in the present example.

<<CD/PC Inter-communicating Function >>

Paragraph [0256] through paragraph [0271] illustrate the Communication Device 200/personal computer inter-communicating function (the CD/PC inter-communicating function) which enables Communication Device 200 to transfer LED transferable data (i.e., data transferable via LED 219 (paragraph [0239])) to personal computers in a wireless fashion.

This paragraph [0256] illustrates the connection between Communication Device 200 and Personal Computer PC. Communication Device 200 is connected in a wireless fashion to Network NT, such as the Internet, and Network NT is connected to Personal Computer PC in a wireless fashion. Communication Device 200 may be connected to Personal Computer PC via one or more of artificial satellites, for example, in the manner described in paragraph [0022], paragraph [0023], and paragraph [0024]. Communication Device 200 may also be connected to Personal Computer PC via sub-host in the manner described in paragraph [0105].

This paragraph [0257] illustrates another embodiment of connecting Communication Device 200 with Personal Computer PC. Communication Device 200 may directly connect to Personal Computer PC in a wireless fashion. Here, Communication Device 200 may utilize Antenna 218 (FIG. 1) and/or LED 219 as described in paragraph [0239] hereinafter to be connected with Personal Computer PC in a wireless fashion.

This paragraph [0258] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in paragraph [0127], and the CD/PC inter-communicating function is activated (S3c) when the CD/PC inter-communicating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph [0259] illustrates the data stored in RAM 206 (FIG. 1). The data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described in paragraph [0128], and the data to activate (as described in S3c of the previous paragraph) and to perform the CD/PC inter-communicating function is stored in CD/PC Inter-communication Information Storage Area 20619a.

This paragraph [0260] illustrates the data stored in CD/PC Inter-communication Information Storage Area 20619a. CD/PC Inter-communication Information Storage Area 20619a includes CD/PC Inter-communication Software Storage Area 20619b and CD/PC inter-Communication Data Storage Area 20619c. CD/PC Inter-communication Software Storage Area 20619b stores a plurality of software programs to implement the present function, such as the ones described in paragraph [0262] and paragraph [0263], and CD/PC Inter-communication Data Storage Area 20619c stores a plurality of data to implement the present function such as the one described in paragraph [0261] hereinafter.

This paragraph [0261] illustrates the data stored in CD/PC Inter-communication Data Storage Area 20619c. CD/PC Inter-communication Data Storage Area 20619c includes LED Transferable Data Index Storage Area 20619c1, Selected LED Transferable Data Index Storage Area 20619c2, Received LED Transferable Data Storage Area 20619c3, and Non-LED Transferable Data Index Storage Area 20619c4. Here, LED Transferable Data Index Storage Area 20619c1 stores a plurality of LED transferable data indexes, i.e., unique information assigned to each LED transferable data as an identifier (e.g., a title of the data), Selected LED Transferable Data Index Storage Area 20619c2 stores one of the LED transferable data indexes stored in LED Transferable Data Index Storage Area 20619c1 which is selected by the user of Communication Device 200 by utilizing Input Device 210 (FIG. 1) or via voice recognition system, Received LED Transferable Data Storage Area 20619c3 stores a plurality of LED transferable data received from Personal Computer PC (paragraph [0256] and/or paragraph [0257]), and Non-LED Transferable Data Index Storage Area 20619c4 stores the data which are not transferable in a wireless fashion via LED 219 (paragraph [0239]).

This paragraph [0262] illustrates the sequence of the software program stored in CD/PC Inter-communication Software Storage Area 20619b (paragraph [0260]) to send the LED transferable data to Personal Computer PC (paragraph [0256] and/or paragraph [0257]). CPU 211 (FIG. 1) displays a list of LED transferable data on LCD 201 (FIG. 1) by retrieving LED transferable data index from LED Transferable Data Index Storage Area 20619c1 (paragraph [0261]) (S1). The user of Communication Device 200 selects one of the LED transferable data from the list by utilizing Input Device 210 (FIG. 1) or via voice recognition system, and CPU 211 stores the LED transferable data index of the selected LED transferable data in Selected LED Transferable Data Index Storage Area 20619c2 (paragraph [0261]) (S2). CPU 211 then retrieves the LED transferable data corresponding to the LED transferable data index from RAM 206 (FIG. 1) (S3), and transfers to Personal Computer PC (paragraph [0256] and/or paragraph [0257]) via LED 219 (FIG. 1) in a wireless fashion (S4).

This paragraph [0263] illustrates the sequence of the software program stored in CD/PC Inter-communication Software Storage Area 20619b (paragraph [0260]) to receive the LED transferable data from Personal Computer PC (paragraph [0256] and/or paragraph [0257]) via LED 219 (paragraph [0239]). CPU 211 (FIG. 1) selects a storage area in Received LED Transferable Data Storage Area 20619c3 (paragraph [0261]) to store the received LED transferable data. Selecting a storage area may be automatically performed by CPU 211 or by the user of Communication Device 200 by utilizing Input Device 210 (FIG. 1) or via voice recognition system (S1). Next CPU 211 receives the LED transferable data from Personal Computer PC (S2), and stores it to the selected storage area identified in S1 (S3). CPU 211 displays the LED transferable data index of the stored LED transferable data on LCD 201 (FIG. 1) thereafter (S4).

This paragraph [0264] illustrates another embodiment of the data stored in CD/PC Inter-communication Data Storage Area 20619c. CD/PC Inter-communication Data Storage Area 20619c includes LED Transferable Data Storage Area 20619c5, Selected LED Transferable Data Storage Area 20619c6, Received LED Transferable Data Storage Area 20619c7, and Non-LED Transferable Data Storage Area 20619c8. Here, LED Transferable Data Storage Area 20619c5 stores a plurality of LED transferable data itself (instead of storing LED transferable data index), Selected LED Transferable Data Storage Area 20619c6 stores one of the LED transferable data stored in LED Transferable Data Storage Area 20619c5 which is selected by the user of Communication Device 200 by utilizing Input Device 210 (FIG. 1) or via voice recognition system, Received LED Transferable Data Storage Area 20619c7, which is identical to Received LED Transferable Data Storage Area 20619c7 (paragraph [0261]), stores a plurality of LED transferable data received from Personal Computer PC (paragraph [0256] and/or paragraph [0257]), and Non-LED Transferable Data Storage Area 20619c8 stores the data which are not transferable in a wireless fashion via LED 219 (paragraph [0239]).

Paragraph [0266] through paragraph [0271] illustrate the data and software programs stored in Personal Computer PC (paragraph [0256] and/or paragraph [0257]).

This paragraph [0266] illustrates the data stored in RAM (or hard disk) of Personal Computer PC (paragraph [0256] and/or paragraph [0257]). The data to activate and to perform the CD/PC inter-communicating function is stored in PC/CD Inter-communication Information Storage Area PC19a.

This paragraph [0267] illustrates the data stored in PC/CD Inter-communication Information Storage Area PC19a. PC/CD Inter-communication Information Storage Area PC19a includes PC/CD Inter-communication Software Storage Area PC19b and PC/CD Inter-communication Data Storage Area PC19c. PC/CD Inter-communication Software Storage Area PC19b stores a plurality of software programs to implement the present function, such as the ones described in paragraph [0269] and paragraph [0270], and PC/CD Inter-communication Data Storage Area PC19c stores a plurality of data to implement the present function such as the one described in paragraph [0268] hereinafter.

This paragraph [0268] illustrates the data stored in PC/CD Inter-Communication Data Storage Area PC19c. PC/CD Inter-communication Data Storage Area PC19c includes LED Transferable Data Index Storage Area PC19c1, Selected LED Transferable Data Index Storage Area PC19c2, Received LED Transferable Data Storage Area PC19c3, and Non-LED Transferable Data Index Storage Area PC19c4. Here, LED Transferable Data Index Storage Area PC19c1 stores a plurality of LED transferable data indexes, i.e., unique information assigned to each LED transferable data as an identifier (e.g., title of the data), Selected LED Transferable Data Index Storage Area PC19c2 stores one of the LED transferable data indexes stored in LED Transferable Data Index Storage Area PC19c1 which is selected by the user of Personal Computer PC (paragraph [0256] and/or paragraph [0257]) by utilizing input device (e.g., keyboard, mouse, and joystick), Received LED Transferable Data Storage Area PC19c3 stores a plurality of LED transferable data received from Communication Device 200, and Non-LED Transferable Data Index Storage Area PC19c4 stores the data which are not transferable in a wireless fashion via LED communication device installed in Personal Computer PC.

This paragraph [0269] illustrates the sequence of the software program stored in PC/CD Inter-communication Software Storage Area PC19b (paragraph [0267]) to send the LED transferable data to Communication Device 200. The CPU of Personal Computer PC displays a list of LED transferable data on its monitor by retrieving LED transferable data index from LED Transferable Data Index Storage Area PC19c1 (paragraph [0268]) (S1). The user of Personal Computer PC (paragraph [0256] and/or paragraph [0257]) selects one of the LED transferable data from the list by utilizing input device (e.g., keyboard, mouse, and joystick), and the CPU of Personal Computer PC stores the LED transferable data index of the selected LED transferable data in Selected LED Transferable Data Index Storage Area PC19c2 (paragraph [0268]) (S2). The CPU of Personal Computer PC then retrieves the LED transferable data corresponding to the LED transferable data index from RAM of Personal Computer PC (S3), and transfers to Communication Device 200 via LED communication device in a wireless fashion (S4).

This paragraph [0270] illustrates the sequence of the software program stored in PC/CD Inter-communication Software Storage Area PC19b (paragraph [0267]) to receive the LED transferable data from Communication Device 200 via LED communication device. The CPU of Personal Computer PC selects a storage area in Received LED Transferable Data Storage Area PC19c3 (paragraph [0268]) to store the received LED transferable data. Selecting a storage area may be automatically performed by the CPU of Personal Computer PC or by its user by utilizing input device (e.g., keyboard, mouse, and joystick) (S1). Next the CPU of Personal Computer PC receives the LED transferable data from Communication Device 200 (S2), and stores it to the selected storage area identified in S1 (S3). The CPU of Personal Computer PC displays the LED transferable data index of the stored LED transferable data on its monitor thereafter (S4).

This paragraph [0271] illustrates another embodiment of the data stored in PC/CD Inter-communication Data Storage Area PC19c. PC/CD Inter-communication Data Storage Area PC19c includes LED Transferable Data Storage Area PC19c5, Selected LED Transferable Data Storage Area PC19c6, Received LED Transferable Data Storage Area PC19c7, and Non-LED Transferable Data Storage Area PC19c8. Here, LED Transferable Data Storage Area PC19c5 stores a plurality of LED transferable data itself (instead of storing LED transferable data index), Selected LED Transferable Data Storage Area PC19c6 stores one of the LED transferable data stored in LED Transferable Data Storage Area PC19c5 which is selected by the user of Personal Computer PC by utilizing input device (e.g., keyboard, mouse, and/or joystick), Received LED Transferable Data Storage Area PC19c7, which is identical to Received LED Transferable Data Storage Area PC19c7 (paragraph [0261]), stores a plurality of LED transferable data received from Communication Device 200, and Non-LED Transferable Data Storage Area PC19c8 stores the data which are not transferable in a wireless fashion via LED communication device.

As another embodiment, Antenna 218 (FIG. 1) may be utilized instead of LED 219 (paragraph [0239]) to send and receive LED transferable data. As another embodiment, the present function may be implemented between two Communication Devices 200 utilizing either Antenna 218 or LED 219. As another embodiment, the present function may be implemented between two personal computers PC utilizing either antenna or LED communication device.

<<PDWR Sound Selecting Function>>

Paragraph [0275] through paragraph [0303] illustrate the pre-dialing/dialing/waiting sound Selecting Function (PDWR Sound Selecting Function) which enables Communication Device 200 to generate the pre-dialing sound, dialing sound, and waiting sound selected by the user thereof.

This paragraph [0275] illustrates the overall sequence of Communication Device 200 to generate the pre-dialing sound, dialing sound, and waiting sound. These sounds are generated when Communication Device 200 is in voice communication mode. The user of Communication Device 200 selects the voice communication mode by utilizing Input Device 210 (FIG. 1) or via voice recognition system (S1). Communication Device 200 outputs the pre-dialing sound via Speaker 216 (FIG. 1) when the voice recognition system is activated and until the dialing process is initiated (S2). Next, Communication Device 200 outputs the dialing sound via Speaker 216 during the dialing process, i.e., when the user of Communication Device 200 is inputting a phone number by utilizing Input Device 210 or via voice recognition system (S3). Once the dialing process is completed, Communication Device 200 outputs the waiting sound via Speaker 216 (S4), until the line is connected at the other end and a voice communication is initiated (S5).

This paragraph [0276] illustrates the data stored in Host H. Host H includes Host Information Storage Area H00a which stores various types of data to assist and/or co-operate with Communication Device 200 to implement all modes, functions, and systems described in this specification, including data explained in paragraph [0277] hereinafter. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

This paragraph [0277] illustrates the data stored in Host Information Storage Area H00a described in paragraph [0276]. Host Information Storage Area H00a includes Host Software Storage Area H00b and Host Data Storage Area H00c. Here, Host Software Storage Area H00b stores all software programs necessary to implement the present function including the one illustrated in paragraph [0278] hereinafter. Host Data Storage Area H00c stores all data necessary to implement the present function including the one illustrated in paragraph [0281] hereinafter.

This paragraph [0278] illustrates the software programs stored in Host Software Storage Area H00b (paragraph [0277]). Host Software Storage Area H00b includes Com Device/Host Data Transferring Software Storage Area H00b1 and Host/Com Device Data Transferring Software Storage Area H00b2. Com Device/Host Data Transferring Software Storage Area H00b1 stores the software programs utilized when Host H (paragraph [0276]) receives data from Communication Device 200. Host/Com Device Data Transferring Software Storage Area H00b2 stores the software programs utilized when Host H sends data to Communication Device 200.

This paragraph [0279] illustrates the sequence of the software program stored in Com Device/Host Data Transferring Software Storage Area H00b1 (paragraph [0278]). Taking a download request for example, Communication Device 200, first of all, sends a download request to Host H (paragraph [0276]) to download a specific data therefrom (S1). Next, Host H activates the software program stored in Com Device/Host Data Transferring Software Storage Area H00b1 to receive the download request from Communication Device 200 (S2).

This paragraph [0280] illustrates the sequence of the software program stored in Host/Com Device Data Transferring Software Storage Area H00b2 (paragraph [0278]). Taking the download request for example, Host H (paragraph [0276]), first of all, activates the software program stored in Host/Com Device Data Transferring Software Storage Area H00b2, which selects the data stored in Host Data Storage Area H00c (paragraph [0277]) specified in the download request (S1). Host H, under the command of the software program stored in Host/Com Device Data Transferring Software Storage Area H00b2, sends the data selected in S1 to Communication Device 200 (S2).

This paragraph [0281] illustrates the storage area included in Host Data Storage Area H00c (paragraph [0277]). Host Data Storage Area H00c includes PDWR Sound Selection Information Storage Area H20a which stores various types of sound data and software programs to implement the present function of which the information stored therein is explained in paragraph hereinafter.

This paragraph [0282] illustrates the storage area included in PDWR Sound Selection Information Storage Area H20a (paragraph [0281]). PDWR Sound Selection Information Storage Area H20a includes PDWR Sound Selection Software Storage Area H20b and PDWR Sound Selection Data Storage Area H20c. Here, PDWR Sound Selection Software Storage Area H20b stores the software programs which are downloaded and utilized by Communication Device 200 such as the ones explained in paragraph [0279] and paragraph [0280] hereinbefore. PDWR Sound Selection Data Storage Area H20c stores a plurality of sound data, such as the ones explained in paragraph [0283] through paragraph [0287].

This paragraph [0283] illustrates the storage area included in PDWR Sound Selection Data Storage Area H20c (paragraph [0282]). PDWR Sound Selection Data Storage Area H20c includes Pre-dialing Sound Data Storage Area H20c1, Dialing Sound Data Storage Area H20c2, Waiting Sound Data Storage Area H20c3, and Ringing Sound Data Storage Area H20c4. Here, Pre-dialing Sound Data Storage Area H20c1 stores a plurality of sound data explained in paragraph [0284], Dialing Sound Data Storage Area H20c2 stores a plurality of sound data explained in paragraph [0285], Waiting Sound Data Storage Area H20c3 stores a plurality of sound data explained in paragraph [0286], and Ringing Sound Data Storage Area H20c4 stores a plurality of sound data explained in paragraph [0287].

This paragraph [0284] illustrates the data stored in Pre-dialing Sound Data Storage Area H20c1 (paragraph [0283]). Pre-dialing Sound Data Storage Area H20c1 stores Pre-dialing Sound Data H20c1a, Pre-dialing Sound Data H20c1b, and Pre-dialing Sound Data H20c1c. In the present embodiment, Pre-dialing Sound Data H20c1a is a beeping sound, Pre-dialing Sound Data H20c1b is a tone sound, and Pre-dialing Sound Data H20c1c is a voice data of an actress. As another embodiment, a music melody, a hunk sound of an automobile, and a sound of siren may also be utilized instead. Various types of sound format may be utilized, including WAV format, and/or MP3 format.

This paragraph [0285] illustrates the data stored in Dialing Sound Data Storage Area H20c2 (paragraph [0283]). Dialing Sound Data Storage Area H20c2 stores Dialing Sound Data H20c2a, Dialing Sound Data H20c2b, and Dialing Sound Data H20c2c. In the present embodiment, Dialing Sound Data H20c2a is a beeping sound, Dialing Sound Data H20c2b is a tone sound, and Dialing Sound Data H20c2c is a voice data of an actress. As another embodiment, a music melody, a hunk sound of an automobile, and a sound of siren may also be utilized instead. Various types of sound format may be utilized, including WAV format, and/or MP3 format.

This paragraph [0286] illustrates the data stored in Waiting Sound Data Storage Area H20c3 (paragraph [0283]). Waiting Sound Data Storage Area H20c3 stores Waiting Sound Data H20c3a, Waiting Sound Data H20c3b, and Waiting Sound Data H20c3c. In the present embodiment, Waiting Sound Data H20c3a is a beeping sound, Waiting Sound Data H20c3b is a tone sound, and Waiting Sound Data H20c3c is a voice data of an actress. As another embodiment, a music melody, a hunk sound of an automobile, and a sound of siren may also be utilized instead. Various types of sound format may be utilized, including WAV format, and/or MP3 format.

This paragraph [0287] illustrates the data stored in Ringing Sound Data Storage Area H20c4 (paragraph [0283]). Ringing Sound Data Storage Area H20c4 stores Ringing Sound Data H20c4a, Ringing Sound Data H20c4b, and Ringing Sound Data H20c4c. In the present embodiment, Ringing Sound Data H20c4a is a beeping sound, Ringing Sound Data H20c4b is a tone sound, and Ringing Sound Data H20c4c is a voice data of an actress. As another embodiment, a music melody, a hunk sound of an automobile, and a sound of siren may also be utilized instead. Various types of sound format may be utilized, including WAV format, and/or MP3 format.

This paragraph [0288] illustrates the software program installed in Communication Device 200 to initiate the present function. First of all, a list of modes is displayed on LCD 201 (FIG. 1) (S1). When an input signal is input from Input Device 210 (FIG. 1) to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in paragraph [0127], and the PDWR Sound Selecting Function is activated (S3c) when the PDWR Sound Selecting Function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph [0289] illustrates the data stored in RAM 206 (FIG. 1). The data to activate (as described in S3a of the previous paragraph) and to perform the communication mode is stored in communication data storage area 2061a, the data to activate (as described in S3b of the previous paragraph) and to perform the game download mode and the game play mode are stored in game DL/play data storage area 2061b/2061c of which the details are described in paragraph [0128], and the data to activate (as described in S3c of the previous paragraph) and to perform the PDWR Sound Selecting Function is stored in PDWR Sound Selection Information Storage Area 20620a.

This paragraph [0290] illustrates the storage area included in PDWR Sound Selection Information Storage Area 20620a (paragraph [0289]). PDWR Sound Selection Information Storage Area 20620a includes PDWR Sound Selection Software Storage Area 20620b, PDWR Sound Selection Data Storage Area 20620c, and PDWR Sound Data Index Storage Area 20620d. Here, PDWR Sound Selection Software Storage Area 20620b stores the software programs which are downloaded and utilized by Communication Device 200 of which the details are explained hereinafter. PDWR Sound Selection Data Storage Area 20620c stores a plurality of sound data explained in paragraph [0291] through paragraph [0295]. PDWR Sound Data Index Storage Area 20620d stores sound data indexes which are identifiers of sound data selected in S2 through S4 of paragraph [0301] hereinafter.

This paragraph [0291] illustrates the storage area included in PDWR Sound Selection Data Storage Area 20620c (paragraph [0290]). PDWR Sound Selection Data Storage Area 20620c includes Pre-dialing Sound Data Storage Area 20620c1, Dialing Sound Data Storage Area 20620c2, Waiting Sound Data Storage Area 20620c3, and Ringing Sound Data Storage Area 20620c4. Here, Pre-dialing Sound Data Storage Area 20620c1 stores a plurality of sound data explained in paragraph [0292], Dialing Sound Data Storage Area 20620c2 stores a plurality of sound data explained in paragraph [0293], Waiting Sound Data Storage Area 20620c3 stores a plurality of sound data explained in paragraph [0294], and Ringing Sound Data Storage Area 20620c4 stores a plurality of sound data explained in paragraph [0295].

This paragraph [0292] illustrates the data stored in Pre-dialing Sound Data Storage Area 20620c1 (paragraph [0291]). Pre-dialing Sound Data Storage Area 20620c1 stores Pre-dialing Sound Data 20620c1a, Pre-dialing Sound Data 20620c1b, and Pre-dialing Sound Data 20620c1c. In the present embodiment, Pre-dialing Sound Data 20620c1a is a beeping sound, Pre-dialing Sound Data 20620c1b is a tone sound, and Pre-dialing Sound Data 20620c1c is a voice data of an actress. As another embodiment, a music melody, a hunk sound of an automobile, and a sound of siren may also be utilized instead. In addition, a voice data of the user of Communication Device 200 or a voice data of his/her friend recorded via microphone may be utilized. Various types of sound format may be utilized, including WAV format, and/or MP3 format.

This paragraph [0293] illustrates the data stored in Dialing Sound Data Storage Area 20620c2 (paragraph [0291]). Dialing Sound Data Storage Area 20620c2 stores Dialing Sound Data 20620c2a, Dialing Sound Data 20620c2b, and Dialing Sound Data 20620c2c. In the present embodiment, Dialing Sound Data 20620c2a is a beeping sound, Dialing Sound Data 20620c2b is a tone sound, and Dialing Sound Data 20620c2c is a voice data of an actress. As another embodiment, a music melody, a hunk sound of an automobile, and a sound of siren may also be utilized instead. In addition, a voice data of the user of Communication Device 200 or a voice data of his/her friend recorded via microphone may be utilized. Various types of sound format may be utilized, including WAV format, and/or MP3 format.

This paragraph [0294] illustrates the data stored in Waiting Sound Data Storage Area 20620c3 (paragraph [0291]). Waiting Sound Data Storage Area 20620c3 stores Waiting Sound Data 20620c3a, Waiting Sound Data 20620c3b, and Waiting Sound Data 20620c3c. In the present embodiment, Waiting Sound Data 20620c3a is a beeping sound, Waiting Sound Data 20620c3b is a tone sound, and Waiting Sound Data 20620c3c is a voice data of an actress. As another embodiment, a music melody, a hunk sound of an automobile, and a sound of siren may also be utilized instead. In addition, a voice data of the user of Communication Device 200 or a voice data of his/her friend recorded via microphone may be utilized. Various types of sound format may be utilized, including WAV format, and/or MP3 format.

This paragraph [0295] illustrates the data stored in Ringing Sound Data Storage Area 20620c4 (paragraph [0291]). Ringing Sound Data Storage Area 20620c4 stores Ringing Sound Data 20620c4a, Ringing Sound Data 20620c4b, and Ringing Sound Data 20620c4c. In the present embodiment, Ringing Sound Data 20620c4a is a beeping sound, Ringing Sound Data 20620c4b is a tone sound, and Ringing Sound Data 20620c4c is a voice data of an actress. As another embodiment, a music melody, a hunk sound of an automobile, and a sound of siren may also be utilized instead. In addition, a voice data of the user of Communication Device 200 or a voice data of his/her friend recorded via microphone may be utilized. Various types of sound format may be utilized, including WAV format, and/or MP3 format.

This paragraph [0296] illustrates the sequence of the software program stored in PDWR Sound Selection Software Storage Area H20b (paragraph [0282]). CPU 211 (FIG. 1) displays on LCD 201 (FIG. 1) a list of sound data downloadable from Host H (paragraph [0276]) in categories (i.e., pre-dialing sound data, dialing sound data, waiting sound data, and ringing sound data) (S1). Next, the user of Communication Device 200 selects by utilizing Input Device 210 (FIG. 1) or via voice recognition system one of the sound data to be downloaded (S2). CPU 211 selects one of the storage areas in PDWR Sound Selection Data Storage Area 20620c (paragraph [0290]) (S3), and CPU 211 stores the downloaded sound data therein (S4). For example, if the selected sound data is a pre-dialing sound data, the downloaded sound data is stored in Pre-dialing Sound Data Storage Area 20620c1 (paragraph [0292]). If the selected sound data is a dialing sound data, the downloaded sound data is stored in Dialing Sound Data Storage Area 20620c2 (paragraph [0293]). If the selected sound data is a waiting sound data, the downloaded sound data is stored in Waiting Sound Data Storage Area 20620c3 (paragraph [0294]). If the selected sound data is a ringing sound data, the downloaded sound data is stored in Ringing Sound Data Storage Area 20620c4 (paragraph [0295]).

This paragraph [0297] illustrates the list of sound data downloadable from Host H (paragraph [0276]) displayed on LCD 201 (FIG. 1) described in S1 of paragraph [0296] hereinbefore. A list of sound data downloadable from Host H (paragraph [0276]) is displayed on LCD 201 in categories (i.e., pre-dialing sound data, dialing sound data, waiting sound data, and ringing sound data). The mark x illustrates that the corresponding sound data is already installed in PDWR Sound Selection Data Storage Area 20620c (paragraph [0290]). In the example described in this paragraph [0297], Pre-dialing Sound Data H20c1a and Pre-dialing Sound Data H20c1b stored in Pre-dialing Sound Data Storage Area H20c1 (paragraph [0284]), Dialing Sound Data H20c2a and Dialing Sound Data H20c2b stored in Dialing Sound Data Storage Area H20c2 (paragraph [0285]), Waiting Sound Data H20c3a and Waiting Sound Data H20c3b stored in Waiting Sound Data Storage Area H20c3 (paragraph [0286]), and Ringing Sound Data H20c4a and Ringing Sound Data H20c4b stored in Ringing Sound Data Storage Area H20c4 (paragraph [0287]) are already downloaded and stored in PDWR Sound Selection Data Storage Area 20620c.

This paragraph [0298] illustrates the list of sound data displayed on LCD 201 (FIG. 1) after being selected as described in S2 of paragraph [0296] hereinbefore. The user of Communication Device 200 selects by utilizing Input Device 210 (FIG. 1) or via voice recognition system the sound data to be downloaded. The selected sound data are marked as DL. In the example described in paragraph [0297], Pre-dialing Sound Data H20c1c stored in Pre-dialing Sound Data Storage Area H20c1 (paragraph [0284]), Dialing Sound Data H20c2c stored in Dialing Sound Data Storage Area H20c2 (paragraph [0285]), Waiting Sound Data H20c3c stored in Waiting Sound Data Storage Area H20c3 (paragraph [0286]), and Ringing Sound Data H20c4c stored in Ringing Sound Data Storage Area H20c4 (paragraph [0287]) are selected in S2 of paragraph [0296] to be downloaded. As a result, all sound data stored in PDWR Sound Selection Data Storage Area H20c, Pre-dialing Sound Data Storage Area H20c1, Dialing Sound Data Storage Area H20c2, and Waiting Sound Data Storage Area H20c3 of Host H (paragraph [0276]) are downloaded in Pre-dialing Sound Data Storage Area 20620c1, Dialing Sound Data Storage Area 20620c2, Waiting Sound Data Storage Area 20620c3, and Ringing Sound Data Storage Area 20620c4 of Communication Device 200, respectively. Here, each sound data stored in Communication Device 200 is identical to the one stored in Host H. For the avoidance of doubt, the sound data stored in Communication Device 200 do not need to be identical to the ones stored in Host H.

This paragraph [0299] illustrates another embodiment of the software program stored in PDWR Sound Selection Software Storage Area H20b (paragraph [0282]) which enables to output sound data before storing in Communication Device 200. CPU 211 (FIG. 1) displays on LCD 201 (FIG. 1) a list of sound data downloadable from Host H (paragraph [0276]) in categories (i.e., pre-dialing sound data, dialing sound data, waiting sound data, and ringing sound data) (S1). Next, the user of Communication Device 200 selects by utilizing Input Device 210 (FIG. 1) or via voice recognition system one of the sound data to be downloaded (S2). CPU 211 downloads the selected sound data in S2 (S3), and outputs it from Speaker 216 (FIG. 1) for demonstration when the user of Communication Device 200 inputs a specific signal by utilizing Input Device 210 (FIG. 1) or via voice recognition system which so indicates (S4). If CPU 211 detects a particular input signal input by the user of Communication Device 200 which indicates to store the sound data output in S4 (S5), CPU 211 selects one of the storage areas in PDWR Sound Selection Data Storage Area 20620c (paragraph [0290]) (S6), and stores the sound data therein (S7). For example, if the selected sound data is a pre-dialing sound data, the downloaded sound data is stored in Pre-dialing Sound Data Storage Area 20620c1 (paragraph [0292]). If the selected sound data is a dialing sound data, the downloaded sound data is stored in Dialing Sound Data Storage Area 20620c2 (paragraph [0293]). If the selected sound data is a waiting sound data, the downloaded sound data is stored in Waiting Sound Data Storage Area 20620c3 (paragraph [0294]). If the selected sound data is a ringing sound data, the downloaded sound data is stored in Ringing Sound Data Storage Area 20620c4 (paragraph [0295]).

This paragraph [0300] illustrates the method of selecting the sound data to be output via Speaker 216 (FIG. 1). The user of Communication Device 200 selects by utilizing Input Device 210 (FIG. 1) or via voice recognition system the sound data to be output via Speaker 216. The selected sound data are marked as 'Sel'. Pre-dialing Sound Data H20c1c, Dialing Sound Data H20c2c, Waiting Sound Data H20c3c, and Ringing Sound Data H20c4c are selected to be output via Speaker 216.

This paragraph [0301] illustrates the software program stored in PDWR Sound Selection Software Storage Area H20b (paragraph [0282]) which implements the method described in paragraph [0300] hereinbefore. CPU 211 (FIG. 1) displays on LCD 201 (FIG. 1) a list of sound data in categories (i.e., pre-dialing sound data, dialing sound data, waiting sound data, and ringing sound data) (S1). Next, the user of Communication Device 200 selects by utilizing Input Device 210 (FIG. 1) or via voice recognition system the pre-dialing sound data (Pre-dialing Sound Data 20620c1c in the example described in paragraph [0300]) (S2), the dialing sound data (Dialing Sound Data 20620c2c in the example described in paragraph [0300]) (S3), the waiting sound data (Waiting Sound Data 20620c3c in the example described in paragraph [0300]) (S4), and the ringing sound data (Ringing Sound Data 20620c4c in the example described in paragraph [0300]), (S5). CPU 211 stores the sound data indexes of the sound data selected in S2 through S5 in PDWR Sound Data Index Storage Area 20620d (paragraph [0290]) (S6).

This paragraph [0302] illustrates the software program stored in PDWR Sound Selection Software Storage Area H20b (paragraph [0282]) which outputs the sound data selected in paragraph [0301] hereinbefore until a voice communication is initiated by the user of Communication Device 200. The user of Communication Device 200 selects the voice communication mode by utilizing Input Device 210 (FIG. 1) or via voice recognition system (S1). Then CPU 211 (FIG. 1) scans PDWR Sound Data Index Storage Area 20620d (paragraph [0290]) to identify the pre-dialing sound data selected in S2 of paragraph [0301] (Pre-dialing Sound Data 20620c1c (paragraph [0292]) in the present example), which is output via Speaker 216 (FIG. 1) until the dialing process is initiated (S2). When the dialing process is initiated, CPU 211 scans PDWR Sound Data Index Storage Area 20620d to identify the dialing sound data selected in S3 of paragraph [0301] (Dialing Sound Data 20620c2c (paragraph [0293]) in the present example), which is output via Speaker 216 during the dialing process (S3). Once the dialing process is completed, CPU 211 scans PDWR Sound Data Index Storage Area 20620d to identify the waiting sound data selected in S4 of paragraph [0301] (Waiting Sound Data 20620c3c (paragraph [0294]) in the present example), which is output via Speaker 216 until the line is connected at the other end (S4). The voice communication is initiated thereafter (S5).

This paragraph [0303] illustrates the software program stored in PDWR Sound Selection Software Storage Area H20b (paragraph [0282]) which outputs the ringing sound data selected in S5 of paragraph [0301] hereinbefore when receiving an incoming call. CPU 211 (FIG. 1) periodically checks the wireless signals received via antenna 218 (FIG. 1) (S1). If the received wireless signal is an incoming call from another device for voice communication purposes (S2), CPU 211 scans PDWR Sound Data Index Storage Area 20620d to identify the ringing sound data (Ringing Sound Data 20620c4c (paragraph [0295]) in the present example), which is output via Speaker 216 until the user of Communication Device 200 initiates a voice communication (S3).

<<Start Up Software Function>>

Paragraph [0306] through paragraph [0315] illustrate the start up software program function which enables Communication Device 200 to automatically activate (or start up) the registered software programs when the power is on.

This paragraph [0306] illustrates the overall sequence of the present function. The user of Communication Device 200 presses the power button of Communication Device 200 (S1). Then the predetermined software programs automatically activate (or start up) without having any instructions from the user of Communication Device 200 (S2).

This paragraph [0307] illustrates the storage area included RAM 206 (FIG. 1). RAM 206 includes Start Up Information Storage Area 20621a which is described in paragraph [0308] hereinafter.

This paragraph [0308] illustrates the storage areas included in Start Up Information Storage Area 20621a (paragraph [0307]). Start Up Information Storage Area 20621a includes Start Up Software Storage Area 20621b and Start Up Data Storage Area 20621c. Start Up Software Storage Area 20621b stores the software programs necessary to implement the present function, such as the ones described in paragraph [0309] hereinafter. Start Up Data Storage Area 20621c stores the data necessary to implement the present function, such as the ones described in paragraph [0311] hereinafter.

This paragraph [0309] illustrates the software programs stored in Start Up Software Storage Area 20621b (paragraph [0308]). Start Up Software Storage Area 20621b stores Power On Detecting Software 20621b1, Start Up Data Storage Area Scanning Software 20621b2, and Start Up Software Activating Software 20621b3. Power On Detecting Software 20621b1 detects whether the power of Communication Device 200 is on of which the sequence is described in paragraph [0312] hereinafter, Start Up Data Storage Area Scanning Software 20621b2 identifies the software programs which are automatically activated of which the sequence is described in paragraph [0313] hereinafter, and Start Up Software Activating Software 20621b3 activates the identified software programs identified by Start Up Data Storage Area Scanning Software 20621b2 of which the sequence is described in paragraph [0314] hereinafter.

This paragraph [0310] illustrates the storage area included in Start Up Data Storage Area 20621c (paragraph [0308]). Start Up Data Storage Area 20621c includes Start Up Software Index Storage Area 20621c1. Here, Start Up Software Index Storage Area 20621c1 stores the software program indexes, wherein a software program index is an unique information assigned to each software program as an identifier (e.g., title of a software program) of which the details are explained in paragraph [0311] hereinafter. This paragraph [0311] illustrates the data stored in Start Up Software Index Storage Area 20621c1 (paragraph [0310]). Start Up Software Index Storage Area 20621c1 stores the software program indexes of the software programs which are automatically activated by the present function. Here, the software programs may be any software programs explained in this specification. Three software program indexes, i.e., Start Up Software Index 20621c1a, Start Up Software Index 20621c1b, and Start Up Software Index 20621c1c, are stored in Start Up Software Index Storage Area 20621c1 in the present example. The software program indexes can be created and store in Start Up Software Index Storage Area 20621c1 manually by utilizing input device 210 (FIG. 1) or via voice recognition system.

This paragraph [0312] illustrates the sequence of Power On Detecting Software 20621b1 stored in Start Up Software Storage Area 20621b (paragraph [0309]). CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621b2 (paragraph [0309]) of which the sequence is explained in paragraph hereinafter.

This paragraph [0313] illustrates the sequence of Start Up Data Storage Area Scanning Software 20621b2 stored in Start Up Software Storage Area 20621b (paragraph [0309]). CPU 211 (FIG. 1) scans Start Up Software Index Storage Area 20621c1 (paragraph [0311]) (S1), and identifies the software programs which are automatically activated (S2). CPU 211 activates Start Up Software Activating Software 20621b3 (paragraph [0309]) thereafter of which the sequence is explained in paragraph [0314] hereinafter (S3). This paragraph [0314] illustrates the sequence of Start Up Software Activating Software 20621b3 stored in Start Up Software Storage Area 20621b (paragraph [0309]). CPU 211 (FIG. 1) activates the software programs of which the software program indexes are identified in S2 of paragraph [0313] hereinbefore (S1).

This paragraph [0315] illustrates another embodiment wherein the three software programs stored in Start Up Software Storage Area 20621b (paragraph [0309]) (i.e., Power On Detecting Software 20621b1, Start Up Data Storage Area Scanning Software 20621b2, Start Up Software Activating Software 20621b3) is integrated into one software program stored therein. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621c1 (paragraph [0310]) (S3), and identifies the software programs which are automatically activated (S4). CPU 211 activates the software programs thereafter of which the software program indexes are identified in S4 (S5).

As another embodiment, the software programs per se (not the software program indexes as described in paragraph [0311]) may be stored in a specific storage area which are activated by the present function.

As another embodiment, the present function may be implemented at the time the user of Communication Device 200 logs on instead of at the time the Communication Device 200 is powered as described in S2 of paragraph [0312].

<<Another Embodiment Of Communication Device 200>>

This paragraph [0319] illustrates another embodiment of Communication Device 200 described in FIG. 1 and paragraph [0239]. CPU 211 controls and administers the overall function and operation of Communication Device 200. CPU 211 utilizes RAM 206 as a work area to perform calculation, and to implement the modes, functions, and systems explained in this specification. Video Processor 202 generates stereo video signals. Wireless Transmitter 222 transmits the stereo video signals generated by Video Processor 202 in a wireless fashion, which is received by Wireless Receiver 224. Data Bus 203 is composed of Data Bus 203a, Data Bus 203b, and Data Bus 203c. LCD 201L and LCD 201R display the received stereo video signals in a stereo fashion. ROM 207 stores the data and software programs which are essential to operate Communication Device 200. Wireless signals are received by Antenna 218 and processed by Signal Processor 208. Input signals are input by Input Device 210, such as a dial pad, a joystick, and/or a keypad, and the input signals are transferred via Input Interface 209 and Data Bus 203 to CPU 211. Indicator 212 is an LED lamp which is designed to output different colors (e.g., red, blue, and green, etc). Stereo audio data are input to Microphone 215L and Microphone 215R in a stereo fashion. The input stereo audio data are transferred via Wireless Transmitter 227 in a wireless fashion to Wireless Receiver 226. Wireless Receiver 226 transfers the received stereo audio data to Signal Processor 205. Signal Processor 205 processes the received stereo audio data under the control of CPU 211. Signal Processor 205 also generates stereo audio data under the control of CPU 211 which are transferred via Wireless Transmitter 223 in a wireless fashion to Wireless Receiver 225. Wireless Receiver 225 transfers the received stereo audio data to Speaker 216L and Speaker 216R, which output stereo audio data in a stereo fashion. CCD Unit 214 captures video images which are stored in RAM 206 in a digital format. Vibrator 217 vibrates Communication Device 200 under the command of CPU 211. LED 219 receives infra red signals from other wireless devices, which are transferred to CPU 211 via Data Bus 203. LED 219 also sends infra red signals in a wireless fashion which are composed by CPU 211 and transferred via Data Bus 203. As a second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 except that LED 219 utilizes infra red signals for implementing wireless communication in the second embodiment. Flash Light Unit 220 emits light under the command of CPU 211 transferred via Data Bus 203, which is utilized for flash light purposes and as a strobe unit when taking videos and/or photos by CCD Unit 214. Memory Card 228 is a removable or detachable storage media which stores any information, data, and/or software program, and is accessed by CPU 211 via Memory Card Interface 221. Memory Card 228 may be utilized as a substitute of RAM 206. Photometer 232 is a sensor which detects the brightness (i.e., the light intensity). LCD 201L, LCD 201R are wearable and/or head-mountable. As another embodiment, LCD 201L, LCD 201R, Wireless Receiver 224, and Video Processor 202 may be integrated into one unit. Solar Panel 229 is a panel which converts sunlight to electricity, under the control of CPU 211. Solar Panel 229 is connected to Battery 230 by a cable to charge Battery 230. The concept of the mechanism and the utilization of Solar Panel 229 and Battery 230 are introduced in the following invention and the references cited thereof: U.S. Pat. No. 5,542,203.

When Communication Device 200 is in a voice communication mode, the stereo audio data input to Microphone 215L and Microphone 215R are transferred to another device via Antenna 218 (or LED 219) in a wireless fashion after being processed by Signal Processor 208, and the wireless signal representing the stereo audio data which are received via Antenna 218 (or LED 219) is output from Speaker 216L and Speaker 216R after being processed by Signal Processor 208. Communication Device 200 is also capable to process monoral audio data. Namely, when Communication Device 200 is in a voice communication mode, the monoral audio data input to Microphone 215L and/or Microphone 215R are transferred to another device via Antenna 218 (or LED 219) in a wireless fashion after being processed by Signal Processor 208, and the wireless signal representing the monoral audio data which are received via Antenna 218 (or LED 219) is output from Speaker 216L and/or Speaker 216R after being processed by Signal Processor 208.

For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218 (or LED 219). The size of Communication Device 200 is irrelevant so long as it is mobile and/or portable.

For the avoidance of doubt, the reference to FIG. 1 (e.g., referring to FIG. 1 in parenthesis) automatically refers to paragraph [0239] and to paragraph [0319] in this specification; the reference to paragraph [0239] (e.g., referring to paragraph [0239] in parenthesis) automatically refers to FIG. 1 and to paragraph [0319] in this specification.

<<Stereo Audio Data Output Function>>

Paragraph [0322.3] through paragraph [0322.15] illustrate the stereo audio data output function which enables Communication Device 200 to output audio data from Speakers 216L and 216R (paragraph [0319]) in a stereo fashion.

This paragraph [0322.3] illustrates the storage area included in Host Data Storage Area H00c (paragraph [0277]) of Host H (paragraph [0276]). As described in paragraph [0322.3], Host Data Storage Area H00c includes Stereo Audio Information Storage Area H22a. Stereo Audio Information Storage Area H22a stores the software programs and data necessary to implement the present function as described in details hereinafter.

This paragraph [0322.4] illustrates the storage areas included in Stereo Audio Information Storage Area H22a (paragraph [0322.3]). As described in paragraph [0322.4], Stereo Audio Information Storage Area H22a includes Stereo Audio Software Storage Area H22b and Stereo Audio Data Storage Area H22c. Stereo Audio Software Storage Area H22b stores the software programs necessary to implement the present function, such as the one described in paragraph [0322.7] hereinafter. Stereo Audio Data Storage Area H22c stores the data necessary to implement the present function, such as the ones described in paragraph [0322.5] hereinafter.

This paragraph [0322.5] illustrates the stereo audio data stored in Stereo Audio Data Storage Area H22c (paragraph [0322.4]). A plurality of stereo audio data are stored in Stereo Audio Data Storage Area H22c. In the example described in paragraph [0322.5], three stereo audio data, i.e., Stereo Audio Data H22c1, Stereo Audio Data H22c2, and Stereo Audio Data H22c3 are stored therein.

This paragraph [0322.6] illustrates the components of the stereo audio data stored in Stereo Audio Data Storage Area H22c (paragraph [0322.5]). paragraph [0322.6] describes the components of Stereo Audio Data H22c1 (paragraph [0322.5]) as an example. As described in paragraph [0322.6], Stereo Audio Data H22c1 includes Left Speaker Audio Data H22c1L, Right Speaker Audio Data H22c1R, and Stereo Audio Data Output Timing Data H22c1T. Left Speaker Audio Data H22c1L is an audio data which is designed to be output from Speaker 216L (paragraph [0319]). Right Speaker Audio Data H22c1R is an audio data which is designed to be output from Speaker 216R (paragraph [0319]). Stereo Audio Data Output Timing Data H22c1T is a timing data which is utilized to synchronize the output of both Left Speaker Audio Data H22c1L and Right Speaker Audio Data H22c1R from Speaker 216R and Speaker 216L respectively.

This paragraph [0322.7] illustrates the sequence of the software program stored in Stereo Audio Software Storage Area H22b (paragraph [0322.4]). Referring to paragraph [0322.7], the software program stored in Stereo Audio Software Storage Area H22b extracts one of the stereo audio data stored in Stereo Audio Data Storage Area H22c (paragraph [0322.5]) and creates Transferred Stereo Audio Data TSAD for purposes of transferring the extracted stereo audio data to Communication Device 200 (S1).

This paragraph [0322.8] illustrates the components of Transferred Stereo Audio Data TSAD created by the software program stored in Stereo Audio Software Storage Area H22b (paragraph [0322.7]). As described in paragraph [0322.8], Transferred Stereo Audio Data TSAD is composed of Header TSAD1, Com Device ID TSAD2, Host ID TSAD3, Transferred Stereo Audio Data TSAD4, and Footer TSAD5. Com Device ID TSAD2 indicates the identification of Communication Device 200, Host ID TSAD3 indicates the identification of Host H (paragraph [0276]), and Transferred Stereo Audio Data TSAD4 is the stereo audio data extracted in the manner described in paragraph [0322.7]. Header TSAD1 and Footer TSAD5 indicate the beginning and the end of Transferred Stereo Audio Data TSAD.

This paragraph [0322.9] illustrates the storage area included in RAM 206 (FIG. 1) of Communication Device 200 (paragraph [0276]). As described in paragraph [0322.9], RAM 206 includes Stereo Audio Information Storage Area 20622a. Stereo Audio Information Storage Area 20622a stores the software programs and data necessary to implement the present function as described in details hereinafter.

This paragraph [0322.10] illustrates the storage areas included in Stereo Audio Information Storage Area 20622a (paragraph [0322.9]). As described in paragraph [0322.10], Stereo Audio Information Storage Area 20622a includes Stereo Audio Software Storage Area 20622b and Stereo Audio Data Storage Area 20622c. Stereo Audio Software Storage Area 20622b stores the software programs necessary to implement the present function, such as the ones described in paragraph [0322.14] and paragraph [0322.15] hereinafter. Stereo Audio Data Storage Area 20622c stores the data necessary to implement the present function, such as the ones described in paragraph [0322.11] hereinafter.

This paragraph [0322.11] illustrates the stereo audio data stored in Stereo Audio Data Storage Area 20622c (paragraph [0322.10]). A plurality of stereo audio data are stored in Stereo Audio Data Storage Area 20622c. In the example described in paragraph [0322.11], three stereo audio data, i.e., Stereo Audio Data 20622c1, Stereo Audio Data 20622c2, and Stereo Audio Data 20622c3 are stored therein.

This paragraph [0322.12] illustrates the components of the stereo audio data stored in Stereo Audio Data Storage Area 20622c (paragraph [0322.11]). paragraph [0322.12] describes the components of Stereo Audio Data 20622c1 (paragraph [0322.11]) as an example. As described in paragraph [0322.12], Stereo Audio Data 20622c1 includes Left Speaker Audio Data 20622c1L, Right Speaker Audio Data 20622c1R, and Stereo Audio Data Output Timing Data 20622c1T. Left Speaker Audio Data 20622c1L is an audio data which is designed to be output from Speaker 216L (paragraph [0319]). Right Speaker Audio Data 20622c1R is an audio data which is designed to be output from Speaker 216R (paragraph [0319]). Stereo Audio Data Output Timing Data 20622c1T is a timing data which is utilized to synchronize the output of both Left Speaker Audio Data 20622c1L and Right Speaker Audio Data 20622c1R from Speaker 216R and Speaker 216L respectively.

With regard to the process of selecting and downloading the stereo audio data to Communication Device 200, the concept illustrated in paragraph [0592] through paragraph [0598] applies hereto. The downloaded stereo audio data are stored in specific area(s) of Stereo Audio Data Storage Area 20622c (paragraph [0322.11]). This paragraph [0322.14] illustrates the sequence of selecting and preparing to output the stereo audio data from Speakers 216L and 216R (paragraph [0319]) in a stereo fashion. As described in paragraph [0322.14], a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622c1 is selected (paragraph [0322.11]) in S2, CPU 211 (FIG. 1) retrieves Left Speaker Audio Data 20622c1L (S3), Right Speaker Audio Data 20622c1R (S4), and Stereo Audio Data Output Timing Data 20622c1T from Stereo Audio Data Storage Area 20622c (paragraph [0322.11]) (S5).

This paragraph [0322.15] illustrates the sequence of outputting the stereo audio data from Speakers 216L and 216R (paragraph [0319]) in a stereo fashion. As described in paragraph [0322.15], the user of Communication Device 200 inputs a specific signal to output the stereo audio data by utilizing Input Device 210 (FIG. 1) or via voice recognition system (S1). Assuming Audio Data 20622c1 (paragraph [0322.11]) is selected in S2 of paragraph [0322.14], CPU 211 outputs Left Speaker Audio Data 20622c1L (paragraph [0322.12]) and Right Speaker Audio Data 20622c1R (paragraph [0322.12]) from Speakers 216L and 216R respectively in a stereo fashion in accordance with Stereo Audio Data Output Timing Data 20622c1T (paragraph [0322.12]) (S2).

<<Stereo Visual Data Output Function>>

Paragraph [0325] through paragraph [0337] illustrate the stereo visual data output function which enables Communication Device 200 to output visual data from LCDs 201L and 201R (paragraph [0319]) in a stereo fashion. This paragraph [0325] illustrates the storage area included in Host Data Storage Area H00c (paragraph [0277]) of Host H (paragraph [0276]). Host Data Storage Area H00c includes Stereo Visual Information Storage Area H23a. Stereo Visual Information Storage Area H23a stores the software programs and data necessary to implement the present function as described in details hereinafter.

This paragraph [0326] illustrates the storage areas included in Stereo Visual Information Storage Area H23a (paragraph [0325]). Stereo Visual Information Storage Area H23a includes Stereo Visual Software Storage Area H23b and Stereo Visual Data Storage Area H23c. Stereo Visual Software Storage Area H23b stores the software programs necessary to implement the present function, such as the one described in paragraph [0329] hereinafter. Stereo Visual Data Storage Area H23c stores the data necessary to implement the present function, such as the ones described in paragraph [0327] hereinafter.

This paragraph [0327] illustrates the stereo visual data stored in Stereo Visual Data Storage Area H23c (paragraph [0326]). A plurality of stereo visual data are stored in Stereo Visual Data Storage Area H23c. Three stereo visual data, i.e., Stereo Visual Data H23c1, Stereo Visual Data H23c2, and Stereo Visual Data H23c3 are stored therein.

This paragraph [0328] illustrates the components of the stereo visual data stored in Stereo Visual Data Storage Area H23c (paragraph [0327]). This paragraph [0328] describes the components of Stereo Visual Data H23c1 (paragraph [0327]) as an example. Stereo Visual Data H23c1 includes Left LCD Visual Data H23c1L, Right LCD Visual Data H23c1R, and Stereo Visual Data Output Timing Data H23c1T. Left LCD Visual Data H23c1L is a visual data which is designed to be output from LCD 201L (paragraph [0319]). Right LCD Visual Data H23c1R is a visual data which is designed to be output from LCD 201R (paragraph [0319]). Stereo Visual Data Output Timing Data H23c1T is a timing data which is utilized to synchronize the output of both Left LCD Visual Data H23c1L and Right LCD Visual Data H23c1R from LCD 201R and LCD 201L respectively.

This paragraph [0329] illustrates the sequence of the software program stored in Stereo Visual Software Storage Area H23b (paragraph [0326]). The software program stored in Stereo Visual Software Storage Area H23b extracts one of the stereo visual data stored in Stereo Visual Data Storage Area H23c (paragraph [0327]) and creates Transferred Stereo Visual Data TSVD for purposes of transferring the extracted stereo visual data to Communication Device 200 (S1).

This paragraph [0330] illustrates the components of Transferred Stereo Visual Data TSVD created by the software program stored in Stereo Visual Software Storage Area H23b (paragraph [0329]). Transferred Stereo Visual Data TSVD is composed of Header TSVD1, Com Device ID TSVD2, Host ID TSVD3, Transferred Stereo Visual Data TSVD4, and Footer TSVD5. Com Device ID TSVD2 indicates the identification of Communication Device 200, Host ID TSVD3 indicates the identification of Host H (paragraph [0276]), and Transferred Stereo Visual Data TSVD4 is the stereo visual data extracted in the manner described in paragraph [0329]. Header TSVD1 and Footer TSVD5 indicate the beginning and the end of Transferred Stereo Visual Data TSVD.

This paragraph [0331] illustrates the storage area included in RAM 206 (FIG. 1) of Communication Device 200 (paragraph [0276]). RAM 206 includes Stereo Visual Information Storage Area 20623a. Stereo Visual Information Storage Area 20623a stores the software programs and data necessary to implement the present function as described in details hereinafter.

This paragraph [0332] illustrates the storage areas included in Stereo Visual Information Storage Area 20623a (paragraph [0331]). Stereo Visual Information Storage Area 20623a includes Stereo Visual Software Storage Area 20623b and Stereo Visual Data Storage Area 20623c. Stereo Visual Software Storage Area 20623b stores the software programs necessary to implement the present function, such as the ones described in paragraph [0336] and paragraph [0337] hereinafter. Stereo Visual Data Storage Area 20623c stores the data necessary to implement the present function, such as the ones described in paragraph [0333] hereinafter.

This paragraph [0333] illustrates the stereo visual data stored in Stereo Visual Data Storage Area 20623c (paragraph [0332]). A plurality of stereo visual data are stored in Stereo Visual Data Storage Area 20623c. Three stereo visual data, i.e., Stereo Visual Data 20623c1, Stereo Visual Data 20623c2, and Stereo Visual Data 20623c3 are stored therein.

This paragraph [0334] illustrates the components of the stereo visual data stored in Stereo Visual Data Storage Area 20623c (paragraph [0333]). This paragraph [0334] describes the components of Stereo Visual Data 20623c1 (paragraph [0333]) as an example. Stereo Visual Data 20623c1 includes Left LCD Visual Data 20623c1L, Right LCD Visual Data 20623c1R, and Stereo Visual Data Output Timing Data 20623c1T. Left LCD Visual Data 20623c1L is a visual data which is designed to be output from LCD 201L (paragraph [0319]). Right LCD Visual Data 20623c1R is a visual data which is designed to be output from LCD 201R (paragraph [0319]). Stereo Visual Data Output Timing Data 20623c1T is a timing data which is utilized to synchronize the output of both Left LCD Visual Data 20623c1L and Right LCD Visual Data 20623c1R from LCD 201R and LCD 201L respectively.

With regard to the process of selecting and downloading the stereo visual data to Communication Device 200, the concept illustrated in paragraph [0592] through paragraph [0598] applies hereto. The downloaded stereo visual data are stored in specific area(s) of Stereo Visual Data Storage Area 20623c (paragraph [0333]).

This paragraph [0336] illustrates the sequence of selecting and preparing to output the stereo visual data from LCDs 201L and 201R (paragraph [0319]) in a stereo fashion. A list of stereo visual data is displayed on LCD 201 (FIG. 1) (S1). The user of Communication Device 200 selects one stereo visual data by utilizing Input Device 210 (FIG. 1) or via voice recognition system (S2). Assuming Stereo Visual Data 20623c1 is selected (paragraph [0333]) in S2, CPU 211 (FIG. 1) retrieves Left LCD Visual Data 20623c1L (S3), Right LCD Visual Data 20623c1R (S4), and Stereo Visual Data Output Timing Data 20623c1T from Stereo Visual Data Storage Area 20623c (paragraph [0333]) (S5).

This paragraph [0337] illustrates the sequence of outputting the stereo visual data from LCDs 201L and 201R (paragraph [0319]) in a stereo fashion. The user of Communication Device 200 inputs a specific signal to output the stereo visual data by utilizing Input Device 210 (FIG. 1) or via voice recognition system (S1). Assuming Visual Data 20623c1 (paragraph [0333]) is selected in S2 of paragraph [0336], CPU 211 outputs Left LCD Visual Data 20623c1L (paragraph [0334]) and Right LCD Visual Data 20623c1R (paragraph [0334]) from LCDs 201L and 201R respectively in a stereo fashion in accordance with Stereo Visual Data Output Timing Data 20623c1T (paragraph [0334]) (S2).

<<Multiple Signal Processing Function>>

Paragraph [0340] through paragraph [0395] illustrate the multiple signal processing function which enables Communication Device 200 to implement wireless communication in various types of wireless signals, for example, cdma2000, W-CDMA, and TDS-CDMA (For the avoidance of doubt, the term 'TDS-CDMA' is equivalent to 'TDD' and 'TD-CDMA' in this specification).

This paragraph [0340] illustrates the elements of Signal Processor 208 (FIG. 1). Signal Processor 208 includes CDMA2000 Signal Processor 20824a, W-CDMA Signal Processor 20824b, TDS-CDMA Signal Processor 20824c, and Signal Type Detector 20824d. CDMA2000 Signal Processor 20824a is a hardware circuit to convert the cdma2000 signals into CPU readable data and to convert the CPU readable data into cdma 2000 signals. W-CDMA Signal Processor 20824b is a hardware circuit to convert the W-CDMA signals into CPU readable data and to convert the CPU readable data into W-CDMA signals. TDS-CDMA Signal Processor 20824c is a hardware circuit to convert the TDS-CDMA signals into CPU readable data and to convert the CPU readable data into TDS-CDMA signals. Signal Type Detector 20824d is a hardware circuit to detect the type of the signal received via Antenna 218 of which the elements are described in paragraph [0341] hereinafter. For the avoidance of doubt, process or signal process means converting a certain type of signal into a CPU readable data and/or converting a CPU readable data into a certain type of signal in this specification.

This paragraph [0341] illustrates the elements of Signal Type Detector 20824d (paragraph [0340]). Signal Type Detector 20824d includes Signal Type Detecting Software Storage Area 20824d1 and Signal Processing CPU 20824d2. Signal Type Detecting Software Storage Area 20824d1 stores the software programs to detect the type of the signal to be utilized for the signal process of which the sequence is described hereinafter. Signal Processing CPU 20824*d*2 is a central processing unit to execute the software program stored in Signal Type Detecting Software Storage Area 20824*d*1.

This paragraph [0342] illustrates the software program stored in Signal Type Detecting Software Storage Area 20824*d*1 (paragraph [0341]) executed by Signal Processing CPU 20824*d*2 (paragraph [0341]) to send an inquiry signal. Here, the inquiry signal is a signal sent via Antenna 218 (FIG. 1) to identify the type of signal to be utilized for the signal process. Signal Processing CPU 20824*d*2 periodically sends inquiry signals by utilizing cdma2000 signal, W-CDMA signal, and TDS-CDMA signal via Antenna 218 (FIG. 1).

This paragraph [0343] illustrates the software program stored in Signal Type Detecting Software Storage Area 20824*d*1 (paragraph [0341]) executed by Signal Processing CPU 20824*d*2 (paragraph [0341]) to determine the type of signal to be utilized for the signal process. Signal Processing CPU 20824*d*2 periodically checks the incoming signals received via Antenna 218 (FIG. 1) (S1). If the incoming signal is a response signal of a certain signal level (S2), Signal Processing CPU 20824*d*2 identifies the type of the signal, and sets a path to the relevant signal processor and forwards the received signal thereto (S4). For example, if the identified signal is a cdma2000 signal, Signal Processing CPU 20824*d*2 sets a path to CDMA2000 Signal Processor 20824*a* (paragraph [0340]) and forwards the received signal thereto. If the identified signal is a W-CDMA signal, Signal Processing CPU 20824*d*2 sets a path to W-CDMA Signal Processor 20824*b* (paragraph [0340]) and forwards the received signal thereto. If the identified signal is a TDS-CDMA signal, Signal Processing CPU 20824*d*2 sets a path to TDS-CDMA Signal Processor 20824*c* (paragraph [0340]) and forwards the received signal thereto. The signal processor to which the path is set performs the signal process hereafter.

This paragraph [0344] illustrates the second embodiment of Signal Processor 208. Signal Processor 208 includes CDMA2000 Signal Processor 20824*a*, W-CDMA Signal Processor 20824*b*, and TDS-CDMA Signal Processor 20824*c*, all of which are directly connected to Antenna 218 (FIG. 1). CDMA2000 Signal Processor 20824*a* is a hardware circuit to process cdma2000 signals of which the details are described in paragraph [0345] through paragraph [0347]. W-CDMA Signal Processor 20824*b* is a hardware circuit to process W-CDMA signals of which the details are described in paragraph [0348] through paragraph [0350]. TDS-CDMA Signal Processor 20824*c* is a hardware circuit to process TDS-CDMA signals of which the details are described in paragraph [0351] through paragraph [0353].

This paragraph [0345] illustrates CDMA2000 Signal Processor 20824*a* (paragraph [0344]) of the second embodiment. CDMA2000 Signal Processor 20824*a* includes CDMA2000 Signal Processing Software Storage Area 20824*a*1 of which the software program stored therein is described in paragraph [0346] and paragraph [0347] hereinafter.

This paragraph [0346] illustrates the software program stored in CDMA2000 Signal Processing 24*a*1 (paragraph [0345]) to send an inquiry signal. Here, the inquiry signal is a cdma2000 signal sent via Antenna 218 (FIG. 1) to identify the type of signal to be utilized for the signal process. The identification of the type of signal is performed by sending an inquiry signal which requests for a response signal, and identifying the type of the response signal which is sent to Communication Device 200 in response to the inquiry signal. CDMA2000 Signal Processor 20824*a* periodically sends an inquiry signal by utilizing cdma2000 signal via Antenna 218 (FIG. 1).

This paragraph [0347] illustrates the software program stored in CDMA2000 Signal Processing Software Storage Area 20824*a*1 (paragraph [0345]). CDMA2000 Signal Processor 20824*a* (paragraph [0345]) periodically checks the incoming signal received via Antenna 218 (FIG. 1) (S1). If the incoming signal is a response signal utilizing cdma2000 signal (S2), CDMA2000 Signal Processor 20824*a* initiates the signal process by utilizing cdma2000 signal (S3). This paragraph [0348] illustrates W-CDMA Signal Processor 20824*b* (paragraph [0344]) of the second embodiment. W-CDMA Signal Processor 20824*b* includes W-CDMA Signal Processing Software Storage Area 20824*b*1 of which the software program stored therein is described in paragraph [0349] and paragraph [0350] hereinafter.

This paragraph [0349] illustrates the software program stored in W-CDMA Signal Processing Software Storage Area 20824*b*1 (paragraph [0348]) to send an inquiry signal. Here, the inquiry signal is a W-CDMA signal sent via Antenna 218 (FIG. 1) to identify the type of signal to be utilized for the signal process. The identification of the type of signal is performed by sending an inquiry signal which requests for a response signal, and identifying the type of the response signal which is sent to Communication Device 200 in response to the inquiry signal. Referring to paragraph [0346], W-CDMA Signal Processor 20824*b* (paragraph [0348]) periodically sends an inquiry signal by utilizing W-CDMA signal via Antenna 218 (FIG. 1).

This paragraph [0350] illustrates the software program stored in W-CDMA Signal Processing Software Storage Area 20824*b*1 (paragraph [0348]). W-CDMA Signal Processor 20824*b* (paragraph [0348]) periodically checks the incoming signal received via Antenna 218 (FIG. 1) (S1). If the incoming signal is a response signal utilizing W-CDMA signal (S2), W-CDMA Signal Processor 20824*b* initiates the signal process by utilizing W-CDMA signal (S3).

This paragraph [0351] illustrates TDS-CDMA Signal Processor 20824*c* (paragraph [0344]) of the second embodiment. TDS-CDMA Signal Processor 20824*c* includes TDS-CDMA Signal Processing Software Storage Area 20824*c*1 of which the software program stored therein is described in paragraph [0352] and paragraph [0353] hereinafter.

This paragraph [0352] illustrates the software program stored in TDS-CDMA Signal Processing Software Storage Area 20824*c*1 (paragraph [0351]) to send an inquiry signal. Here, the inquiry signal is a TDS-CDMA signal sent via Antenna 218 (FIG. 1) to identify the type of signal to be utilized for the signal process. The identification of the type of signal is performed by sending an inquiry signal which requests for a response signal, and identifying the type of the response signal which is sent to Communication Device 200 in response to the inquiry signal. TDS-CDMA Signal Processor 20824*c* (paragraph [0351]) periodically sends an inquiry signal by utilizing TDS-CDMA signal via Antenna 218 (FIG. 1).

This paragraph [0353] illustrates the software program stored in TDS-CDMA Signal Processing Software Storage Area 20824*c*1. TDS-CDMA Signal Processor 20824*c* (paragraph [0351]) periodically checks the incoming signal received via Antenna 218 (FIG. 1) (S1). If the incoming signal is a response signal utilizing TDS-CDMA signal (S2), TDS-CDMA Signal Processor 20824*c* initiates the signal process by utilizing TDS-CDMA signal (S3).

Paragraph [0355] through paragraph [0357] illustrate the third embodiment to implement the present function by utilizing a minimum amount of hardware circuits.

This paragraph [0355] illustrates the elements of Signal Processor 208 (FIG. 1). Signal Processor 208 includes Signal Type Detector 20824*d*, CDMA2000 Signal Processing Software Archive 20824*e*, W-CDMA Signal Processing Software Archive 20824*f*, TDS-CDMA Signal Processing Software Archive 20824*g*, and Signal Processing Work Area 20824*h*. Signal Type Detector 20824*d* is a hardware circuit to detect the type of the signal received via Antenna 218 of which the elements are same as the ones described in paragraph [0341]. CDMA2000 Signal Processing Software Archive 20824*e* stores the software programs in a compressed format which processes cdma2000 signals. W-CDMA Signal Processing Software Archive 20824*f* stores the software programs in a compressed format which processes W-CDMA signals. TDS-CDMA Signal Processing Software Archive 20824*g* stores the software programs in a compressed format which process TDS-CDMA signals. Signal Processing Work Area 20824*h* is a work area for one or more of the software programs to be executed of which the sequence is described in paragraph [0357].

This paragraph [0356] illustrates the software program stored in Signal Type Detecting Software Storage Area 20824*d*1 (paragraph [0341]) executed by Signal Processing CPU 20824*d*2 (paragraph [0341]) to send an inquiry signal. Here, the inquiry signal is a signal sent via Antenna 218 (FIG. 1) to identify the type of signal to be utilized for the signal process. Signal Processing CPU 20824*d*2 periodically sends inquiry signals by cdma2000 signal, W-CDMA signal, and TDS-CDMA signal via Antenna 218 (FIG. 1).

This paragraph [0357] illustrates the sequence of Signal Processor 208 (FIG. 1) in the third embodiment. Signal Processing CPU 20824*d*2 (paragraph [0341]) periodically checks the incoming signals received via Antenna 218 (FIG. 1) (S1). If an incoming signal is received, Signal Processing CPU 20824*d*2 determines whether the incoming signal is a response signal (S2), and identifies the type of the signal (S3). Signal Processing CPU 20824*d*2 unpacks the corresponding software program stored in Signal Processor 208 thereafter (S4). Signal Processing CPU 20824*d*2 executes the unpacked software program to initiate the signal process therewith (S5). For example, If Signal Processing CPU 20824*d*2 identifies that the response signal is a cdma2000 signal, it unpacks the compressed software program stored in CDMA2000 Signal Processing Software Archive 20824*e* (paragraph [0355]) and initiates the signal process by utilizing Signal Processing Work Area 20824*h* (paragraph [0355]). If Signal Processing CPU 20824*d*2 identifies that the response signal is a W-CDMA signal, it unpacks the compressed software program stored in W-CDMA Signal Processing Software Archive 20824*f* and initiates the signal process by utilizing Signal Processing Work Area 20824*h*. If Signal Processing CPU 20824*d*2 identifies that the received signal is a TDS-CDMA signal, it unpacks the compressed software program stored in TDS-CDMA Signal Processing Software Archive 20824*g* and initiates the signal process by utilizing Signal Processing Work Area 20824*h*.

Paragraph [0359] through paragraph [0375] illustrate the fourth embodiment to implement the present function by utilizing a hardware circuit for processing cdma2000 signal and utilizing software programs for processing the other types of signals.

This paragraph [0359] illustrates the elements of Signal Processor 208 (FIG. 1). Signal Processor 208 includes Signal Type Detector 20824*d*, CDMA2000 Signal Processor 20824*a*, W-CDMA Signal Processing Software Archive 20824*f*, TDS-CDMA Signal Processing Software Archive 20824*g*, and Signal Processing Work Area 20824*h*. Signal Type Detector 20824*d* is a hardware circuit to detect the type of the signal received via Antenna 218 of which the elements are same as the ones described in paragraph [0341]. CDMA2000 Signal Processor 20824*a* is a hardware circuit to process cdma2000 signals of which the details are described in paragraph [0362]. W-CDMA Signal Processing Software Archive 20824*f* stores a software program in a compressed format which processes W-CDMA signals. TDS-CDMA Signal Processing Software Archive 20824*g* stores a software program in a compressed format which processes TDS-CDMA signals. Signal Processing Work Area 20824*h* is a work area for one or more of the software programs to be executed of which the sequence is described in paragraph [0363].

This paragraph [0360] illustrates the software program stored in Signal Type Detecting Software Storage Area 20824*d*1 (paragraph [0341]) executed by Signal Processing CPU 20824*d*2 (paragraph [0341]) to send an inquiry signal. Here, the inquiry signal is a signal sent via Antenna 218 (FIG. 1) to identify the type of signal to be utilized for the signal process. Signal Processing CPU 20824*d*2 periodically sends inquiry signals by cdma2000 signal, W-CDMA signal, and TDS-CDMA signal via Antenna 218 (FIG. 1).

This paragraph [0361] illustrates the software program stored in Signal Type Detecting Software Storage Area 20824*d*1 (paragraph [0341]) executed by Signal Processing CPU 20824*d*2 (paragraph [0341]). Signal Processing CPU 20824*d*2 periodically checks the incoming signal received via Antenna 218 (FIG. 1) (S1). If an incoming signal is received, Signal Processing CPU 20824*d*2 determines whether the incoming signal is a response signal (S2), and identifies the type of the signal (S3). Signal Processing CPU 20824*d*2 thereafter sets a path to the relevant signal processor (S4). For example, if the identified signal is a cdma2000 signal, Signal Processing CPU 20824*d*2 sets a path to CDMA2000 Signal Processor 20824*a* (paragraph [0359]) of which the remaining process is described in paragraph [0362]. If the identified signal is a W-CDMA signal or a TDS-CDMA signal, Signal Processing CPU 20824*d*2 sets a path to Signal Processing Work Area 20824*h* (paragraph [0359]) of which the remaining process is described in paragraph [0363].

This paragraph [0362] illustrates the sequence of CDMA2000 Signal Processor 20824*a* (paragraph [0359]). CDMA2000 Signal Processor 20824*a* processes cdma2000 signal received from Signal Type Detector 20824*d* (paragraph [0359]), and converts the cdma2000 signals into CPU readable data. CDMA2000 Signal Processor 20824*a* also converts CPU readable data into cdma signals.

This paragraph [0363] illustrates the sequence of Signal Processing CPU 20824*d*2 (paragraph [0341]). Signal Processing CPU 20824*d*2 unpacks the corresponding software program stored in Signal Processor 208 (S1), and executes the unpacked software program (S2). The unpacked software program performs the signal process thereafter (S2). For example, if Signal Processing CPU 20824*d*2 identifies that the received signal is a W-CDMA signal in S3 of paragraph [0361], it unpacks the compressed software program stored in W-CDMA Signal Processing Software Archive 20824*f* (paragraph [0359]) and initiates the signal process by utilizing Signal Processing Work Area 20824*h* (paragraph [0359]). If Signal Processing CPU 20824*d*2 identifies that the received signal is a TDS-CDMA signal in S3 of paragraph [0361], it unpacks the compressed software program stored in TDS-CDMA Signal Processing Software Archive 20824*g* (paragraph [0359]) and initiates the signal process by utilizing Signal Processing Work Area 20824*h*.

Paragraph [0365] through paragraph [0369] illustrate another variation of the fourth embodiment to implement the present function by utilizing a hardware circuit for processing W-CDMA signal and utilizing software programs for processing the other types of signals.

This paragraph [0365] illustrates the elements of Signal Processor 208 (FIG. 1). Signal Processor 208 includes Signal Type Detector 20824d, W-CDMA Signal Processor 20824b, CDMA2000 Signal Processing Software Archive 20824e, TDS-CDMA Signal Processing Software Archive 20824g, and Signal Processing Work Area 20824h. Signal Type Detector 20824d is a hardware circuit to detect the type of the signal received via Antenna 218 of which the elements are same as the ones described in paragraph [0341]. W-CDMA Signal Processor 20824b is a hardware circuit to process W-CDMA signals of which the details are described in paragraph [0368]. CDMA2000 Signal Processing Software Archive 20824e stores a software program in a compressed format which processes cdma2000 signals. TDS-CDMA Signal Processing Software Archive 20824g stores a software program in a compressed format which processes TDS-CDMA signals. Signal Processing Work Area 20824h is a work area for one or more of the software programs to be executed of which the sequence is described in paragraph [0369].

This paragraph [0366] illustrates the software program stored in Signal Type Detecting Software Storage Area 20824d1 (paragraph [0341]) executed by Signal Processing CPU 20824d2 (paragraph [0341]) to send an inquiry signal. Here, the inquiry signal is a signal sent via Antenna 218 (FIG. 1) to identify the type of signal to be utilized for the signal process. Signal Processing CPU 20824d2 periodically sends inquiry signals by cdma2000 signal, W-CDMA signal, and TDS-CDMA signal via Antenna 218 (FIG. 1).

This paragraph [0367] illustrates the software program stored in Signal Type Detecting Software Storage Area 20824d1 (paragraph [0341]) executed by Signal Processing CPU 20824d2 (paragraph [0341]). Signal Processing CPU 20824d2 periodically checks the incoming signal received via Antenna 218 (FIG. 1) (S1). If an incoming signal is received, Signal Processing CPU 20824d2 determines whether the incoming signal is a response signal (S2), and identifies the type of the signal (S3). Signal Processing CPU 20824d2 thereafter sets a path to the relevant signal processor (S4). For example, if the identified signal is a W-CDMA signal, Signal Processing CPU 20824d2 sets a path to W-CDMA Signal Processor 20824b (paragraph [0365]) of which the remaining process is described in paragraph [0368]. If the identified signal is a cdma2000 signal or a TDS-CDMA signal, Signal Processing CPU 20824d2 sets a path to Signal Processing Work Area 20824h (paragraph [0365]) of which the remaining process is described in paragraph [0369].

This paragraph [0368] illustrates the sequence of W-CDMA Signal Processor 20824b (paragraph [0365]). W-CDMA Signal Processor 20824b processes W-CDMA signal received from Signal Type Detector 20824d (paragraph [0365]), and converts the W-CDMA signal into CPU readable data. W-CDMA Signal Processor 20824b also converts CPU readable data into cdma signals.

This paragraph [0369] illustrates the sequence of Signal Processing CPU 20824d2 (paragraph [0341]). Signal Processing CPU 20824d2 unpacks the corresponding software program stored in Signal Processor 208 (S1), and executes the unpacked software program (S2). The unpacked software program performs the signal process thereafter (S2). For example, if Signal Processing CPU 20824d2 identifies that the received signal is a cdma2000 signal in S3 of paragraph [0367], it unpacks the compressed software program stored in CDMA2000 Signal Processing Software Archive 20824e (paragraph [0365]) and initiates the signal process by utilizing Signal Processing Work Area 20824h (paragraph [0365]). If Signal Processing CPU 20824d2 identifies that the received signal is a TDS-CDMA signal in S3 of paragraph [0367], it unpacks the compressed software program stored in TDS-CDMA Signal Processing Software Archive 20824g (paragraph [0365]) and initiates the signal process by utilizing Signal Processing Work Area 20824h.

Paragraph [0371] through paragraph [0375] illustrate another variation of the fourth embodiment to implement the present function by utilizing a hardware circuit for processing TDS-CDMA signal and utilizing software programs for processing the other types of signals.

This paragraph [0371] illustrates the elements of Signal Processor 208 (FIG. 1). Signal Processor 208 includes Signal Type Detector 20824d, TDS-CDMA Signal Processor 20824c, CDMA2000 Signal Processing Software Archive 20824e, W-CDMA Signal Processing Software Archive 20824f, and Signal Processing Work Area 20824h. Signal Type Detector 20824d is a hardware circuit to detect the type of the signal received via Antenna 218 of which the elements are same as the ones described in paragraph [0341]. TDS-CDMA Signal Processor 20824c is a hardware circuit to process TDS-CDMA signals of which the details are described in paragraph [0374]. CDMA2000 Signal Processing Software Archive 20824e stores a software program in a compressed format which processes cdma2000 signals. W-CDMA Signal Processing Software Archive 20824f stores a software program in a compressed format which processes W-CDMA signals. Signal Processing Work Area 20824h is a work area for one or more of the software programs to be executed of which the sequence is described in paragraph [0375].

This paragraph [0372] illustrates the software program stored in Signal Type Detecting Software Storage Area 20824d1 (paragraph [0341]) executed by Signal Processing CPU 20824d2 (paragraph [0341]) to send an inquiry signal. Here, the inquiry signal is a signal sent via Antenna 218 (FIG. 1) to identify the type of signal to be utilized for the signal process. Signal Processing CPU 20824d2 periodically sends inquiry signals by cdma2000 signal, W-CDMA signal, and TDS-CDMA signal via Antenna 218 (FIG. 1).

This paragraph [0373] illustrates the software program stored in Signal Type Detecting Software Storage Area 20824d1 (paragraph [0341]) executed by Signal Processing CPU 20824d2 (paragraph [0341]). Signal Processing CPU 20824d2 periodically checks the incoming signal received via Antenna 218 (FIG. 1) (S1). If an incoming signal is received, Signal Processing CPU 20824d2 determines whether the incoming signal is a response signal (S2), and identifies the type of the signal (S3). Signal Processing CPU 20824d2 thereafter sets a path to the relevant signal processor (S4). For example, if the identified signal is a TDS-CDMA signal, Signal Processing CPU 20824d2 sets a path to TDS-CDMA Signal Processor 20824c (paragraph [0371]) of which the remaining process is described in paragraph [0374]. If the identified signal is a cdma2000 signal or a W-CDMA signal, Signal Processing CPU 20824d2 sets a path to Signal Processing Work Area 20824h (paragraph [0371]) of which the remaining process is described in paragraph [0375].

This paragraph [0374] illustrates the sequence of TDS-CDMA Signal Processor 20824c (paragraph [0371]). TDS-CDMA Signal Processor 20824c processes TDS-CDMA signal received from Signal Type Detector 20824d (paragraph [0371]), and converts the W-CDMA signal into CPU readable data. TDS-CDMA Signal Processor 20824c also converts CPU readable data into TDS-CDMA signals.

This paragraph [0375] illustrates the sequence of Signal Processing CPU 20824d2 (paragraph [0341]). Signal Processing CPU 20824d2 unpacks the corresponding software program stored in Signal Processor 208 (S1), and executes the unpacked software program (S2). The unpacked software program performs the signal process thereafter (S2). For example, if Signal Processing CPU 20824d2 identifies that the received signal is a cdma2000 signal in S3 of paragraph [0373], it unpacks the compressed software program stored in CDMA2000 Signal Processing Software Archive 20824e (paragraph [0371]) and initiates the signal process by utilizing Signal Processing Work Area 20824h (paragraph [0371]). If Signal Processing CPU 20824d2 identifies that the received signal is a W-CDMA signal in S3 of paragraph [0373], it unpacks the compressed software program stored in W-CDMA Signal Processing Software Archive 20824f (paragraph [0371]) and initiates the signal process by utilizing Signal Processing Work Area 20824h.

Paragraph [0377] through paragraph [0382] illustrate the method to display on LCD 201 (FIG. 1) the type of signal currently utilized by Signal Processor 208 (FIG. 1).

This paragraph [0377] illustrates the item(s) displayed on LCD 201 (FIG. 1). The type of signal currently utilized by Signal Processor 208 (FIG. 1) is displayed on LCD 201. In the example, Message MS5 is displayed if cdma2000 signal is utilized for signal processing by Signal Processor 208, Message MS6 is displayed if W-CDMA signal is utilized for signal processing by Signal Processor 208, and Message MS7 is displayed if TDS-CDMA signal is utilized for signal processing by Signal Processor 208.

This paragraph [0378] illustrates the information stored in RAM 206 (FIG. 1). RAM 206 includes Multiple Signal Processing Information Storage Area 20624a in which the storage areas included are described in paragraph [0379] hereinafter.

This paragraph [0379] illustrates the storage areas included in Multiple Signal Processing Information Storage Area 20624a. Multiple Signal Processing Information Storage Area 20624a includes Multiple Signal Processing Software Storage Area 20624b and Multiple Signal Processing Data Storage Area 20624c. Multiple Signal Processing Software Storage Area 20624b stores the software programs necessary to implement the present function, such as the one described in paragraph [0382], and Multiple Signal Processing Data Storage Area 20624c stores the data necessary to implement the present function, such as the one described in paragraph [0380].

This paragraph [0380] illustrates the data stored in Multiple Signal Processing Data Storage Area 20624c (paragraph [0379]). Multiple Signal Processing Data Storage Area 20624c includes Message Data Storage Area 20624c1 in which the data stored are explained in paragraph hereinafter.

This paragraph [0381] illustrates the data stored in Message Data Storage Area 20624c1 (paragraph [0380]). Message Data Storage Area 20624c1 stores Message MS5, Message MS6, and Message MS7. Here, Message MS5 represents the text data indicating the word cdma2000, Message MS6 represents the text data indicating the word W-CDMA, and Message MS7 represents the text data indicating the word TDS-CDMA, all of which are displayed on LCD 201 (FIG. 1) as described in paragraph [0377].

This paragraph [0382] illustrates the software program store in Multiple Signal Processing Software Storage Area 20624b (paragraph [0379]). CPU 211 (FIG. 1) periodically checks the incoming signal received via Antenna 218 (FIG. 1) (S1). If an incoming signal is received, CPU 211 determines the type of the signal (S3). CPU 211 thereafter retrieves from Message Data Storage Area 20624c1 and displays the relevant text data on LCD 201 (FIG. 1) (S4). For example, CPU 211 displays Message MS5 if cdma2000 signal is detected. In the like manner, CPU 211 displays Message MS6 if W-CDMA signal is detected and Message MS7 if TDS-CDMA signal is detected. As another embodiment, the detection of the type of the signal utilized for signal processing may be delegated to Signal Processing CPU 20824d2 (paragraph [0341]).

For the avoidance of doubt, all software programs described hereinbefore to implement the present function may be executed solely by CPU 211 (FIG. 1) or by Signal Processing CPU 20824d2 (paragraph [0341]), or by both CPU 211 and Signal Processing CPU 20824d2.

<<Multiple Signal Processing Function—Simultaneous Multiple Signal Processing Function>>

Paragraph [0386] through paragraph [0395] illustrate the simultaneous multiple signal processing function which enables Communication Device 200 to process with multiple types of signals simultaneously. By utilizing the present function, Communication Device 200 is capable to signal process by utilizing cdma2000 signal, W-CDMA signal, and TDS-CDMA signal simultaneously.

This paragraph [0386] illustrates the information stored in Multiple Signal Processing Software Storage Area 20624b (paragraph [0379]). Multiple Signal Processing Software Storage Area 20624b includes Simultaneous Multiple Signal Processing Software Storage Area 20624b1. Simultaneous Multiple Signal Processing Software Storage Area 20624b1 stores the software programs to process cdma2000 signal, W-CDMA signal, and TDS-CDMA signal which are described in paragraph [0387] through paragraph [0389] hereinafter.

This paragraph [0387] illustrates the software program stored in Simultaneous Multiple Signal Processing Software Storage Area 20624b1 (paragraph [0386]) to process cdma2000 signal. Signal Processing CPU 20824d2 (paragraph [0341]) periodically checks the incoming signal (S1). If the incoming signal is cdma2000 signal of which the signal level exceeds value x (S2), Signal Processing CPU 20824d2 initiates the signal process by utilizing cdma2000 signal (S3).

This paragraph [0388] illustrates the software program stored in Simultaneous Multiple Signal Processing Software Storage Area 20624b1 (paragraph [0386]) to process W-CDMA signal. Signal Processing CPU 20824d2 (paragraph [0341]) periodically checks the incoming signal (S1). If the incoming signal is W-CDMA signal of which the signal level exceeds value x(S2), Signal Processing CPU 20824d2 initiates the signal process by utilizing W-CDMA signal (S3).

This paragraph [0389] illustrates the software program stored in Simultaneous Multiple Signal Processing Software Storage Area 20624b1 (paragraph [0386]) to process TDS-CDMA signal. Signal Processing CPU 20824d2 (paragraph [0341]) periodically checks the incoming signal (S1). If the incoming signal is TDS-CDMA signal of which the signal level exceeds value x (S2), Signal Processing CPU 20824d2 initiates the signal process by utilizing TDS-CDMA signal (S3).

Paragraph [0391] through paragraph [0395] illustrate the soft handover process of Communication Device 200 handovering from one type of signal to another type of signal. The current process is implemented when Communication Device 200 is moving from, for example, an area utilizing cdma2000 signal to another area utilizing W-CDMA signal.

This paragraph [0391] illustrates the storage area included in Multiple Signal Processing Software Storage Area 20624b (paragraph [0386]). Multiple Signal Processing Software Storage Area 20624*b* includes Soft Handover Processing Software Storage Area 20624*b*2 in which the software programs stored are explained in paragraph [0393] through paragraph [0395].

The soft handover process is primarily divided in three parts wherein the first part is described in paragraph [0393], the second part is described in paragraph [0394], and the third part is described in paragraph [0395].

This paragraph [0393] illustrates the software program stored in Soft Handover Processing Software Storage Area 20624*b*2 which implements the first part of the soft handover process. Signal Processing CPU 20824*d*2 (paragraph [0341]) periodically checks the status of the incoming signal (S1). If the level of the signal currently utilized (e.g., cdma2000 signal) exceeds the value x, the soft handover process is not initiated and Signal Processing CPU 20824*d*2 continues to utilize the type of signal (e.g., cdma2000 signal) for signal processing (S2). If the level of the signal currently utilized (e.g., cdma2000 signal) does not exceed the value x, on the other hand (S2), the soft handover process is initiated of which the details are described in paragraph (S3).

This paragraph [0394] illustrates the software program stored in Soft Handover Processing Software Storage Area 20624*b*2 (paragraph [0391]) which implements the second part of the soft handover process. Signal Processing CPU 20824*d*2 (paragraph [0341]) searches for other types of signals to maintain seamless connection (S1). If another type of signal (e.g., W-CDMA signal) of which the signal level exceeds the value y is found (S2), Signal Processing CPU 20824*d*2 initiates new connection utilizing such type (e.g., W-CDMA signal) to maintain seamless communication (S3).

This paragraph [0395] illustrates the software program stored in Soft Handover Processing Software Storage Area 20624*b*2 (paragraph [0393]) which implements the third part of the soft handover process. Signal Processing CPU 20824*d*2 (paragraph [0341]) periodically checks the current status of the signal level of the type of signal (e.g., cdma2000) which has been utilizing (S1). If the signal level of such type (e.g., cdma2000) still exceeds the value z, Signal Processing CPU 20824*d*2 maintains connection utilizing such type of signal (e.g., cdma2000) (S2). Here, Signal Processing CPU 20824*d*2 is utilizing two types of signals for the signal process (e.g., cdma2000 and W-CDMA) at this moment. On the other hand, if the signal level of such type (e.g., cdma2000) no longer exceeds the value z, Signal Processing CPU 20824*d*2 terminates to maintain connection utilizing such type of signal (e.g., cdma2000) (S3). Signal Processing CPU 20824*d*2 utilizes only the signal found in S2 of paragraph [0394] for the signal process thereafter.

For the avoidance of doubt, all software programs described hereinbefore to implement the present function may be executed solely by CPU 211 (FIG. 1) or by Signal Processing CPU 20824*d*2 (paragraph [0341]), or by both CPU 211 and Signal Processing CPU 20824*d*2.

As another embodiment, the multiple signal processing function may be utilized for processing other sets of combination of the signals, such as the 2G signal, the 3G signal, and the 4G signal. In order to implement this embodiment, the term 'cdma2000' is substituted by '2G', the term 'W-CDMA' is substituted by '3G', and the term 'TDS-CDMA' is substituted by '4G' in paragraph [0340] through paragraph [0395] for purposes of implementing the present embodiment. Here, the 2G signal may be of any type of signal categorized as 2G, including, but not limited to cdmaOne, GSM, and D-AMPS; the 3G signal may be of any type of signal categorized as 3G, including, but not limited to cdma2000, W-CDMA, and TDS-CDMA; and the 4G signal may be of any type of signal categorized as 4G.

As another embodiment, the multiple signal processing function may be utilized for processing the first type of 4G signal, the second type of 4G signal, and the third type of 4G signal. In order to implement this embodiment, the term 'cdma2000' is substituted by 'the first type of 4G signal', the term 'W-CDMA' is substituted by 'the second type of 4G signal', and the term 'TDS-CDMA' is substituted by 'the third type of 4G signal' in paragraph [0340] through paragraph [0395] for purposes of implementing the present embodiment. Here, the first type of 4G signal, the second type of 4G signal, and the third type of 4G signal may be of any type of signal categorized as 4G.

As another embodiment, the multiple signal processing function may be utilized for processing the 2G signal, the first type of 3G signal, and the second type of 3G signal. In order to implement this embodiment, the term 'cdma2000' is substituted by 'the 2G signal', the term 'W-CDMA' is substituted by 'the first type of 3G signal', and the term 'TDS-CDMA' is substituted by 'the second type of 3G signal' in paragraph [0340] through paragraph [0395] for purposes of implementing the present embodiment. Here, the 2G signal may be of any type of signal categorized as 2G, including, but not limited to cdmaOne, GSM, and D-AMPS; and the first type of 3G signal and the second type of 3G signal may be of any type of signal categorized as 3G, including, but not limited to cdma2000, W-CDMA, and TDS-CDMA.

As another embodiment, the multiple signal processing function may be utilized for processing the first type of 2G signal, the second type of 2G signal, and the 3G signal. In order to implement this embodiment, the term 'cdma2000' is substituted by 'the first type of 2G signal', the term 'W-CDMA' is substituted by 'the second type of 2G signal', and the term 'TDS-CDMA' is substituted by 'the 3G signal' in paragraph [0340] through paragraph [0395] for purposes of implementing the present embodiment. Here, the first type of 2G signal and the second type of 2G signal may be of any type of signal categorized as 2G, including, but not limited to cdmaOne, GSM, and D-AMPS; and the 3G signal may be of any type of signal categorized as 3G, including, but not limited to cdma2000, W-CDMA, and TDS-CDMA.

In sum, the multiple signal processing function described in paragraph [0340] through paragraph [0395] maybe utilized for processing any combination of any type of signal.

<<Positioning System—Pin-Pointing Function>>

Paragraph [0404] through paragraph [0430] illustrate the pin-pointing function of positioning system which enables Communication Device 200 to display the accurate location of another wireless communication device in an artificial structure, such as a non-movable structure (e.g., building and house) and a movable structure (e.g., train, airplane, space shuttle, and space station). An example of Device A displaying the location of Device B is utilized hereinafter wherein both Device A and Device B are Communication Devices 200.

This paragraph [0404] illustrates a building in which Device B is located. Building 25BLD is composed of Basement 25BSM1 (the basement), Floor 25FLR1 (the first floor), Floor 25FLR2 (the second floor), and Floor 25FLR3 (the third floor).

This paragraph [0405] illustrates the relays installed in each room of Building 25BLD (paragraph [0404]). Each Room 25RM of Building 25BLD is installed of a plurality of relays which are utilized for detecting the location of Communication Device 200 by the method so-called 'GPS'. In the present example, four relays, i.e., R51 through R54 are installed in Room 25RM in the manner described in this paragraph [0405].

This paragraph [0406] illustrates the relays installed in each corridor of Building 25BLD (paragraph [0404]). Each Corridor 25CRD of Building 25BLD is installed of a plurality of relays which are utilized for detecting the location of Communication Device 200 by the method so-called 'GPS'. In the present example, nine relays, i.e., R55 through R63 are installed in Corridor 25CRD in the manner described in this paragraph [0406].

Referring to this paragraph [0407], the user of Device A selects the display type by utilizing Input Device 210 (FIG. 1) or via voice recognition system. Here, the display type available in the present embodiment are the display type #1 (which displays the area map with the indication of the location of Device B therein as described in paragraph [0408]), the display type #2 (which displays the building and each floor with the indication of the location of Device B therein as described in paragraph [0409]), and the display type #3 (which displays the room and the indication of the location of Device B therein as described in paragraph [0410]). In one embodiment, the display type #1 is selected when a specific key of Input Device 210 is pressed once (S1), the display type #2 is selected when the specific key of Input Device 210 is pressed again (S2), and the display type #3 is selected when the specific key of Input Device 210 is pressed for one more time (S3).

This paragraph [0408] illustrates the method to display an area map describing the area where Device B is located. Area Map Display Area 20125AMD in which an area map is shown is displayed on LCD 201 (FIG. 1) when a specific key of Input Device 210 is pressed as described in S1 of paragraph [0407].

This paragraph [0409] illustrates the method to display the building and the floor where Device B is located. Building 25BLD and each floor thereof (e.g., Basement 25BSM1, Floor 25FLR1, Floor 25FLR2, and Floor 25FLR3 in paragraph [0404]) are displayed on LCD 201 (FIG. 1) when a specific key of Input Device 210 is pressed in the manner described in S2 of paragraph [0407]. LCD 201 indicates that Device B is located on Floor 25FLR2 (the second floor) of Building 25BLD.

This paragraph [0410] illustrates the method to display the room where Device B is located. Room 25RM is displayed on LCD 201 (FIG. 1) when a specific key of Input Device 210 (FIG. 1) is pressed in the manner described in S3 of paragraph [0407]. LCD 201 indicates that Device B is located in Room 25RM and the location therein as described in this paragraph [0410].

Paragraph [0412] through paragraph [0417] illustrates another embodiment of pin-pointing the location of Device B in a train.

Referring to this paragraph [0412], Train 25TRN is composed of four cars, i.e., Car 25CR1 (the first car), Car 25CR2 (the second care), Car 25CR3 (the third car), and Car 25CR4 (the fourth car).

This paragraph [0413] illustrates the relays installed in each car of Train 25TRN (paragraph [0412]). Taking Car 25CR1 for example, Car 25CR1 is installed of a plurality of relays which are utilized for detecting the existence and the precise location of Communication Device 200 therein by utilizing the method so-called 'GPS'. In the present example, six relays, i.e., R71 through R76 are installed in Car 25CR1 in the manner described in this paragraph [0413].

Referring to this paragraph [0414], the user of Device A selects the display type by utilizing Input Device 210 (FIG. 1) or via voice recognition system. Here, the display type available in the present embodiment are the display type #1 (which displays the area map with the indication of the location of Device B therein as described in paragraph [0415]), the display type #2 (which displays the main structure of Train 25TRN (paragraph [0412]) with the indication of the location of Device B therein as described in paragraph [0416]), and the display type #3 (which displays the car and the indication of the location of Device B therein as described in paragraph [0417]). In one embodiment, the display type #1 is selected when a specific key of Input Device 210 is pressed once (S1), the display type #2 is selected when the specific key of Input Device 210 is pressed again (S2), and the display type #3 is selected when the specific key of Input Device 210 is pressed for one more time (S3).

This paragraph [0415] illustrates the method to display an area map describing the area where Device B is located. Area Map Display Area 20125AMD in which an area map is shown is displayed on LCD 201 (FIG. 1) when a specific key of Input Device 210 is pressed as described in S1 of paragraph [0414].

This paragraph [0416] illustrates the method to display the train and the car where Device B is located. Train 25TRN and each care thereof (e.g., Car 25CR1, Car 25CR2, Car 25CR3, and Car 25CR4) are displayed on LCD 201 (FIG. 1) when a specific key of Input Device 210 is pressed in the manner described in S2 of paragraph [0414]. LCD 201 indicates that Device B is located in Car 25CR1 (the first car) of Train 25TRN.

This paragraph [0417] illustrates the method to display the car where Device B is located. Assuming that Device B is located in Car 25CR1. Car 25CR1 is displayed on LCD 201 (FIG. 1) when a specific key of Input Device 210 (FIG. 1) is pressed in the manner described in S3 of paragraph [0414]. LCD 201 indicates that Device B is located in Car 25CR1 and the location therein.

This paragraph [0418] illustrates the information stored in Host Information Storage Area H00a (paragraph [0276]). Host Information Storage Area H00a includes GPS Information Storage Area H25a of which the details are described in paragraph [0419].

This paragraph [0419] illustrates the storage areas included in GPS Information Storage Area H25a (paragraph [0418]). GPS Information Storage Area H25a includes GPS Software Storage Area H25b and GPS Data Storage Area H25c. GPS Software Storage Area H25b stores the software programs necessary to implement the present function, such as the one described in paragraph [0422]. GPS Data Storage Area H25c stores the data necessary to implement the present function, such as the one described in paragraph [0420].

This paragraph [0420] illustrates the storage areas included in GPS Data Storage Area H25c (paragraph [0419]). GPS Data Storage Area H25c includes Communication Device Location Data Storage Area H25c1, Map Data Storage Area H25c2, 3D Map Data Storage Area H25c3, Character Data Storage Area H25c4, and Relay Location Data Storage Area H25c5. Communication Device Location Data Storage Area H25c1 stores the location data of Communication Devices 200. Map Data Storage Area H25c2 stores a plurality of map data which are designed to be sent to Communication Devices 200. 3D Map Data Storage Area H25c3 stores a plurality of three-dimensional version of map data corresponding to the map data stored in Map Data Storage Area H25c2. Character Data Storage Area H25c4 stores various types of character data designed to be displayed on LCD 201 (FIG. 1) of Communication Device 200. Relay Location Data Storage Area H25c5 stores the location data of the relays and relating data thereto as described in paragraph [0421] hereinafter.

This paragraph [0421] illustrates the data stored in Relay Location Data Storage Area H25c5 (paragraph [0420]). Relay Location Data Storage Area H25c5 stores a plurality of the Relay ID, the Location Data and the Reference Data. The column Relay ID stores identifications assigned to each relay. The column Location Data stores location data in x, y, z format of each relay utilized for calculating the location of Communication Device 200 by the GPS system. The column Reference Data stores identification of each building, floor number, and the room identification in which the relays are installed. Assume that Building 25BLD (paragraph [0404]) is assigned as 'Building #5', Floor 25FLR3 (paragraph [0404]) is assigned as 'Floor #3', Room 25RM (paragraph [0405]) is assigned as 'Room #1', and Corridor 25CRD (paragraph [0406]) is assigned as 'Corridor #1'. The Location Data of Relay ID R51 is x51,y51,z51 and its Reference Data is Building #5, Floor #3, Room #1 which means that relay R51 is installed in Room #1 located on Floor #3 of Building #5. In the same manner, the Location Data of Relay ID R52 is x52,y52,z52 and its Reference Data is Building #5, Floor #3, Room #1 which means that relay R52 is installed in Room #1 located on Floor #3 of Building #5; the Location Data of Relay ID R53 is x53,y53,z53 and its Reference Data is Building #5, Floor #3, Room #1 which means that relay R53 is installed in Room #1 located on Floor #3 of Building #5; the Location Data of Relay ID R54 is x54,y54,z54 and its Reference Data is Building #5, Floor #3, Room #1 which means that relay R54 is installed in Room #1 located on Floor #3 of Building #5; the Location Data of Relay ID R55 is x55,y55, z55 and its Reference Data is Building #5, Floor #3, Corridor #1 which means that relay R55 is installed in Corridor #1 located on Floor #3 of Building #5; the Location Data of Relay ID R56 is x56,y56,z56 and its Reference Data is Building #5, Floor #3, Corridor #1 which means that relay R56 is installed in Corridor #1 located on Floor #3 of Building #5; the Location Data of Relay ID R57 is x57,y57,z57 and its Reference Data is Building #5, Floor #3, Corridor #1 which means that relay R57 is installed in Corridor #1 located on Floor #3 of Building #5; the Location Data of Relay ID R58 is x58,y58,z58 and its Reference Data is Building #5, Floor #3, Corridor #1 which means that relay R58 is installed in Corridor #1 located on Floor #3 of Building #5; the Location Data of Relay ID R59 is x59,y59,z59 and its Reference Data is Building #5, Floor #3, Corridor #1 which means that relay R59 is installed in Corridor #1 located on Floor #3 of Building #5; the Location Data of Relay ID R60 is x60,y60,z60 and its Reference Data is Building #5, Floor #3, Corridor #1 which means that relay R60 is installed in Corridor #1 located on Floor #3 of Building #5; the Location Data of Relay ID R61 is x61,y61,z61 and its Reference Data is Building #5, Floor #3, Corridor #1 which means that relay R61 is installed in Corridor #1 located on Floor #3 of Building #5; the Location Data of Relay ID R62 is x62,y62,z62 and its Reference Data is Building #5, Floor #3, Corridor #1 which means that relay R62 is installed in Corridor #1 located on Floor #3 of Building #5; and the Location Data of Relay ID R63 is x63,y63,z63 and its Reference Data is Building #5, Floor #3, Corridor #1 which means that relay R63 is installed in Corridor #1 located on Floor #3 of Building #5.

This paragraph [0422] illustrates the sequence of the software program stored in GPS Software Storage Area H25b (paragraph [0419]). Assume that Device B is located in Room #1 (Room 25RM (paragraph [0405])). Host H (paragraph [0276]) identifies the location of Device B by utilizing the GPS system based on the data received from the relevant relays (S1). In the present example, Host H identifies the location of Device B by calculating the data received from relays R51 through R54. Next, Host H retrieves data from Relay Location Data Storage Area H25c5 (paragraph [0421]) the Relay ID, the Location Data and the Reference Data of the corresponding relays (S2). In the present example, the Relay ID, the Location Data and the Reference Data of relays R51 through R54 are retrieved. Host H then retrieves the map data regarding the surrounding area from Map Data Storage Area H25c2 (paragraph [0420]) and also the corresponding 3D map data from 3D Map Data Storage Area H25c3 (paragraph [0420]) (S3). In the present example, Host H retrieves the map data and the 3D map data of the area surrounding Building 25BLD (paragraph [0404]). Next, Host H retrieves the character data stored in Character Data Storage Area H25c4 (paragraph [0420]) which are designed to be displayed on LCD 201 (FIG. 1) of Device A (S4). The examples of the character data retrieved by Host H are the image data of Building 25BLD (paragraph [0404]) and Room 25RM (paragraph [0405]) as described in paragraph [0409] and paragraph [0410]. The data retrieved in steps S1 through S4 are sent to Device A (S5).

This paragraph [0423] illustrates the information stored in RAM 206 (FIG. 1) of Device A. RAM 206 includes GPS Information Storage Area 20625a of which the details are described in paragraph [0424].

This paragraph [0424] illustrates the storage areas included in GPS Information Storage Area 20625a (paragraph [0423]). GPS Information Storage Area 20625a includes GPS Software Storage Area 20625b and GPS Data Storage Area 20625c. GPS Software Storage Area 20625b stores the software programs necessary to implement the present function, such as the one described in paragraph [0427]. GPS Data Storage Area 20625c stores the data necessary to implement the present function, such as the one described in paragraph [0425].

This paragraph [0425] illustrates the storage areas included in GPS Data Storage Area 20625c (paragraph [0424]). GPS Data Storage Area 20625c includes Communication Device Location Data Storage Area 20625c1, Map Data Storage Area 20625c2, 3D Map Data Storage Area 20625c3, Character Data Storage Area 20625c4, and Relay Location Data Storage Area 20625c5. Communication Device Location Data Storage Area 20625c1 stores location data of Device B which is retrieved in S1 of paragraph [0422]. Map Data Storage Area 20625c2 stores a map data which is retrieved in S2 of paragraph [0422]. 3D Map Data Storage Area 20625c3 stores a three-dimensional version of map data corresponding to the map data stored in Map Data Storage Area 20625c2, which is also retrieved in S2 of paragraph [0422]. Character Data Storage Area 20625c4 stores character data designed to be displayed on LCD 201 (FIG. 1) of Device A which is retrieved in S4 of paragraph [0422]. Relay Location Data Storage Area 20625c5 stores the location data of the relays and relating data thereto which are retrieved in S2 of paragraph [0422].

This paragraph [0426] illustrates the data stored in Relay Location Data Storage Area 20625c5 (paragraph [0425]) which are retrieved in S2 of paragraph [0422]. Relay Location Data Storage Area 20625c5 (paragraph [0425]) stores a plurality of the Relay ID, the Location Data and the Reference Data. The column Relay ID stores identifications assigned to each relay. The column Location Data stores location data of each relay in x, y, z format utilized for calculating the location of Communication Device 200 by the GPS system. The column Reference Data stores identification of the building, floor number, and the room identification in which the relays are installed. Assume that Building 25BLD (paragraph [0404]) is assigned as 'Building #5', Floor 25FLR3 (paragraph [0404]) is assigned as 'Floor #3', Room 25RM (paragraph [0405]) is assigned as 'Room #1', and Corridor 25CRD (paragraph [0406]) is assigned as 'Corridor #1'. For example, the Location Data of Relay ID R51 is x51,y51,z51 and its Reference Data is Building #5, Floor #3, Room #1 which means that relay R51 is installed in Room #1 located on Floor #3 of Building #5. In the same manner, the Location Data of Relay ID R52 is x52,y52,z52 and its Reference Data is Building #5, Floor #3, Room #1 which means that relay R52 is installed in Room #1 located on Floor #3 of Building #5; the Location Data of Relay ID R53 is x53,y53,z53 and its Reference Data is Building #5, Floor #3, Room #1 which means that relay R53 is installed in Room #1 located on Floor #3 of Building #5; and the Location Data of Relay ID R54 is x54,y54,z54 and its Reference Data is Building #5, Floor #3, Room #1 which means that relay R54 is installed in Room #1 located on Floor #3 of Building #5.

This paragraph [0427] illustrates the sequence of the software program stored in GPS Software Storage Area 20625b (paragraph [0424]) to select the display type. The user of Device A selects the display type by utilizing Input Device 210 (FIG. 1) or via voice recognition system in the manner described in paragraph [0407]. Here, the display type available in the present embodiment are the display type #1 (which displays the area map with the indication of the location of Device B therein as described in paragraph [0408]), the display type #2 (which displays the building and each floor with the indication of the location of Device B therein as described in paragraph [0409]), and the display type #3 (which displays the room and the indication of the location of Device B therein as described in paragraph [0410]) (S1).

This paragraph [0428] illustrates the sequence of the software program stored in GPS Software Storage Area 20625b (paragraph [0424]) when display type #1 is selected in S1 of paragraph [0427]. CPU 211 (FIG. 1) retrieves map data from Map Data Storage Area 20625c2 (paragraph [0425]) (S1). CPU 211 then retrieves the location data of Device B from Communication Device Location Data Storage Area 20625c1 (paragraph [0425]) (S2). CPU 211 identifies the location of Device B in the retrieved map data (S3). The retrieved map data and the location of Device B therein are displayed on LCD 201 (FIG. 1) as described in paragraph [0408] (S4). As another embodiment, a 3D map data may also be displayed. Namely, CPU 211 (FIG. 1) retrieves map data from 3D map data from 3D Map Data Storage Area 20625c3 (paragraph [0425]) (S1). CPU 211 then retrieves the location data of Device B from Communication Device Location Data Storage Area 20625c1 (paragraph [0425]) (S2). CPU 211 identifies the location of Device B in the retrieved 3D map data (S3). The retrieved 3D map data and the location of Device B therein are displayed on LCD 201 (FIG. 1) as described in paragraph [0408] (S4).

This paragraph [0429] illustrates the sequence of the software program stored in GPS Software Storage Area 20625b (paragraph [0424]) when display type #2 is selected in S1 of paragraph [0427]. CPU 211 (FIG. 1) retrieves the character data of Building 25BLD (paragraph [0404]) from Character Data Storage Area 20625c4 (paragraph [0425]) (S1). CPU 211 then retrieves the location data of Device B from Communication Device Location Data Storage Area 20625c1 (paragraph [0425]) (S2). CPU 211 identifies the location of Device B in Building 25BLD (S3). Building 25BLD and the location of Device B therein are displayed on LCD 201 (FIG. 1) as described in paragraph [0409] (S4).

This paragraph [0430] illustrates the sequence of the software program stored in GPS Software Storage Area 20625b (paragraph [0424]) when display type #3 is selected in S1 of paragraph [0427]. CPU 211 (FIG. 1) retrieves the character data of Room 25RM (paragraph [0405]) from Character Data Storage Area 20625c4 (paragraph [0425]) (S1). CPU 211 then retrieves the location data of Device B from Communication Device Location Data Storage Area 20625c1 (paragraph [0425]) (S2). CPU 211 identifies the location of Device B in Room 25RM (S3). Room 25RM and the location of Device B therein are displayed on LCD 201 (FIG. 1) as described in paragraph [0410] (S4).

For the avoidance of doubt, the concept described in paragraph [0418] through paragraph is not only applicable to display the location of Device B in a building, but also applicable to display the location thereof in a house, train, airplane, space shuttle, and/or space station.

<<CCD Bar Code Reader Function—Pattern Matching By Host H>>

Paragraph [0434] through paragraph [0448] illustrate the CCD bar code reader function which enables Communication Device 200 to read bar codes and retrieve alphanumeric data therefrom. Two embodiments are illustrated hereinafter: (1) the CCD bar code reader function implemented by the combination of Host H (paragraph [0276]) and Communication Device 200, and (2) the CCD bar code reader function implemented solely by Communication Device 200. The first embodiment is described in paragraph [0434] through paragraph [0440], and the second embodiment is described in paragraph [0444] through paragraph [0448].

This paragraph [0434] illustrates the storage area included in Host Information Storage Area H00a (paragraph [0276]). Host Information Storage Area H00a includes CCD Bar Code Reader Information Storage Area H27a of which the data stored therein are described in paragraph [0435].

This paragraph [0435] illustrates the storage areas included in CCD Bar Code Reader Information Storage Area H27a (paragraph [0434]). CCD Bar Code Reader Information Storage Area H27a includes CCD Bar Code Reader Data Storage Area H27b and CCD Bar Code Reader Software Storage Area H27c. CCD Bar Code Reader Data Storage Area H27b stores the data necessary to implement the present function such as the ones described in paragraph [0436] and paragraph [0437]. CCD Bar Code Reader Software Storage Area H27c stores the software programs necessary to implement the present function such as the ones described in paragraph [0438] through paragraph [0440].

This paragraph [0436] illustrates the storages areas included in CCD Bar Code Reader Data Storage Area H27b (paragraph [0435]). CCD Bar Code Reader Data Storage Area H27b includes Bar Code Pattern Data Storage Area H27b1 and Bar Code Pattern Data Working Area H27b2. Bar Code Pattern Data Storage Area H27b1 stores a plurality of bar code pattern data of which the details are described in paragraph [0437]. Bar Code Pattern Data Working Area H27b2 is a work area utilized by Host H (paragraph [0276]) to implement the present function.

This paragraph [0437] illustrates the data stored in Bar Code Pattern Data Storage Area H27b1 (paragraph [0436]). The data stored in Bar Code Pattern Data Storage Area H27b1 comprises three columns, i.e., Pattern ID PTI, Pattern Image PTIm, and Corresponding Data CPD. Pattern ID PTI is an identification of Pattern Image PTIm, Pattern Image PTIm is an image data of bar code which is compared with the image data input via CCD Unit 214 (FIG. 1), and Corresponding Data CPD is an alphanumeric data corresponding to Pattern Image PTIm. In the preset example, The pattern ID PTI#1 is an identification of pattern image data PTIm#1 of which the corresponding alphanumeric data is CPD#1; the pattern ID PTI#2 is an identification of pattern image data PTIm#2 of which the corresponding alphanumeric data is CPD#2; the pattern ID PTI#3 is an identification of pattern image data PTIm#3 of which the corresponding alphanumeric data is CPD#3; the pattern ID PTI#4 is an identification of pattern image data PTIm#4 of which the corresponding alphanumeric data is CPD#4; the pattern ID PTI#5 is an identification of pattern image data PTIm#5 of which the corresponding alphanumeric data is CPD#5; the pattern ID PTI#6 is an identification of pattern image data PTIm#6 of which the corresponding alphanumeric data is CPD#6; the pattern ID PTI#7 is an identification of pattern image data PTIm#7 of which the corresponding alphanumeric data is CPD#7; the pattern ID PTI#8 is an identification of pattern image data PTIm#8 of which the corresponding alphanumeric data is CPD#8; the pattern ID PTI#9 is an identification of pattern image data PTIm#9 of which the corresponding alphanumeric data is CPD#9; and the pattern ID PTI#10 is an identification of pattern image data PTIm#10 of which the corresponding alphanumeric data is CPD#10.

This paragraph [0438] illustrates the sequence to implement the present function. CPU 211 (FIG. 1) of Communication Device 200 scans a bar code image data by utilizing CCD Unit 214 (FIG. 1) (S1). CPU 211 then sends the bar code image data via Antenna 218 (FIG. 1) (S2). By the execution of CCD Bar Code Reader Software Storage Area H27c (paragraph [0435]), the bar code image is received by Host H (paragraph [0276]) (S3).

This paragraph [0439] illustrates the software program stored in CCD Bar Code Reader Software Storage Area H27c (paragraph [0435]). Host H (paragraph [0276]) compares the bar code image data received from Communication Device 200 in S3 with the Pattern Images PTIm stored in Bar Code Pattern Data Storage Area H27b1 (paragraph [0437]) (S1). If the received bar code image data matches with one of the Pattern Images PTIm stored therein (S2), Host H retrieves Corresponding Data CPD which corresponds to the Pattern Image PTIm matched in S2 (S3). Host H utilizes Bar Code Pattern Data Working Area H27b2 as a work area for processing the foregoing steps S1 through S3.

This paragraph [0440] illustrates the sequence to implement the present function. Host H (paragraph [0276]) sends Corresponding Data CPD, under the control of the software program stored in CCD Bar Code Reader Software Storage Area H27c (paragraph [0435]), which is retrieved in S3 of paragraph [0439] (S1). Communication Device 200 receives Corresponding Data CPD via Antenna 218 (FIG. 1) and stores the data in a specific area of RAM 206 (FIG. 1) (S2). CPU 211 (FIG. 1) of Communication Device 200 processes with Corresponding Data CPD (e.g., display Corresponding Data CPD on LCD 201 (FIG. 1)) (S3).

<<CCD Bar Code Reader Function—Pattern Matching by Com. Device 200>>

Paragraph [0444] through paragraph [0448] illustrates the second embodiment wherein the CCD bar code reader function implemented solely by Communication Device 200.

The data and/or the software programs necessary to implement the present function may be downloaded to Communication Device 200 from Host H (paragraph [0276]) in the manner described in paragraph [0592] through paragraph [0598].

This paragraph [0444] illustrates the storage area included in RAM 206 (FIG. 1). RAM 206 includes CCD Bar Code Reader Information Storage Area 20627a of which the information stored therein is downloaded from Host H (paragraph [0276]). The details of which is described in paragraph [0445].

This paragraph [0445] illustrates the storage areas included in CCD Bar Code Reader Information Storage Area 20627a (paragraph [0444]). CCD Bar Code Reader Information Storage Area 20627a includes CCD Bar Code Reader Data Storage Area 20627b and CCD Bar Code Reader Software Storage Area 20627c. CCD Bar Code Reader Data Storage Area 20627b stores the data necessary to implement the present function such as the ones described in paragraph and paragraph [0447]. CCD Bar Code Reader Software Storage Area 20627c stores the software programs necessary to implement the present function such as the one described in paragraph [0448].

This paragraph [0446] illustrates the storages areas included in CCD Bar Code Reader Data Storage Area 20627b (paragraph [0445]). CCD Bar Code Reader Data Storage Area 20627b includes Bar Code Pattern Data Storage Area 20627b1 and Bar Code Pattern Data Working Area 20627b2. Bar Code Pattern Data Storage Area 20627b1 stores a plurality of bar code pattern data of which the details are described in paragraph [0447]. Bar Code Pattern Data Working Area 20627b2 is a work area utilized by CPU 211 (FIG. 1) to implement the present function.

This paragraph [0447] illustrates the data stored in Bar Code Pattern Data Storage Area 20627b1 (paragraph [0446]). The data stored in Bar Code Pattern Data Storage Area 20627b1 comprises three columns, i.e., Pattern ID PTI, Pattern Image PTIm, and Corresponding Data CPD. Pattern ID PTI is an identification of Pattern Image PTIm, Pattern Image PTIm is an image data of bar code which is compared with the image data input via CCD Unit 214 (FIG. 1) of which the details are described hereinafter, and Corresponding Data CPD is an alphanumeric data corresponding to Pattern Image PTIm. In the present example, the pattern ID PTI#1 is an identification of pattern image data PTIm#1 of which the corresponding alphanumeric data is CPD#1; the pattern ID PTI#2 is an identification of pattern image data PTIm#2 of which the corresponding alphanumeric data is CPD#2; the pattern ID PTI#3 is an identification of pattern image data PTIm#3 of which the corresponding alphanumeric data is CPD#3; the pattern ID PTI#4 is an identification of pattern image data PTIm#4 of which the corresponding alphanumeric data is CPD#4; the pattern ID PTI#5 is an identification of pattern image data PTIm#5 of which the corresponding alphanumeric data is CPD#5; the pattern ID PTI#6 is an identification of pattern image data PTIm#6 of which the corresponding alphanumeric data is CPD#6; the pattern ID PTI#7 is an identification of pattern image data PTIm#7 of which the corresponding alphanumeric data is CPD#7; the pattern ID PTI#8 is an identification of pattern image data PTIm#8 of which the corresponding alphanumeric data is CPD#8; the pattern ID PTI#9 is an identification of pattern image data PTIm#9 of which the corresponding alphanumeric data is CPD#9; and the pattern ID PTI#10 is an identification of pattern image data PTIm#10 of which the corresponding alphanumeric data is CPD#10. Basically, the data stored in Bar Code Pattern Data Storage Area 20627b1 is identical to the ones stored in Bar Code Pattern Data Storage Area H27b1 (paragraph [0437]) of Host H (paragraph [0276]).

This paragraph [0448] illustrates the software program stored in CCD Bar Code Reader Software Storage Area 20627c (paragraph [0445]). CPU 211 (FIG. 1) of Communication Device 200 scans a bar code image data by utilizing CCD Unit 214 (FIG. 1) (S1). CPU 211 then compares the bar code image data input via CCD Unit 214 with the Pattern Images PTIm stored in Bar Code Pattern Data Storage Area 20627b1 (paragraph [0447]). If the received bar code image data matches with one of the Pattern Images PTIm stored therein (S2), CPU 211 retrieves Corresponding Data CPD which corresponds to the Pattern Image PTIm matched in S2 (S3). CPU 211 (FIG. 1) processes with Corresponding Data CPD (e.g., display Corresponding Data CPD on LCD 201 (FIG. 1)) (S4). CPU 211 utilizes Bar Code Pattern Data Working Area H27b2 as a work area for processing the foregoing steps S1 through S4.

<<SOS Calling Function>>

Paragraph [0451] through paragraph [0463] illustrate the SOS calling function which enables Communication Device 200 to notify the police department the current location of Communication Device 200 and the personal information of the user of Communication 200 when a 911 call is dialed from Communication Device 200.

This paragraph [0451] illustrates the storage area included in Host Information Storage Area H00a (paragraph [0276]). Host Information Storage Area H00a includes SOS Calling Information Storage Area H29a of which the data stored therein are described in paragraph [0452].

This paragraph [0452] illustrates the storage areas included in SOS Calling Information Storage Area H29a (paragraph [0451]). SOS Calling Information Storage Area H29a includes SOS Calling Data Storage Area H29b and SOS Calling Software Storage Area H29c. SOS Calling Data Storage Area H29b stores the data necessary to implement the present function, such as the ones described in paragraph [0453] and paragraph [0454]. SOS Calling Software Storage Area H29c stores the software programs necessary to implement the present function, such as the ones described in paragraph [0462] and paragraph [0463].

This paragraph [0453] illustrates the storage area included in SOS Calling Data Storage Area H29b (paragraph [0452]). SOS Calling Data Storage Area H29b includes Police Department Location Data Storage Area H29b1 of which the data stored therein are described in paragraph [0454].

This paragraph [0454] illustrates the data stored in Police Department Location Data Storage Area H29b1 (paragraph [0453]). Police Department Location Data Storage Area H29b1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the present example, H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

The data and/or the software programs necessary to implement the present function on the side of Communication Device 200 as described hereinafter may be downloaded from Host H (paragraph [0276]) to Communication Device 200 in the manner described in paragraph [0592] through paragraph [0598].

This paragraph [0456] illustrates the storage area included in RAM 206 (FIG. 1) of Communication Device 200. RAM 206 includes SOS Calling Information Storage Area 20629a of which the details are described in paragraph [0457].

This paragraph [0457] illustrates the storage areas included in SOS Calling Information Storage Area 20629a (paragraph [0456]). SOS Calling Information Storage Area 20629a includes SOS Calling Data Storage Area 20629b and SOS Calling Software Storage Area 20629c. SOS Calling Data Storage Area 20629b includes data necessary to implement the present function, such as the ones described in paragraph [0458] and paragraph [0459]. SOS Calling Software Storage Area 20629c stores the software programs necessary to implement the present function, such as the one described in paragraph [0460].

This paragraph [0458] illustrates storage areas included in SOS Calling Data Storage Area 20629b (paragraph [0457]). SOS Calling Data Storage Area 20629b includes GPS Data Storage Area 20629b1 and User Data Storage Area 20629b2. GPS Data Storage Area 20629b1 stores the data regarding the current geographical location produced by the method so-called GPS as described hereinbefore. User Data Storage Area 20629b2 stores the data regarding the personal information of the user of Communication Device 200 as described in paragraph [0459].

This paragraph [0459] illustrates the data stored in User Data Storage Area 20629b2 (paragraph [0458]). User Data Storage Area 20629b2 includes User Data 20629UD which includes data regarding the personal information of the user of Communication Device 200. In the present example, User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200.

This paragraph [0460] illustrates the software program stored in SOS Calling Software Storage Area 20629c (paragraph [0457]). When the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629b1 (paragraph [0458]) (S3). CPU 211 then retrieves User Data 20629UD from User Data Storage Area 20629b2 (paragraph [0459]) and the GPS data from GPS Data Storage Area 20629b1 (paragraph [0458]) (S4), and composes SOS Data 20629SOS therefrom (S5), which is sent thereafter to Host H (paragraph [0276]) (S6).

This paragraph [0461] illustrates the elements of SOS Data 20629SOS (paragraph [0460]). SOS Data 20629SOS comprises Connection Request 20629CR, GPS Data 20629GD, and User Data 20629UD. Connection Request 20629CR represents a request to Host H (paragraph [0276]) to forward the 911 call to a police department. GPS Data 20629GD is a data retrieved from GPS Data Storage Area 20629b1 (paragraph [0459]) as described in S4 of paragraph [0460]. User Data 20629UD is a data retrieved from User Data Storage Area 20629b2 (paragraph [0459]) as described in S4 of paragraph [0460].

This paragraph [0462] illustrates the software program stored in SOS Calling Software Storage Area H29c (paragraph [0452]) of Host H (paragraph [0276]). Host H periodically checks the incoming call (S1). If the incoming call is SOS Data 20629SOS (paragraph [0461]) (S2), Host H initiates the SOS calling process as described in paragraph [0463] (S3).

This paragraph [0463] illustrates the software program stored in SOS Calling Software Storage Area H29c (paragraph [0452]) of Host H (paragraph [0276]). Host H retrieves GPS Data 20629GD from SOS Data 20629SOS (paragraph [0461]) (S1), and selects the closest police department by comparing GPS Data 20629GD and the data stored in column Location Data of Police Department Location Data Storage Area H29b1 (paragraph [0454]) of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4).

As another embodiment, User Data 20629UD stored in User Data Storage Area 20629b2 (paragraph [0459]) may be stored in SOS Calling Data Storage Area H29b (paragraph [0452]) of Host H (paragraph [0276]). In this embodiment, SOS Data 20629SOS (paragraph [0460]) primarily comprises Connection Request 20629CR and GPS Data 20629GD, and User Data 20629UD is retrieved from SOS Calling Data Storage Area H29b of Host H, which is sent to the police department in S4 of paragraph [0463].

<<Input Device>>

This paragraph [0466] illustrates the major elements of Input Device 210 (FIG. 1). Input Device 210 includes Numeric Data Input Device 21000a, Text Data Input Device 21000b, Function Data Input Device 21000c, and Joystick 21000d. Numeric Data Input Device 21000a is an input device to input numeric data of which the details are described in paragraph [0467]. Text Data Input Device 21000b is an input device to input text data of which the details are described in paragraph [0468]. Function Data Input Device 21000c is an input device designed to be utilized to implement specific action(s) depending on the mode, function, or mode described in this specification of which the details are described in paragraph [0469]. Joystick 21000d is an input device to move the cursor or any object displayed on LCD 201 (FIG. 1) of which the details are described in paragraph [0470].

This paragraph [0467] illustrates the major elements of Numeric Data Input Device 21000a (paragraph [0466]). Numeric Data Input Device 21000a includes ten numeric keys, i.e., '1', 2, 3, 4, 5, 6, 7, 8, 9, and '0'. Numeric data '1' is input when numeric key '1' is pressed down. Numeric data '2' is input when numeric key '2' is pressed down. Numeric data '3' is input when numeric key '3' is pressed down. Numeric data '4' is input when numeric key '4' is pressed down. Numeric data '5' is input when numeric key '5' is pressed down. Numeric data '6' is input when numeric key '6' is pressed down. Numeric data '7' is input when numeric key '7' is pressed down. Numeric data '8' is input when numeric key '8' is pressed down. Numeric data '9' is input when numeric key '9' is pressed down. Numeric data '0' is input when numeric key '0' is pressed down.

This paragraph [0468] illustrates the major elements of Text Data Input Device 21000b (paragraph [0466]). Text Data Input Device 21000b includes twenty-six text keys, i.e., a, b, c, d, 'e', 'f', 'g', 'h', 'j', 'k', 'l', 'm', 'n', 'o', 'p', 'q', 'r', 's', 't', 'u', 'v', 'w', 'x', 'y', and 'z'. Text data 'a' is input when text key 'a' is pressed down. Text data 'b' is input when text key 'b' is pressed down. Text data 'c' is input when text key 'c' is pressed down. Text data 'd' is input when text key 'd' is pressed down. Text data 'e' is input when text key 'e' is pressed down. Text data 'f' is input when text key 'f' is pressed down. Text data 'g' is input when text key 'g' is pressed down. Text data 'h' is input when text key 'h' is pressed down. Text data 'i' is input when text key 'i' is pressed down. Text data 'j' is input when text key 'j' is pressed down. Text data 'k' is input when text key 'k' is pressed down. Text data 'l' is input when text key 'l' is pressed down. Text data 'm' is input when text key 'm' is pressed down. Text data 'n' is input when text key 'n' is pressed down. Text data 'o' is input when text key 'o' is pressed down. Text data 'p' is input when text key 'p' is pressed down. Text data 'q' is input when text key 'q' is pressed down. Text data 'r' is input when text key 'r' is pressed down. Text data 's' is input when text key 's' is pressed down. Text data 't' is input when text key 't' is pressed down. Text data 'u' is input when text key 'u' is pressed down. Text data 'v' is input when text key 'v' is pressed down. Text data 'w' is input when text key 'w' is pressed down. Text data 'x' is input when text key 'x' is pressed down. Text data 'y' is input when text key 'y' is pressed down. Text data 'z' is input when text key 'z' is pressed down.

This paragraph [0469] illustrates the major elements of Function Data Input Device 21000c (paragraph [0466]). Function Data Input Device 21000c includes five keys, i.e., F1, F2, F3, F4, and F5. Each key of Function Data Input Device 21000c is assigned to implement a specific function depending on each mode, function, or system described in this specification.

This paragraph [0470] illustrates the connection between Joystick 21000d (paragraph [0466]) and Communication Device 200. Joystick 21000d is rotatably attached to the surface of Communication Device 200. Joystick 21000d can be shifted up, down, left, right, and rotate clockwise and anti-clockwise. As another embodiment, a trackball may be utilized instead of Joystick 21000d to move the cursor or any object displayed on LCD 201 (FIG. 1).

<<PC Remote Controlling Function>>

Paragraph [0473] through paragraph [0500] illustrate the PC remote controlling function which enables Communication Device 200 to remotely control a personal computer. The image displayed on the monitor of Personal Computer PC is displayed on LCD 201 (FIG. 1) of Communication Device 200, and the user of Communication Device 200 is able to remotely control Personal Computer PC by utilizing Input Device 210 (FIG. 1) or via voice recognition system.

This paragraph [0473] illustrates the connection between Communication Device 200 and Personal Computer PC. Communication Device 200 and Personal Computer PC are linked and able to send and receive data via Network NT.

This paragraph [0474] illustrates another embodiment of the connection between Communication Device 200 and Personal Computer PC. Communication Device 200 and Personal Computer PC may be directly linked, and send and receive data directly in a wireless fashion.

Paragraph [0477] through paragraph [0480] illustrate the data and software program programs stored in Communication Device 200 to implement the present function on the side of Communication Device 200.

The data and/or the software programs necessary to implement the present function on the side of Communication Device 200 may be downloaded from Host H (paragraph [0276]) to Communication Device 200 in the manner described in paragraph [0592] through paragraph [0598].

This paragraph [0477] illustrates the storage area included in RAM 206 (FIG. 1). RAM 206 includes PC Remote Controlling Information Storage Area 20630a of which the data stored therein are described in paragraph [0478].

This paragraph [0478] illustrates the storage areas included in PC Remote Controlling Information Storage Area 20630a (paragraph [0477]). PC Remote Controlling Information Storage Area 20630*a* includes PC Remote Controlling Data Storage Area 20630*b* and PC Remote Controlling Software Storage Area 20630*c*. PC Remote Controlling Data Storage Area 20630*b* stores the data necessary to implement the present function on the side of Communication Device 200, such as the ones described in paragraph [0479] and paragraph [0480]. PC Remote Controlling Software Storage Area 20630*c* stores the software programs necessary to implement the present function on the side of Communication Device 200, such as the ones described in paragraph [0488] through paragraph [0490], and paragraph [0494] through paragraph [0500].

This paragraph [0479] illustrates the storage areas included in PC Remote Controlling Data Storage Area 20630*b* (paragraph [0478]). PC Remote Controlling Data Storage Area 20630*b* includes PC ID Data Storage Area 20630*b*1, Input Signal Data Storage Area 20630*b*2, PC Display Data Storage Area 20630*b*3, and PC Download Data Storage Area 20630*b*4. PC ID Data Storage Area 20630*b*1 stores the identifications of a plurality of personal computers including Personal Computer PC (paragraph [0473] and/or paragraph [0474]). Input Signal Data Storage Area 20630*b*2 stores the input signal data produced by Input Device 210 (FIG. 1) or via voice recognition system of which the details are described in paragraph [0480]. PC Display Data Storage Area 20630*b*3 stores the image data displayed on the monitor of Personal Computer PC (paragraph and/or paragraph [0474]). PC Download Data Storage Area 20630*b*4 stores the data and/or software programs downloaded from Personal Computer PC.

This paragraph [0480] illustrates the data stored in Input Signal Data Storage Area 20630*b*2 (paragraph [0479]). Input Signal Data Storage Area 20630*b*2 stores Keyboard Data 20630*b*2*a* and Mouse Data 20630*b*2*b* both of which are produced by Input Device 210 (FIG. 1) or via voice recognition system. Keyboard Data 20630*b*2*a* is an input signal data designed to operate the keyboard of Personal Computer PC to input alphanumeric data thereto. Mouse Data 20630*b*2*b* is an input signal data designed to operate the mouse of Personal Computer PC to move the mouse pointer displayed on the monitor of Personal Computer PC and/or to select and click the folders displayed thereon.

Paragraph [0483] through paragraph [0500] illustrate the data and software programs stored in Personal Computer PC (paragraph [0473] and/or paragraph [0474]) to implement the present function on the side of Personal Computer PC.

The data and/or the software programs necessary to implement the present function on the side of Personal Computer PC (paragraph [0473] and/or paragraph [0474]) may be downloaded from Host H (paragraph [0276]) to Personal Computer PC in the similar manner described in paragraph [0592] through paragraph [0598].

This paragraph [0483] illustrates the storage area included in Personal Computer PC (paragraph [0473] and/or paragraph [0474]). Personal Computer PC includes PC Information Storage Area PC00*a*.

This paragraph [0484] illustrates the storage area included in PC Information Storage Area PC00*a* (paragraph [0483]). PC Information Storage Area PC00*a* includes PC Remote Controlling Information Storage Area PC30*a* of which the data stored therein are described in paragraph [0485].

This paragraph [0485] illustrates the storage areas included in PC Remote Controlling Information Storage Area PC30*a* (paragraph [0484]). PC Remote Controlling Data Storage Area PC30*b* and PC Remote Controlling Software Storage Area PC30*c*. PC Remote Controlling Data Storage Area PC30*b* stores the data necessary to implement the present function on the side of Personal Computer PC (paragraph [0473] and/or paragraph [0474]), such as the ones described in paragraph [0486] and paragraph [0487]. PC Remote Controlling Software Storage Area PC30*c* stores the software programs necessary to implement the present function on the side of Personal Computer PC such as the ones described in paragraph [0490], paragraph [0493] through paragraph [0500].

This paragraph [0486] illustrates the storages areas included in PC Remote Controlling Data Storage Area PC30*b* (paragraph [0485]). PC Remote Controlling Data Storage Area PC30*b* includes Authentication Data Storage Area PC30*b*1, Input Signal Data Storage Area PC30*b*2, PC Display Data Storage Area PC30*b*3, and PC Upload Data Storage Area PC30*b*4. Authentication Data Storage Area PC30*b*1 stores the authentication data regarding the user of Communication Device 200, i.e., the user ID and the password of the user to enable him/her to remotely control Personal Computer PC (paragraph [0473] and/or paragraph [0474]) by implementing the present function. Input Signal Data Storage Area PC30*b*2 stores the input signal data produced by Input Device 210 (FIG. 1) or via voice recognition system of Communication Device 200 of which the details are described in paragraph [0487]. PC Display Data Storage Area PC30*b*3 stores the image data displayed on the monitor of Personal Computer PC. PC Upload Data Storage Area PC30*b*4 stores the data and/or software programs which are to be uploaded to Communication Device 200.

This paragraph [0487] illustrates the data stored in Input Signal Data Storage Area PC30*b*2 (paragraph [0486]). Input Signal Data Storage Area PC30*b*2 stores Keyboard Data PC30*b*2*a* and Mouse Data PC30*b*2*b* both of which are produced by Input Device 210 (FIG. 1) or via voice recognition system of Communication Device 200 and sent to Personal Computer PC (paragraph [0473] and/or paragraph [0474]). Keyboard Data PC30*b*2*a* is an input signal data designed to operate the keyboard of Personal Computer PC to input alphanumeric data thereto. Mouse Data PC30*b*2*b* is an input signal data designed to operate the mouse of Personal Computer PC to move the mouse pointer displayed on a monitor of Personal Computer PC and/or selecting and clicking the folders displayed thereon.

This paragraph [0488] illustrates the software program stored in PC Remote Controlling Software Storage Area 20630*c* (paragraph [0478]). An input signal to activate the present function is input by utilizing Input Device 210 (FIG. 1) or via voice recognition system (S1). CPU 211 then retrieves the identifications of the personal computers including Personal Computer PC (paragraph and/or paragraph [0474]) stored in PC ID Data Storage Area 20630*b*1 (paragraph [0479]) (S2), and displays a list of the personal computers on LCD 201 (FIG. 1) (S3). An input signal to select one of the personal computers displayed in S3 is input by utilizing Input Device 210 or via voice recognition system (S4), and the PC connection process is initiated thereafter of which the details are described in paragraph [0489] (S5).

This paragraph [0489] illustrates the PC connection process described in S5 executed by the software program stored in PC Remote Controlling Software Storage Area 20630*c* (paragraph [0478]) of Communication Device 200. A user ID and password are input by utilizing Input Device 210 (FIG. 1) or via voice recognition system (S1). The user ID and password are transferred to Personal Computer PC (paragraph [0473] and/or paragraph [0474]) and compared with the ones stored in Authentication Data Storage Area PC30*b*1 (paragraph [0486]) (S2). If the user ID and password sent from Communication Device 200 are identical to the ones stored in Authentication Data Storage Area PC30*b*1 (S3), the PC remote control process is initiated thereafter of which the details are described in paragraph [0490] (S4).

This paragraph [0490] illustrates the PC remote control process described in S4 of paragraph [0489] executed by both the software program stored in PC Remote Controlling Software Storage Area 20630c (paragraph [0478]) of Communication Device 200 and the software program stored in PC Remote Controlling Software Storage Area PC30c (paragraph [0485]) of Personal Computer PC (paragraph [0473] and/or paragraph [0474]). The input signal data to remotely control Personal Computer PC (paragraph [0473] and/or paragraph [0474]) is input by utilizing Input Device 210 (FIG. 1) or via voice recognition system and stored in Input Signal Data Storage Area 20630b2 (paragraph [0479]) of Communication Device 200 (S1). CPU 211 (FIG. 1) then sends to Personal Computer PC (paragraph [0473] and/or paragraph [0474]) PC Control Signal 20630CS of which the details are described in paragraph [0491] and paragraph [0492] (S2). Once Personal Computer PC receives PC Control Signal 20630CS (S3), it retrieves Input Signal Data 20630CS3 (paragraph [0492]) (S4), and further retrieves Keyboard Data 20630b2a and Mouse Data 20630b2b therefrom and stores them to Input Signal Data Storage Area PC30b2 (paragraph [0486]) (S5). Keyboard Data 20630b2a and Mouse Data 20630b2b are treated as Keyboard Data PC30b2a and Mouse Data PC30b2b hereafter. The PC implementation process is initiated thereafter of which the details are described in paragraph [0493] (S6). S1 and S2 are executed by Communication Device 200 and S3 through S6 are executed by Personal Computer PC.

This paragraph [0491] illustrates the data stored in PC Control Signal 20630CS described in S2 of paragraph [0490]. PC Control Signal 20630CS includes Communication Device ID 20630CS1, Personal Computer ID 20630CS2, and Input Signal Data 20630CS3. Communication Device ID 20630CS1 is an identification of Communication Device 200. Personal Computer ID 20630CS2 is an identification of Personal Computer PC (paragraph [0473] and/or paragraph [0474]). Input Signal Data 20630CS3 is a data retrieved from Input Signal Data Storage Area 20630b2 (paragraph [0479]) of Communication Device 200 of which the details are described in paragraph [0492].

This paragraph [0492] illustrates the data included in Input Signal Data 20630CS3 (paragraph [0491]). Input Signal Data 20630CS3 includes Keyboard Data 20630CS3a and Mouse Data 20630CS3b. Keyboard Data 20630CS3a is an input signal data designed to operate the keyboard of Personal Computer PC (paragraph [0473] and/or paragraph [0474]) to input alphanumeric data thereto. Mouse Data 20630CS3b is an input signal data designed to operate the mouse of Personal Computer PC to move the mouse pointer displayed on a monitor of Personal Computer PC and/or to select and click the folders displayed thereon.

This paragraph [0493] illustrates the PC implementation process described in S6 of paragraph [0490] executed by the software program stored in PC Remote Controlling Software Storage Area PC30c (paragraph [0485]) of Personal Computer PC (paragraph [0473] and/or paragraph [0474]). Keyboard Data PC30b2a and Mouse Data PC30b2b are retrieved from Input Signal Data Storage Area PC30b2 (paragraph [0486]) and input to Personal Computer PC as input signals (S1). Personal Computer PC initiates a process in accordance with Keyboard Data PC30b2a and Mouse Data PC30b2b (S2). The process described in S2 is any type of process which Personal Computer PC is capable to implement, for example: open/close a word processing software program, create/edit a document, send/receive an email, initiate a video game, start a movie, play a music (song), playback video, open/close a (sub)folder, select data, delete data, cut (copy) & paste data, send data in a wireless fashion, etc. Personal Computer PC then produces a PC display data in a real time (S3), which is stored in PC Display Data Storage Area PC30b3 (paragraph [0486]) (S4). Here, the PC display data is an image data displayed on the monitor of Personal Computer PC which is designed to be displayed on LCD 201 (FIG. 1) of Communication Device 200. The PC response process is initiated thereafter (S5).

This paragraph [0494] illustrates the PC response process described in S5 of paragraph executed by both the software program stored in PC Remote Controlling Software Storage Area 20630c (paragraph [0478]) of Communication Device 200 and the software program stored in PC Remote Controlling Software Storage Area PC30c (paragraph [0485]) of Personal Computer PC (paragraph [0473] and/or paragraph [0474]). Personal Computer PC retrieves the PC display data from PC Display Data Storage Area PC30b3 (paragraph [0486]) (S1), which is sent to Communication Device 200 (S2). CPU 211 (FIG. 1) of Communication Device 200 stores the received PC display data to PC Display Data Storage Area 20630b3 (paragraph [0479]) (S3). CPU 211 then retrieves the PC display data from PC Display Data Storage Area 20630b3 (S4) and displays it on LCD 201 (FIGS. 1) (S5). S1 and S2 are executed by Personal Computer PC and S3 through S5 are executed by Communication Device 200.

The sequence described in paragraph [0490] through paragraph [0494] is repeated for each input signal data produced in S1 of paragraph [0490]. The sequence described in paragraph through paragraph [0494] are normally repeated more than few times per second, thereby, the user of Communication Device 200 is capable to remotely control Personal Computer PC (paragraph [0473] and/or paragraph [0474]) in a real time.

The sequence of S3 of paragraph [0493] through S5 of paragraph [0494] is executed in the first place before initiating the sequence described in paragraph [0490] through paragraph [0494] to display the PC display data of Personal Computer PC (paragraph [0473] and/or paragraph [0474]) on LCD 201 (FIG. 1) of Communication Device 200 upfront.

<<PC Remote Controlling Function—Download>>

Paragraph [0499] and paragraph [0500] illustrate the method to download files from Personal Computer PC (paragraph [0473] and/or paragraph [0474]) to Communication Device 200. paragraph [0473] through paragraph [0494] apply to this embodiment except that paragraph [0493] and paragraph [0494] are replaced with the following paragraph [0499] and paragraph [0500] respectively. Assume that Input Signal Data 20630CS3 (paragraph [0492]) includes a command to download a file from Personal Computer PC to Communication Device 200 produced by utilizing Input Device 210 (FIG. 1) or via voice recognition system.

This paragraph [0499] illustrates the PC implementation process described in S6 of paragraph [0490] for purposes of downloading a file from Personal Computer PC (paragraph and/or paragraph [0474]) to Communication Device 200. Such implementation is executed by both the software program stored in PC Remote Controlling Software Storage Area 20630c (paragraph [0478]) of Communication Device 200 and the software program stored in PC Remote Controlling Software Storage Area PC30c (paragraph [0485]) of Personal Computer PC. Keyboard Data PC30b2a and Mouse Data PC30b2b are retrieved from Input Signal Data Storage Area PC30b2 (paragraph [0486]) and input to Personal Computer PC as input signals (S1). Here, the combination of Keyboard Data PC30b2a and Mouse Data PC30b2b represents a download command of the selected file. Personal Computer PC initiates a process in accordance with Keyboard Data PC30b2a and Mouse Data PC30b2b, and stores the file selected in 51 to PC Upload Data Storage Area PC30b4 (paragraph [0486]) (S2). Personal Computer PC then produces a PC display data (S3), which is stored in PC Display Data Storage Area PC30b3 (paragraph [0486]) (S4). Here, the PC display data is an image data displayed on the monitor of Personal Computer PC which is designed to be displayed on LCD 201 (FIG. 1) of Communication Device 200. The PC response process is initiated thereafter (S5).

This paragraph [0500] illustrates the PC response process described in S5 of paragraph executed by both the software program stored in PC Remote Controlling Software Storage Area 20630c (paragraph [0478]) of Communication Device 200 and the software program stored in PC Remote Controlling Software Storage Area PC30c (paragraph [0485]) of Personal Computer PC (paragraph [0473] and/or paragraph [0474]). Personal Computer PC retrieves the PC display data from PC Display Data Storage Area PC30b3 (paragraph [0486]) (S1) and the PC store data, i.e., the file selected in 51 of paragraph [0499], from PC Upload Data Storage Area PC30b4 (paragraph [0486]) (S2), both of which are sent to Communication Device 200 (S3). CPU 211 (FIG. 1) of Communication Device 200 stores the received PC display data to PC Display Data Storage Area 20630b3 (paragraph [0479]) (S4) and the received PC store data to PC Download Data Storage Area 20630b4 (paragraph [0479]) (S5). CPU 211 then retrieves the PC display data from PC Display Data Storage Area 20630b3 (S6) and displays it on LCD 201 (FIG. 1) (S7). The PC store data stored in PC Download Data Storage Area 20630b4 can be processed thereafter in any way in accordance with the input signal input by utilizing Input Device 210 (FIG. 1) or via voice recognition system.

As another embodiment, the concept described in paragraph [0473] through paragraph may be applied to Personal Computer PC (paragraph [0473] and/or paragraph [0474]) remotely controlling Communication Device 200. Namely, the image displayed on LCD 201 (FIG. 1) of Communication Device 200 is displayed on the monitor of Personal Computer PC, and the user of Personal Computer PC is able to remotely control Communication Device 200 by utilizing the keyboard and/or the mouse of Personal Computer PC.

As another embodiment, the concept described in paragraph [0473] through paragraph may be applied to Communication Device 200 (Device A) remotely controlling another Communication Device 200 (Device B). Namely, the image displayed on LCD 201 (FIG. 1) of Device B is displayed on LCD 201 of Device A, and the user of Device A is able to remotely control Device B by utilizing Input Device 210 (FIG. 1) or via voice recognition system of Device A.

<<Audiovisual Playback Function>>

Paragraph [0505] through paragraph [0523] illustrate the audiovisual playback function which enables Communication Device 200 to playback audiovisual data, such as movies, soap operas, situation comedies, news, and any type of TV programs.

This paragraph [0505] illustrates the information stored in RAM 206 (FIG. 1). RAM 206 includes Audiovisual Playback Information Storage Area 20632a of which the information stored therein are described in paragraph [0507].

The data and/or the software programs necessary to implement the present function may be downloaded to Communication Device 200 from Host H (paragraph [0276]) in the manner described in paragraph [0592] through paragraph [0598]. This paragraph [0507] illustrates the data and software programs stored in Audiovisual Playback Information Storage Area 20632a (paragraph [0505]). Audiovisual Playback Information Storage Area 20632a includes Audiovisual Playback Data Storage Area 20632b and Audiovisual Playback Software Storage Area 20632c. Audiovisual Playback Data Storage Area 20632b stores the data necessary to implement the present function, such as the ones described in paragraph through paragraph [0510]. Audiovisual Playback Software Storage Area 20632c stores the software programs necessary to implement the present function, such as the ones described in paragraph [0511].

This paragraph [0508] illustrates the data stored in Audiovisual Playback Data Storage Area 20632b (paragraph [0507]). Audiovisual Playback Data Storage Area 20632b includes Audiovisual Data Storage Area 20632b1 and Message Data Storage Area 20632b2. Audiovisual Data Storage Area 20632b1 stores a plurality of audiovisual data described in paragraph [0509]. Message Data Storage Area 20632b2 stores a plurality of message data described in paragraph [0510].

This paragraph [0509] illustrates the audiovisual data stored in Audiovisual Data Storage Area 20632b1 (paragraph [0508]). Audiovisual Data Storage Area 20632b1 stores a plurality of audiovisual data wherein the audiovisual data stored therein in the present example are: Audiovisual Data 20632b1a, Audiovisual Data 20632b1b, Audiovisual Data 20632b1c, and Audiovisual Data 20632b1d, all of which are primarily composed of video data and audio data. Audiovisual Data 20632b1a is a movie, Audiovisual Data 20632b1b is a soap opera, Audiovisual Data 20632b1c is a situation comedy, Audiovisual Data 20632b1d is TV news in the present embodiment. As another embodiment, Audiovisual Data 20632b1d may be an audiovisual data taken via CCD Unit 214 (FIG. 1) and Microphone 215 (FIG. 1).

This paragraph [0510] illustrates the data stored in Message Data Storage Area 20632b2 (paragraph [0508]). Message Data Storage Area 20632b2 includes Start Message Text Data 20632b2a, Stop Message Text Data 20632b2b, Pause Message Text Data 20632b2c, Resume Message Text Data 20632b2c1, Slow Replay Message Text Data 20632b2d, Forward Message Text Data 20632b2e, Rewind Message Text Data 20632b2f, Next Message Text Data 20632b2g, and Previous Message Text Data 20632b2h. Start Message Text Data 20632b2a is a text data which is displayed on LCD 201 (FIG. 1) and which indicates that the playback of an audiovisual data is initiated. Stop Message Text Data 20632b2b is a text data which is displayed on LCD 201 and which indicates that the playback process of an audiovisual data is stopped. Pause Message Text Data 20632b2c is a text data which is displayed on LCD 201 and which indicates that the playback process of an audiovisual data is paused. Resume Message Text Data 20632b2c1 is a text data which is displayed on LCD 201 and which indicates that the playback process of an audiovisual data is resumed from the point it is paused. Slow Replay Message Text Data 20632b2d is a text data which is displayed on LCD 201 and which indicates that the playback process of an audiovisual data is implemented in a slow motion. Fast-Forward Message Text Data 20632b2e is a text data which is displayed on LCD 201 and which indicates that an audiovisual data is fast-forwarded. Fast-Rewind Message Text Data 20632b2f is a text data which is displayed on LCD 201 and which indicates that an audiovisual data is fast-rewinded. Next Message Text Data 20632b2g is a text data which is displayed on LCD 201 and which indicates that the playback process of the next audiovisual data stored in Audiovisual Data Storage Area 20632b1 (paragraph [0509]) is initiated. Previous Message Text Data 20632b2h is a text data which is displayed on LCD 201 and which indicates that the playback process of the previous audiovisual data stored in Audiovisual Data Storage Area 20632b1 (paragraph [0509]) is initiated.

This paragraph [0511] illustrates the software programs stored in Audiovisual Playback Software Storage Area 20632c (paragraph [0507]). Audiovisual Playback Software Storage Area 20632c includes Audiovisual Start Software 20632c1, Audiovisual Stop Software 20632c2, Audiovisual Pause Software 20632c3, Audiovisual Resume Software 20632c3a, Audiovisual Slow Replay Software 20632c4, Audiovisual Fast-Forward Software 20632c5, Audiovisual Fast-Rewind Software 20632c6, Audiovisual Next Software 20632c7, and Audiovisual Previous Software 20632c8. Audiovisual Start Software 20632c1 is a software program which initiates the playback process of an audiovisual data. Audiovisual Stop Software 20632c2 is a software program which stops the playback process of an audiovisual data. Audiovisual Pause Software 20632c3 is a software program which pauses the playback process of an audiovisual data. Audiovisual Resume Software 20632c3a is a software program which resumes the playback process of the audiovisual data from the point it is paused by Audiovisual Pause Software 20632c3. Audiovisual Slow Replay Software 20632c4 is a software program which implements the playback process of an audiovisual data in a slow motion. Audiovisual Fast-Forward Software 20632c5 is a software program which fast-forwards an audiovisual data. Audiovisual Fast-Rewind Software 20632c6 is a software program which fast-rewinds an audiovisual data. Audiovisual Next Software 20632c7 is a software program which initiates the playback process of the next audiovisual data stored in Audiovisual Data Storage Area 20632b1 (paragraph [0509]). Audiovisual Previous Software 20632c8 is a software program which initiates the playback process of the previous audiovisual data stored in Audiovisual Data Storage Area 20632b1.

This paragraph [0512] illustrates the messages displayed on LCD 201 (FIG. 1). Eight types of messages are displayed on LCD 201, i.e., 'Start', 'Stop', 'Pause', 'Resume', 'Slow Reply', 'Fast-Forward', 'Fast-Rewind', Next', and 'Previous'. 'Start' is Start Message Text Data 20632b2a, 'Stop' is Stop Message Text Data 20632b2b, 'Pause' is Pause Message Text Data 20632b2c, 'Resume' is Resume Message Text Data 20632b2c1, 'Slow Reply' is Slow Replay Message Text Data 20632b2d, 'Fast-Forward' is Fast-Forward Message Text Data 20632b2e, 'Fast-Rewind' is Fast-Rewind Message Text Data 20632b2f, 'Next' is Next Message Text Data 20632b2g, 'Previous' is Previous Message Text Data 20632b2h described in paragraph [0510] hereinbefore.

This paragraph [0513] illustrates Audiovisual Selecting Software 20632c9 stored in Audiovisual Playback Software Storage Area 20632c (paragraph [0507]) in preparation of executing the software programs described in paragraph [0515] through paragraph [0523]. CPU 211 (FIG. 1) retrieves the identifications of the audiovisual data stored in Audiovisual Data Storage Area 20632b1 (paragraph [0509]) (S1). CPU 211 then displays a list of the identifications on LCD 201 (FIG. 1) (S2). A particular audiovisual data is selected by utilizing Input Device 210 (FIG. 1) or via voice recognition system (S3).

Paragraph [0515] through paragraph [0523] illustrates the software programs stored in Audiovisual Playback Software Storage Area 20632c (paragraph [0507]). Nine types of input signals can be input by utilizing Input Device 210 (FIG. 1) or via voice recognition system, i.e., the audiovisual playback signal, the audiovisual stop signal, the audiovisual pause signal, the audiovisual resume signal, the audiovisual slow replay signal, the audiovisual fast-forward signal, the audiovisual fast-rewind signal, the audiovisual next signal, and the audiovisual previous signal. The audiovisual playback signal indicates to initiate the playback process of the audiovisual data selected in S3 of paragraph [0513]. The audiovisual stop signal indicates to stop the playback process of the audiovisual data selected in S3 of paragraph [0513]. The audiovisual pause signal indicates to pause the playback process of the audiovisual data selected in S3 of paragraph [0513]. The audiovisual resume signal indicates to resume the playback process of the audiovisual data selected in S3 of paragraph [0513] from the point the audio data is paused. The audiovisual slow replay signal indicates to implement the playback process of the audiovisual data selected in S3 of paragraph [0513] in a slow motion. The audiovisual fast-forward signal indicates to fast-forward the audiovisual data selected in S3 of paragraph [0513]. The audiovisual fast-rewind signal indicates to fast-rewind the audiovisual data selected in S3 of paragraph [0513]. The audiovisual next signal indicates to initiate the playback process of the next audiovisual data of the audiovisual data selected in S3 of paragraph [0513] both of which are stored in Audiovisual Data Storage Area 20632b1 (paragraph [0509]). The audiovisual previous signal indicates to initiate the playback process of the previous audiovisual data of the audiovisual data selected in S3 of paragraph [0513] both of which are stored in Audiovisual Data Storage Area 20632b1.

This paragraph [0515] illustrates Audiovisual Start Software 20632c1 stored in Audiovisual Playback Software Storage Area 20632c (paragraph [0507]) which initiates the playback process of the audiovisual data selected in S3 of paragraph [0513]. The audiovisual playback signal is input by utilizing Input Device 210 (FIG. 1) or via voice recognition system (S1). CPU 211 (FIG. 1) then initiates the playback process (i.e., outputs the audio data from Speaker 216 (FIG. 1) and display the video data on LCD 201 (FIG. 1)) of the audiovisual data selected in S3 of paragraph [0513] (S2), and retrieves Start Message Text Data 20632b2a from Message Data Storage Area 20632b2 (paragraph [0508]) and displays the data on LCD 201 (FIG. 1) for a specified period of time (S3).

This paragraph [0516] illustrates Audiovisual Stop Software 20632c2 stored in Audiovisual Playback Software Storage Area 20632c (paragraph [0507]) which stops the playback process of the audiovisual data selected in S3 of paragraph [0513]. The audiovisual stop signal is input by utilizing Input Device 210 (FIG. 1) or via voice recognition system (S1). CPU 211 (FIG. 1) then stops the playback process of the audiovisual data selected in S3 of paragraph [0513] (S2), and retrieves Stop Message Text Data 20632b2b from Message Data Storage Area 20632b2 (paragraph [0508]) and displays the data on LCD 201 (FIG. 1) for a specified period of time (S3).

This paragraph [0517] illustrates Audiovisual Pause Software 20632c3 stored in Audiovisual Playback Software Storage Area 20632c (paragraph [0507]) which pauses the playback process of the audiovisual data selected in S3 of paragraph [0513]. The audiovisual pause signal is input by utilizing Input Device 210 (FIG. 1) or via voice recognition system (S1). CPU 211 (FIG. 1) then pauses the playback process of the audiovisual data selected in S3 of paragraph [0513] (S2), and retrieves Pause Message Text Data 20632b2c from Message Data Storage Area 20632b2 (paragraph [0508]) and displays the data on LCD 201 (FIG. 1) for a specified period of time (S3) When the playback process is paused in S2, the audio data included in the audiovisual data is refrained from being output from Speaker 216 (FIG. 1) and a still image composing the video data included in the audiovisual data is displayed on LCD 201 (FIG. 1).

This paragraph [0518] illustrates Audiovisual Resume Software 20632c3a stored in Audiovisual Playback Software Storage Area 20632c (paragraph [0507]) which resumes the playback process of the audiovisual data selected in S3 of paragraph [0513] from the point the audiovisual data is paused in S2 of paragraph [0517]. The audiovisual resume signal is input by utilizing Input Device 210 (FIG. 1) or via voice recognition system (S1). CPU 211 (FIG. 1) then resumes the playback process of the audiovisual data selected in S3 of paragraph [0513] (S2) from the point it is paused in S2 of paragraph [0517], and retrieves Resume Message Text Data 20632b2c1 from Message Data Storage Area 20632b2 (paragraph [0508]) and displays the data on LCD 201 (FIG. 1) for a specified period of time (S3) When the playback process is resumed in S2, the audio data included in the audiovisual data is resumed to be output from Speaker 216 (FIG. 1) and the video data included in the audiovisual data is resumed to be displayed on LCD 201 (FIG. 1).

This paragraph [0519] illustrates Audiovisual Slow Replay Software 20632c4 stored in Audiovisual Playback Software Storage Area 20632c (paragraph [0507]) which implements the playback process of the audiovisual data selected in S3 of paragraph [0513] in a slow motion. The audiovisual slow replay signal is input by utilizing Input Device 210 (FIG. 1) or via voice recognition system (S1). CPU 211 (FIG. 1) then initiates the playback process of the audiovisual data selected in S3 of paragraph [0513] in a slow motion (S2), and retrieves Slow Replay Message Text Data 20632b2d from Message Data Storage Area 20632b2 (paragraph [0508]) and displays the data on LCD 201 (FIG. 1) for a specified period of time (S3).

This paragraph [0520] illustrates Audiovisual Fast-Forward Software 20632c5 stored in Audiovisual Playback Software Storage Area 20632c (paragraph [0507]) which fast-forwards the audiovisual data selected in S3 of paragraph [0513]. The audiovisual fast-forward signal is input by utilizing Input Device 210 (FIG. 1) or via voice recognition system (S1). CPU 211 (FIG. 1) then fast-forwards the audiovisual data selected in S3 of paragraph [0513] (S2), and retrieves Fast-Forward Message Text Data 20632b2e from Message Data Storage Area 20632b2 (paragraph [0508]) and displays the data on LCD 201 (FIG. 1) for a specified period of time (S3).

This paragraph [0521] illustrates Audiovisual Fast-Rewind Software 20632c6 stored in Audiovisual Playback Software Storage Area 20632c (paragraph [0507]) which fast-rewinds the audiovisual data selected in S3 of paragraph [0513]. The audiovisual fast-rewind signal is input by utilizing Input Device 210 (FIG. 1) or via voice recognition system (S1). CPU 211 (FIG. 1) then fast-rewinds the audiovisual data selected in S3 of paragraph [0513] (S2), and retrieves Fast-Rewind Message Text Data 20632b2f from Message Data Storage Area 20632b2 (paragraph [0508]) and displays the data on LCD 201 (FIG. 1) for a specified period of time (S3).

This paragraph [0522] illustrates Audiovisual Next Software 20632c7 stored in Audiovisual Playback Software Storage Area 20632c (paragraph [0507]) which initiates the playback process of the next audiovisual data stored in Audiovisual Data Storage Area 20632b1 (paragraph [0509]). The audiovisual next signal is input by utilizing Input Device 210 (FIG. 1) or via voice recognition system (S1). CPU 211 (FIG. 1) then initiates the playback process of the next audiovisual data of the audiovisual data selected in S3 of paragraph [0513] both of which are stored in Audiovisual Data Storage Area 20632b1 (paragraph [0509]) (S2), and retrieves Next Message Text Data 20632b2g from Message Data Storage Area 20632b2 (paragraph [0508]) and displays the data on LCD 201 (FIG. 1) for a specified period of time (S3).

This paragraph [0523] illustrates Audiovisual Previous Software 20632c8 is a software program which initiates the playback process of the previous audiovisual data stored in Audiovisual Data Storage Area 20632b1 (paragraph [0509]). The audiovisual previous signal is input by utilizing Input Device 210 (FIG. 1) or via voice recognition system (S1). CPU 211 (FIG. 1) then initiates the playback process of the previous audiovisual data of the audiovisual data selected in S3 of paragraph [0513] both of which are stored in Audiovisual Data Storage Area 20632b1 (paragraph [0509]) (S2), and retrieves Previous Message Text Data 20632b2h from Message Data Storage Area 20632b2 (paragraph [0508]) and displays the data on LCD 201 (FIG. 1) for a specified period of time (S3).

As another embodiment, the audiovisual data stored in Audiovisual Data Storage Area 20632b1 (paragraph [0509]) may be stored in Host H (paragraph [0276]) and retrieved therefrom when the software programs described in paragraph [0515] through paragraph [0523] are executed. In this embodiment, the audio data is temporarily stored in RAM 206 (FIG. 1) and is erased from the portion which is playbacked.

<<Ticket Purchasing Function>>

Paragraph [0527] through paragraph [0549] illustrate the ticket purchasing function which enables Communication Device 200 to purchase tickets in a wireless fashion. Here, the tickets capable to be purchased by utilizing the present function are, for example, the tickets for boarding airplanes and trains, and the tickets for entering movie theaters and museums. The present function is also applicable to purchasing coupons and any type of security which is in electronic format.

This paragraph [0527] illustrates the information stored in RAM 206 (FIG. 1) of Communication Device 200. RAM 206 includes Ticket Purchasing Information Storage Area 20634a of which the data and software programs stored therein are described in paragraph [0529].

The data and/or the software programs stored in Ticket Purchasing Information Storage Area 20634a (paragraph [0527]) may be downloaded from Host H (paragraph [0276]) in the manner described in paragraph [0592] through paragraph [0598].

This paragraph [0529] illustrates the storage areas included in Ticket Purchasing Information Storage Area 20634a (paragraph [0527]). Ticket Purchasing Information Storage Area 20634a includes Ticket Purchasing Data Storage Area 20634b and Ticket Purchasing Software Storage Area 20634c. Ticket Purchasing Data Storage Area 20634b stores the data necessary to implement the present function on the side of Communication Device 200, such as the ones described in paragraph [0530] and paragraph [0531]. Ticket Purchasing Software Storage Area 20634c stores the software programs necessary to implement the present function on the side of Communication Device 200, such as the ones described in paragraph [0532].

This paragraph [0530] illustrates the storage areas included in Ticket Purchasing Data Storage Area 20634b (paragraph [0529]). Ticket Purchasing Data Storage Area 20634b includes Credit Card Data Storage Area 20634b1, Purchased Ticket Data Storage Area 20634b2, Device List Data Storage Area 20634b3, and Ticket List Data Storage Area 20634b4. Credit Card Data Storage Area 20634b1 stores the credit card data of the user of Communication Device 200 of which the data stored therein are further described in paragraph [0531]. Purchased Ticket Data Storage Area 20634b2 stores the data regarding the ticket purchased by utilizing the present function. Device List Data Storage Area 20634b3 stores the data regarding the devices to which the data stored in Purchased Ticket Data Storage Area 20634b2 can be sent. Ticket List Data Storage Area 20634b4 stores the ticket list data sent by Host H (paragraph [0276]) which is displayed on LCD 201 (FIG. 1).

This paragraph [0531] illustrates the data stored in Credit Card Data Storage Area 20634b1 (paragraph [0530]). Credit Card Data Storage Area 20634b1 stores the credit card data of the user of Communication Device 200, i.e., the name of the user, the credit card number, the expiration date, the billing address, and the phone number.

This paragraph [0532] illustrates the software programs stored in Ticket Purchasing Software Storage Area 20634c (paragraph [0529]). Ticket Purchasing Software Storage Area 20634c stores Credit Card Data Input Software 20634c1, Ticket Data Displaying Software 20634c2, Ticket Data Selecting Software 20634c3, Purchase Data Sending Software 20634c4, Purchased Ticket Data Processing Software 20634c5, and Purchased Ticket Data Transferring Software 20634c6. Credit Card Data Input Software 20634c1 is a software program described in paragraph [0541]. Ticket Data Displaying Software 20634c2 is a software program described in paragraph [0539]. Ticket Data Selecting Software 20634c3 is a software program described in paragraph [0540]. Purchase Data Sending Software 20634c4 is a software program described in paragraph [0542]. Purchased Ticket Data Processing Software 20634c5 is a software program described in paragraph [0548]. Purchased Ticket Data Transferring Software 20634c6 is a software program described in paragraph [0549].

This paragraph [0533] illustrates the information stored in Host Information Storage Area H00a (paragraph [0276]) of Host H. Host Information Storage Area H00a includes Ticket Purchasing Information Storage Area H34a of which the data and software programs stored therein are described in paragraph [0534].

This paragraph [0534] illustrates the data and software programs stored in Ticket Purchasing Information Storage Area H34a (paragraph [0534]). Ticket Purchasing Information Storage Area H34a includes Ticket Purchasing Data Storage Area H34b and Ticket Purchasing Software Storage Area H34c. Ticket Purchasing Data Storage Area H34b stores the data necessary to implement the present function on the side of Host H (paragraph [0276]), such as the ones described in paragraph [0535] through paragraph [0537]. Ticket Purchasing Software Storage Area H34c stores the software programs necessary to implement the present function on the side of Host H, such as the ones described in paragraph [0538].

This paragraph [0535] illustrates the data stored in Ticket Purchasing Data Storage Area H34b (paragraph [0534]). Ticket Purchasing Data Storage Area H34b includes Credit Card Data Storage Area H34b1, Ticket Data Storage Area H34b2, and Purchase Data Storage Area H34b3. Credit Card Data Storage Area H34b1 stores each user's credit card data as described in paragraph [0536]. Ticket Data Storage Area H34b2 stores the data regarding the tickets which can be purchased by utilizing the present function of which the data stored therein are described in paragraph [0537]. Purchase Data Storage Area H34b3 stores the purchase data sent from Communication Device 200 as described in paragraph [0542].

This paragraph [0536] illustrates the data stored in Credit Card Data Storage Area H34b1 (paragraph [0535]). Credit Card Data Storage Area H34b1 comprises four columns, i.e., User ID, Credit Card Data, Purchase Confirmation Number, and Ticket ID. The column User ID stores the identification of each user of Communication Device 200. The column Credit Card Data stores the credit card data of the user of the corresponding User ID. Each credit card data stored in this column has the same data structure as the one described in paragraph [0531]. The column Purchase Confirmation Number stores the purchase confirmation number produced in the manner described in paragraph [0546]. The column Ticket ID stores the identification of the ticket(s) purchased by utilizing the present function. In the present example, Credit Card Data Storage Area H34b1 stores the 'User ID' H34UID1 of which the corresponding 'Credit Card Data', 'Purchase Confirmation Number', and 'Ticket ID' is H34CCD1, H34TPCN1, and H34TID1, respectively; the 'User ID' H34UID2 of which the corresponding 'Credit Card Data' is H34CCD2; the 'User ID' H34UID3 of which the corresponding 'Credit Card Data' is H34CCD3; and the 'User ID' H34UID4 of which the corresponding 'Credit Card Data' is H34CCD4.

This paragraph [0537] illustrates the data stored in Ticket Data Storage Area H34b2 (paragraph [0535]). Ticket Data Storage Area H34b2 comprises four columns, i.e., 'Ticket ID', 'Ticket Title', 'Ticket Description', and 'Price Data'. 'Ticket ID' is the identification of each ticket capable to be purchased by utilizing the present function. 'Ticket Title' is the title of the ticket of the corresponding 'Ticket ID'. 'Ticket Description' is the description of the ticket of the corresponding 'Ticket ID'. 'Price Data' is the data regarding the price of the ticket of the corresponding 'Ticket ID'. In the present example, Ticket Data Storage Area H34b2 stores 'Ticket ID' H34TID1 of which 'Ticket Title', 'Ticket Description', and 'Price Data' is H34TT1, H34TD1, and H34PD1, respectively; 'Ticket ID' H34TID2 of which 'Ticket Title', 'Ticket Description', and 'Price Data' is H34TT2, H34TD2, and H34PD2, respectively; 'Ticket ID' H34TID3 of which 'Ticket Title', 'Ticket Description', and 'Price Data' is H34TT3, H34TD3, and H34PD3, respectively; and 'Ticket ID' H34TID4 of which 'Ticket Title', 'Ticket Description', and 'Price Data' is H34TT4, H34TD4, and H34PD4, respectively.

This paragraph [0538] illustrates the software programs stored in Ticket Purchasing Software Storage Area H34c (paragraph [0534]). Ticket Purchasing Software Storage Area H34c stores Credit Card Authentication Software H34c1, Ticket Data Displaying Software H34c2, and Purchase Data Processing Software H34c3. Credit Card Authentication Software H34c1 is a software program described in paragraph [0545]. Ticket Data Displaying Software H34c2 is a software program described in paragraph [0539]. Purchase Data Processing Software H34c3 is a software program described in paragraph [0546].

This paragraph [0539] illustrates both Ticket Data Displaying Software 20634c2 stored in Ticket Purchasing Software Storage Area 20634c (paragraph [0532]) of Communication Device 200 and Ticket Data Displaying Software H34c2 stored in Ticket Purchasing Software Storage Area H34c (paragraph [0538]) of Host H (paragraph [0276]). CPU 211 (FIG. 1) of Communication Device 200 sends a request for a ticket list data to Host H (S1). In response to the request, Host H retrieves the data stored in the columns Ticket Title and Ticket Description from Ticket Data Storage Area H34b2 (paragraph [0537]) (S2). In the example described in paragraph [0537], 'Ticket Title' H34TT1 and its 'Ticket Description' H34TD1, 'Ticket Title' H34TT2 and its 'Ticket Description' H34TD2, 'Ticket Title' H34TT3 and its 'Ticket Description' H34TD3, and 'Ticket Title' H34TT4 and its 'Ticket Description' H34TD4 are retrieved from Ticket Data Storage Area H34b2 and sent as the ticket list data to Communication Device 200. CPU 211, upon receiving the ticket list data from Host H, stores the data in Ticket List Data Storage Area 20634b4 (paragraph [0530]) and displays them on LCD 201 (FIG. 1) (S3).

This paragraph [0540] illustrates Ticket Data Selecting Software 20634c3 stored in Ticket Purchasing Software Storage Area 20634c (paragraph [0532]) of Communication Device 200. A particular ticket data is selected from the ticket list data displayed on LCD (FIG. 1) by utilizing Input Device 210 (FIG. 1) or via voice recognition system (S1). CPU 211 (FIG. 1) stores the ticket data selected in S1 in a specific storage area in Ticket Purchasing Data Storage Area 20634b (paragraph [0530]) (S2).

This paragraph [0541] illustrates Credit Card Data Input Software 20634c1 stored in Ticket Purchasing Software Storage Area 20634c (paragraph [0532]) of Communication Device 200. Referring to 745, CPU 211 (FIG. 1) displays the credit card data input screen on LCD 201 (FIG. 1) to input data regarding the credit card of the user of Communication Device 200 (S1). The credit card data described in paragraph [0531] (i.e., Name, Credit Card Number, Expiration Date, Billing Address, and Phone Number) are input by utilizing Input Device 210 (FIG. 1) or via voice recognition system (S2), and CPU 211 stores the credit card data to Credit Card Data Storage Area 20634b1 (paragraph [0530]) (S3). The data stored in Credit Card Data Storage Area 20634b1 is stored permanently unless they are erased by the user of Communication Device 200 to utilize the data for the next purchase of tickets utilizing the present function.

This paragraph [0542] illustrates Purchase Data Sending Software 20634c4 stored in Ticket Purchasing Software Storage Area 20634c (paragraph [0532]) of Communication Device 200. Referring to 746, CPU 211 (FIG. 1) retrieves the selected ticket data (i.e., the ticket data selected in S1 of paragraph [0540]) (S1). CPU 211 then retrieves the credit card data from Credit Card Data Storage Area 20634b1 (paragraph [0530]) (S2). CPU 211 produces Purchase Data 20634PD, which is described in paragraph [0543], and sends the data to Host H (S3).

This paragraph [0543] illustrates the data included in Purchase Data 20634PD produced in S3 of paragraph [0542]. Purchase Data 20634PD includes Selected Ticket Data 20634PD1 and Credit Card Data 20634PD2. Selected Ticket Data 20634PD1 is the data retrieved in S1 of paragraph [0542], and Credit Card Data 20634PD2 is the data retrieved in S2 of paragraph [0542].

This paragraph [0544] illustrates the software program stored in Ticket Purchasing Software Storage Area H34c (paragraph [0538]) of Host H (paragraph [0276]). Host H receives Purchase Data 20634PD (paragraph [0543]) (S1) and stores the data in Purchase Data Storage Area H34b3 (paragraph [0535]) (S2).

This paragraph [0545] illustrates Credit Card Authentication Software H34c1 stored in Ticket Purchasing Software Storage Area H34c (paragraph [0538]) of Host H (paragraph [0276]). Host H retrieves Credit Card Data 20634PD2 from Purchase Data Storage Area H34b3 (paragraph [0535]) (S1). Host H then compares Credit Card Data 20634PD2 with the credit card data stored in Credit Card Data Storage Area H34b1 (paragraph [0536]) (S2). If Credit Card Data 20634PD2 matches with one of the credit card data stored in Credit Card Data Storage Area H34b1 (S3), Host H initiates the purchase process described in paragraph [0546] (S4).

This paragraph [0546] illustrates Purchase Data Processing Software H34c3 stored in Ticket Purchasing Software Storage Area H34c (paragraph [0538]) of Host H (paragraph [0276]). Host H retrieves Selected Ticket Data 20634PD1 from Purchase Data Storage Area H34b3 (paragraph [0535]) (S1), and initiates the purchase process by utilizing the data, such as retrieving the price data from Ticket Data Storage Area H34b2 (paragraph [0537]) and sending the bill to a credit card company (S2). Host H produces a purchase confirmation number (S3), and stores the data in Credit Card Data Storage Area H34b1 (paragraph [0536]) as well as the ticket ID of Selected Ticket Data 20634PD1 (S4). Host H retrieves the ticket ID of Selected Ticket Data 20634PD1 and the purchase confirmation number from Credit Card Data Storage Area H34b1 (S5), and produces Purchased Ticket Data H34PTD, which is sent to Communication Device 200 (S6). Assume that the user whose User ID is H34UID1 purchases a ticket of which Ticket Title is H34TT1 described in paragraph [0536]. After the purchase process described in S2 is completed, Host H produces a purchase confirmation number (i.e., H34TPCN1) (S3). Host H then stores the purchase confirmation number (i.e., H34TPCN1) in column Purchase Confirmation Number of Credit Card Data Storage Area H34b1 (paragraph [0536]), and further retrieves the corresponding Ticket ID (H34TID1) from Ticket Data Storage Area H34b2 (paragraph [0537]) which is stored in column Ticket ID of Credit Card Data Storage Area H34b1 (S4). Ticket ID H34TT1 and purchase confirmation number H34TPCN1 is retrieved from Credit Card Data Storage Area H34b1 (S5), and Purchased Ticket Data H34PTD is produced and sent to Communication Device 200 thereafter (S6).

This paragraph [0547] illustrates the data included in Purchased Ticket Data H34PTD described in S6 of paragraph [0546]. Purchased Ticket Data H34PTD includes Ticket ID H34PTD1 and Purchase Confirmation Number H34PTD2. Ticket ID H34PTD1 and Purchase Confirmation Number H34PTD2 are the data stored in Credit Card Data Storage Area H34b1 (paragraph [0536]) in S4 of paragraph [0546]. In the example described in paragraph [0536], Ticket ID H34TID1 constitutes Ticket ID H34PTD1 and Purchase Confirmation Number H34TPCN1 constitutes Purchase Confirmation Number H34PTD2.

This paragraph [0548] illustrates Purchased Ticket Data Processing Software 20634c5 stored in Ticket Purchasing Software Storage Area 20634c (paragraph [0532]) of Communication Device 200. CPU 211 (FIG. 1) receives Purchased Ticket Data H34PTD (paragraph [0547]) from Host H (paragraph [0276]) (S1). CPU 211 then stores Purchased Ticket Data H34PTD to Purchased Ticket Data Storage Area 20634b2 (paragraph [0530]) (S2), and retrieves Ticket ID H34PTD1 and Purchase Confirmation Number H34PTD2 therefrom (S3), which are displayed on LCD 201 (FIG. 1) (S4).

This paragraph [0549] illustrates Purchased Ticket Data Transferring Software 20634c6 stored in Ticket Purchasing Software Storage Area 20634c (paragraph [0532]) of Communication Device 200 to send the purchased ticket data to another device. CPU 211 (FIG. 1) retrieves a list of devices capable to receive the purchased ticket data from Device List Data Storage Area 20634b3 (paragraph [0530]) (S1), which is displayed on LCD 201 (FIG. 1) (S2). A particular device is selected by utilizing Input Device 210 (FIG. 1) or via voice recognition system (S3). CPU 211 then retrieves Purchased Ticket Data H34PTD from Purchased Ticket Data Storage Area 20634b2 (paragraph [0530]) (S4), and sends the data to the device selected in S3. As another embodiment, Purchased Ticket Data H34PTD may be sent by e-mails.

For the avoidance of doubt, Purchased Ticket Data H34PTD (paragraph [0547]) does not necessarily include both Ticket ID H34PTD1 and Purchase Confirmation Number H34PTD2, i.e., the data may include only either Ticket ID H34PTD1 or Purchase Confirmation Number H34PTD2.

<<Remote Data Erasing Function>>

Paragraph [0553] through paragraph [0576] illustrate the remote data erasing function which enables Host H (paragraph [0276]) to erase a portion or all data stored in RAM 206 (FIG. 1) of Communication Device 200.

This paragraph [0553] illustrates the information stored in RAM 206 (FIG. 1) of Communication Device 200. RAM 206 includes Remote Data Erasing Information Storage Area 20635a of which the data and software programs stored therein are described in paragraph [0555].

The data and/or the software programs stored in Remote Data Erasing Information Storage Area 20635a (paragraph [0553]) may be downloaded from Host H (paragraph [0276]) in the manner described in paragraph [0592] through paragraph [0598].

This paragraph [0555] illustrates the storage areas included in Remote Data Erasing Information Storage Area 20635a (paragraph [0553]). Remote Data Erasing Information Storage Area 20635a includes Remote Data Erasing Data Storage Area 20635b and Remote Data Erasing Software Storage Area 20635c. Remote Data Erasing Data Storage Area 20635b stores the data necessary to implement the present function on the side of Communication Device 200, such as the ones described in paragraph [0556]. Remote Data Erasing Software Storage Area 20635c stores the software programs necessary to implement the present function on the side of Communication Device 200, such as the ones described in paragraph [0563], paragraph [0564], paragraph [0569], paragraph [0571], paragraph [0574], and paragraph [0575].

This paragraph [0556] illustrates the storage areas included in Remote Data Erasing Data Storage Area 20635b (paragraph [0555]). Remote Data Erasing Data Storage Area 20635b includes Storage Area Data Storage Area 20635b1 and To-Be-Erased Storage Area Data Storage Area 20635b2. Storage Area Data Storage Area 20635b1 stores the storage area data which represents the structure of the storage areas (i.e., the directory) including the identifications of the data (including software programs and other types of information) stored in each storage area (i.e., each directory) of RAM 206 (FIG. 1). To-Be-Erased Storage Area Data Storage Area 20635b2 stores the to-be-erased storage area data which represents the storage areas (i.e., the directories) to be erased by utilizing the present function.

This paragraph [0557] illustrates the storage areas included in Remote Data Erasing Software Storage Area 20635c (paragraph [0555]). Remote Data Erasing Software Storage Area 20635c (paragraph [0555]) includes Storage Area Selecting Software 20635c1, To-Be-Erased Storage Area Data Sending Software 20635c2, and Storage Area Erasing Software 20635c3. Storage Area Selecting Software 20635c1 is a software program described in paragraph [0563]. To-Be-Erased Storage Area Data Sending Software 20635c2 is a software program described in paragraph [0564]. Storage Area Erasing Software 20635c3 is a software program described in paragraph [0569].

This paragraph [0558] illustrates the storage area included in Host Information Storage Area H00a of Host H (paragraph [0276]). Host Information Storage Area H00a includes Remote Data Erasing Information Storage Area H35a of which the data and software program stored therein are described in paragraph [0559].

This paragraph [0559] illustrates the storage areas included in Remote Data Erasing Information Storage Area H35a (paragraph [0558]). Remote Data Erasing Information Storage Area H35a includes Remote Data Erasing Data Storage Area H35b and Remote Software Erasing Software Storage Area H35c. Remote Data Erasing Data Storage Area H35b stores the data necessary to implement the present function on the side of Host H (paragraph [0276]), such as the ones described in paragraph [0560] and paragraph [0561]. Remote Software Erasing Software Storage Area H35c stores the software programs necessary to implement the present function on the side of Host H, such as the ones described in paragraph [0562].

This paragraph [0560] illustrates the storage area included in Remote Data Erasing Data Storage Area H35b (paragraph [0559]). Remote Data Erasing Data Storage Area H35b includes To-Be-Erased Storage Area Data Storage Area H35b1 of which the data stored therein are described in paragraph [0561].

This paragraph [0561] illustrates the data stored in To-Be-Erased Storage Area Data Storage Area H35b1 (paragraph [0560]). To-Be-Erased Storage Area Data Storage Area H35b1 is comprised of two columns, i.e., 'User ID' and 'To-Be-Erased Storage Area Data'. Column 'User ID' stores the identifications of the users of Communication Device 200. Column 'To-Be-Erased Storage Area Data' stores the to-be-erased storage area data of Communication Device 200 of the corresponding 'User ID'. Here, the to-be-erased storage area data represents the storage areas (i.e., the directories) of Communication Device 200 to be erased by utilizing the present function. The default data stored in To-Be-Erased Storage Area Data Storage Area H35b1 is 'Null'. The 'User ID' H35b1a of which the 'To-Be-Erased Storage Area Data' is 20635TBE1; the 'User ID' H35b1b of which the 'To-Be-Erased Storage Area Data' is Null; and the 'User ID' H35b1c of which the 'To-Be-Erased Storage Area Data' is 'Null' are stored in To-Be-Erased Storage Area Data Storage Area H35b1.

This paragraph [0562] illustrates the software programs stored in Remote Data Erasing Software Storage Area H35c (paragraph [0555]). Remote Data Erasing Software Storage Area H35c stores To-Be-Erased Storage Area Data Receiving Software H35c1, Selected Storage Area Erasing Software H35c2, and Storage Area Selecting Software H35c3. To-Be-Erased Storage Area Data Receiving Software H35c1 is described in paragraph [0566]. Selected Storage Area Erasing Software H35c2 is described in paragraph [0567]. Storage Area Selecting Software H35c3 is described in paragraph [0576].

This paragraph [0563] illustrates Storage Area Selecting Software 20635c1 stored in Remote Data Erasing Software Storage Area 20635c (paragraph [0557]) of Communication Device 200 which selects the storage areas to be erased by utilizing the present function. CPU 211 (FIG. 1) retrieves the storage area data which represents the structure of the storage areas (i.e., the directory) including the identifications of the data (including software programs and other types of information) stored in each storage area (i.e., each directory) of RAM 206 (FIG. 1) from Storage Area Data Storage Area 20635b1 (paragraph [0556]) (S1), and displays a list of the storage areas on LCD 201 (FIG. 1) (S2). A particular storage area to be erased by utilizing the present function is selected by utilizing Input Device 210 (FIG. 1) or via voice recognition system (S3). CPU 211 then stores the identifications of the storage areas selected in S2 as the to-be-erased storage area data to To-Be-Erased Storage Area Data Storage Area 20635b2 (paragraph [0556]) (S4).

This paragraph [0564] illustrates To-Be-Erased Storage Area Data Sending Software 20635c2 stored in Remote Data Erasing Software Storage Area 20635c (paragraph [0557]) which sends the to-be-erased storage area data to Host H (paragraph [0276]). CPU 211 (FIG. 1) retrieves the to-be-erased storage area data from To-Be-Erased Storage Area Data Storage Area 20635$b$2 (paragraph [0556]) (S1) and sends To-Be-Erased Storage Area Data 20635TBE to Host H of which the data included therein are described in paragraph [0565] (S2).

This paragraph [0565] illustrates the data included in To-Be-Erased Storage Area Data 20635TBE described in S2 of paragraph [0564]. To-Be-Erased Storage Area Data 20635TBE includes To-Be-Erased Storage Area Data 20635TBE1 and User ID 20635TBE2. To-Be-Erased Storage Area Data 20635TBE1 is the data retrieved in S1 of paragraph [0564]. User ID 20635TBE2 is the identification of the user of Communication Device 200.

This paragraph [0566] illustrates To-Be-Erased Storage Area Data Receiving Software H35$c$1 stored in Remote Data Erasing Software Storage Area H35$c$ (paragraph [0562]) of Host H (paragraph [0276]) which receives the to-be-erased storage area data sent from Communication Device 200. Host H receives To-Be-Erased Storage Area Data 20635TBE sent from Communication Device 200 (S1). Host H then retrieves To-Be-Erased Storage Area Data 20635TBE1 and User ID 20635TBE2 therefrom (S2), and stores To-Be-Erased Storage Area Data 20635TBE1 in To-Be-Erased Storage Area Data Storage Area H35$b$1 (paragraph [0561]) (S3). In the example described in paragraph [0561], To-Be-Erased Storage Area Data 20635TBE1 is stored in column 'To-Be-Erased Storage Area Data' corresponding to the 'User ID' H35$b$1$a$.

This paragraph [0567] illustrates Selected Storage Area Erasing Software H35$c$2 stored in Remote Data Erasing Software Storage Area H35$c$ (paragraph [0562]) of Host H (paragraph [0276]) which erases the selected storage areas of Communication Device 200. the input storage area erasing signal which indicates to initiate the process to erase the storage areas of Communication Device 200 is input to Host H (S1). Next, the user ID is input to Host H to identify the identification of Communication Device 200 (the user ID in the present example is 'H35$b$1$a$' as described in paragraph [0561]) (S2). Host H retrieves To-Be-Erased Storage Area Data 20635TBE1 from To-Be-Erased Storage Area Data Storage Area H35$b$1 (paragraph [0561]) (S3) and sends to Communication Device 200 Storage Area Erasing Command H35SAEC which is described in paragraph [0568] (S4).

This paragraph [0568] illustrates the data included in Storage Area Erasing Command H35SAEC (paragraph [0567]). Storage Area Erasing Command H35SAEC includes Storage Area Erasing Instruction H35SAEC1 and To-Be-Erased Storage Area Data H35SAEC2/User ID H35SAEC3. Storage Area Erasing Instruction H35SAEC1 is an instruction to erase the storage areas indicated in To-Be-Erased Storage Area Data H35SAEC2. To-Be-Erased Storage Area Data H35SAEC2 is the data indicating the storages areas erased by utilizing the present function. User ID H35SAEC3 is the identification of the user of Communication Device 200 to identify the device to which the present function is implemented.

This paragraph [0569] illustrates Storage Area Erasing Software 20635$c$3 stored in Remote Data Erasing Software Storage Area 20635$c$ (paragraph [0557]) of Communication Device 200 which erases the selected storage areas of RAM 206 (FIG. 1). CPU 211 (FIG. 1) of Communication Device 200 receives Storage Area Erasing Command H35SAEC from Host H (paragraph [0276]) (S1), and retrieves Storage Area Erasing Instruction H35SAEC1 (paragraph [0568]) therefrom (S2). In response to Storage Area Erasing Instruction H35SAEC1, CPU 211 retrieves To-Be-Erased Storage Area Data H35SAEC2 (S3), and erases the storage areas of RAM 206 in accordance with To-Be-Erased Storage Area Data H35SAEC2 (S4).

<<Remote Data Erasing Function—Other Embodiments>>

This paragraph [0571] illustrates another embodiment of Storage Area Erasing Software 20635$c$3 stored in Remote Data Erasing Software Storage Area 20635$c$ (paragraph [0557]) of Communication Device 200 when the user of Communication Device 200 has not selected the storage areas to be erased. Assuming that the user has not gone through the process described in paragraph [0563]. The data, in this case, stored in column 'To-Be-Erased Storage Area Data' of To-Be-Erased Storage Area Data Storage Area H35$b$1 is 'Null' as described in paragraph [0561]. CPU 211 (FIG. 1) of Communication Device 200 receives Storage Area Erasing Command H35SAEC from Host H (paragraph [0276]) (S1), and retrieves Storage Area Erasing Instruction H35SAEC1 (paragraph [0568]) therefrom (S2). In response to Storage Area Erasing Instruction H35SAEC1, CPU 211 retrieves To-Be-Erased Storage Area Data H35SAEC2 (S3). If the data included in To-Be-Erased Storage Area Data H35SAEC2 is 'Null' (S4), CPU 211 erases all storage areas as well as the data, software programs, and all types of information stored therein included in RAM 206 (FIG. 1) (S5).

Paragraph [0573] and paragraph [0574] illustrate another embodiment described in paragraph [0568] and paragraph [0569].

This paragraph [0573] illustrates another embodiment of Storage Area Erasing Command H35SAEC described in paragraph [0568]. Storage Area Erasing Command H35SAEC includes Storage Area Erasing Instruction H35SAEC1 and User ID H35SAEC3 while To-Be-Erased Storage Area Data H35SAEC2 is excluded in this embodiment compared to the data illustrated in paragraph [0568].

This paragraph [0574] illustrates another embodiment of Storage Area Erasing Software 20635$c$3 described in paragraph [0569] stored in Remote Data Erasing Software Storage Area 20635$c$ (paragraph [0557]) of Communication Device 200 which erases the storage areas of RAM 206 (FIG. 1). CPU 211 (FIG. 1) of Communication Device 200 receives Storage Area Erasing Command H35SAEC from Host H (paragraph [0276]) (S1), and retrieves Storage Area Erasing Instruction H35SAEC1 (paragraph [0573]) therefrom (S2). In response to Storage Area Erasing Instruction H35SAEC1, CPU 211 retrieves the to-be-erased storage area data from To-Be-Erased Storage Area Data Storage Area 20635$b$2 (paragraph [0556]) of Communication Device 200 (S3), and erases the storage areas of RAM 206 in accordance with the data retrieved in S3 (S4).

This paragraph [0575] illustrates another embodiment of Storage Area Erasing Software 20635$c$3 described in paragraph [0574] stored in Remote Data Erasing Software Storage Area 20635$c$ (paragraph [0557]) of Communication Device 200 which erases the storage areas of RAM 206 (FIG. 1). CPU 211 (FIG. 1) of Communication Device 200 receives Storage Area Erasing Command H35SAEC from Host H (paragraph [0276]) (S1), and retrieves Storage Area Erasing Instruction H35SAEC1 (paragraph [0573]) therefrom (S2). In response to Storage Area Erasing Instruction H35SAEC1, CPU 211 retrieves the to-be-erased storage area data from To-Be-Erased Storage Area Data Storage Area 20635$b$2 (paragraph [0556]) of Communication Device 200 (S3). If the data included in the to-be-erased storage area data is 'Null' (S4), CPU 211 erases all storage areas as well as the data, software programs, and all types of information stored therein included in RAM 206 (FIG. 1) (S5).

This paragraph [0576] illustrates Storage Area Selecting Software H35c3 (paragraph [0562]) of Host H (paragraph [0276]) which remotely erases the storage areas of RAM 206 (FIG. 1). Host H accesses RAM 206 of Communication Device 200 and retrieves the storage area data from Storage Area Data Storage Area 20635b1 (paragraph [0556]) (S1). A list of the storage areas of RAM 206 (FIG. 1) is displayed on the monitor of Host H (S2). The operator of Host H selects the storage areas to be erased (S3). The data selected in S3 is stored as the to-be-erased storage area data in To-Be-Erased Storage Area Data Storage Area H35b1 (S4). The description of paragraph follows thereafter.

<<Game Vibrating Function>>

Paragraph [0579] through paragraph [0581] illustrate the game vibrating function which vibrates Communication Device 200 when a predetermined condition is met while Communication Device 200 is executing a video game software program.

This paragraph [0579] illustrates another embodiment of the software program described in paragraph [0200] stored in Game Software Storage Area 2061d (paragraph [0131]) to implement the shooting video game function (described in paragraph [0186] through paragraph [0200]). When hit program is initiated as described in S4 of paragraph [0199] (i.e., when User Controlled Object UCO (paragraph [0186]) is hit by CPU Fired Bullet CFB (paragraph [0186])), CPU 211 (FIG. 1), first of all, activates Vibrator 217 (FIG. 1) (S1). Then CPU 211 displays an explosion image on LCD 201 (FIG. 1) by reading the three-dimensional data of CPU Fired Bullet CFB from 3D Object Data Storage Area 2061e (paragraph [0131]) and by 'pasting' the relevant textures thereto stored in Texture Data Storage Area 2061f (paragraph [0131]) (S2). Next, CPU 211 erases the image of User Controlled Object UCO from LCD 201 (S3), and also the explosion image (S4), and CPU 211 deactivates Vibrator 217 thereafter (S5).

This paragraph [0580] illustrates another embodiment of the software program described in paragraph [0208] stored in Game Software Storage Area 2061d (paragraph [0131]) to implement the driving game function (paragraph [0203] through paragraph [0214]). CPU 211 (FIG. 1) performs the user controlled car process (S1), the CPU controlled car process for all CPU Controlled Car CCCs (paragraph [0203]) displayed on LCD 201 (FIG. 1) (S2), the street image process (S3), and the background image process (S4). The details of each process are explained in paragraph [0209] through paragraph [0212] respectively. Further, CPU 211 performs the vibrator controlling process which is described in paragraph [0581] (S5).

This paragraph [0581] illustrates the vibrator controlling process described in S5 of paragraph [0580]. CPU 211 (FIG. 1) periodically checks the position of User Controlled Car UCC (paragraph [0203]) (S1). If User Controlled Car UCC is off the street or driving on a street of a bad condition (S2), CPU 211 activates Vibrator 217 (FIG. 1) (S3). For purposes of implementing the present function to driving video game, CPU 211 periodically checks the position of User Controlled Car UCC. CPU 211 also periodically checks the street condition by retrieving the data regarding the street condition from Street Parameter Storage Area 2061g2 (paragraph [0206]).

<<Multiple Mode Implementing Function>>

Paragraph [0584] through paragraph [0589] illustrate the multiple mode implementing function of Communication Device 200 which enables to activate and implement a plurality of modes, functions, and/or systems described in this specification simultaneously.

This paragraph [0584] illustrates the software programs stored in RAM 206 (FIG. 1) to implement the multiple mode implementing function (FIG. 1). RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained in paragraph [0585]. Mode Selecting Software 20690d selects a certain amount or all modes, functions, and/or systems explained in this specification of which the sequence is explained in paragraph [0586]. Mode Activating Software 20690e activates a certain amount or all modes, functions, and/or systems selected by the Mode Selecting Software 20690d of which the sequence is explained in paragraph [0587]. Mode Implementation Repeater 20690f executes Multiple Mode Implementer 20690b which reactivates Mode List Displaying Software 20690c, Mode Selecting Software 20690d, Mode Activating Software 20690e of which the sequence is explained in paragraph [0588].

This paragraph [0585] illustrates the sequence of Mode List Displaying Software 20690c (paragraph [0584]). CPU 211 (FIG. 1), under the command of Mode List Displaying Software 20690c, displays a list of a certain amount or all modes, functions, and/or systems described in this specification on LCD 201 (FIG. 1).

This paragraph [0586] illustrates the sequence of Mode Selecting Software 20690d (paragraph [0584]). The user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph [0587] illustrates the sequence of Mode Activating Software 20690e (paragraph [0584]). CPU 211 (FIG. 1), under the command of Mode Activating Software 20690e, activates the mode, function, or, system selected in S2 of paragraph [0586]. CPU 211 thereafter implements the activated mode, function, or system as described in the relevant section of this specification.

This paragraph [0588] illustrates the sequence of Mode Implementation Repeater 20690f (paragraph [0584]). The user of Communication Device 200 inputs an input signal by utilizing Input Device 210 (FIG. 1) or via voice recognition system (S1). Once the activation of the selected mode, function, or system described in paragraph [0587] hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690*b* (paragraph [0584]), which reactivates Mode List Displaying Software 20690*c* (paragraph [0584]), Mode Selecting Software 20690*d* (paragraph [0584]), and Mode Activating Software 20690*e* (paragraph [0584]) to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690*b*, Mode List Displaying Software 20690*c*, Mode Selecting Software 20690*d*, Mode Activating Software 20690*e*, and Mode Implementation Repeater 20690*f* described in paragraph [0584] may be integrated into one software program, Multiple Mode Implementer 20690*b*. CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant section of this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Multiple Software Download Function>>

Paragraph [0592] through paragraph [0598] illustrate the multiple software download function which enables Communication Device 200 to download a plurality of software programs simultaneously. All software programs, data, any types of information to implement all modes, functions, and systems described in this specification are stored in a host or server from which Communication Device 200 can download.

This paragraph [0592] illustrates the software programs stored in RAM 206 (FIG. 1). RAM 206 includes Multiple Software Download Controller Storage Area 20691*a*. Multiple Software Download Controller Storage Area 20691*a* includes Multiple Software Download Controller 20691*b*, Download Software List Displaying Software 20691*c*, Download Software Selector 20691*d*, Download Software Storage Area Selector 20691*e*, Download Implementer 20691*f*, and Download Repeater 20691*g*. Multiple Software Download Controller 20691*b* administers the overall implementation of the present function. One of the major tasks of Multiple Software Download Controller 20691*b* is to administer and control the timing and sequence of Download Software List Displaying Software 20691*c*, Download Software Selector 20691*d*, Download Software Storage Area Selector 20691*e*, Download Implementer 20691*f*, and Download Repeater 20691*g*. For example, Multiple Software Download Controller 20691*b* executes them in the following order: Download Software List Displaying Software 20691*c*, Download Software Selector 20691*d*, Download Software Storage Area Selector 20691*e*, Download Implementer 20691*f*, and Download Repeater 20691*g*. Download Software List Displaying Software 20691*c* displays on LCD 201 (FIG. 1) a list of a certain amount or all software programs necessary to implement the modes, functions, and/or systems explained in this specification of which the sequence is explained in paragraph [0593] hereinafter. Download Software Selector 20691*d* selects one of the software programs displayed on LCD 201 of which the sequence is explained in paragraph [0594] hereinafter. Download Software Storage Area Selector 20691*e* selects the storage area in RAM 206 where the downloaded software program is stored of which the sequence is explained in paragraph [0595] hereinafter. Download Implementer 20691*f* implements the download process of the software program selected by Download Software Selector 20691*d* hereinbefore and stores the software program in the storage area selected by Download Software Storage Area Selector 20691*e* hereinbefore of which the sequence is explained in paragraph [0596] hereinafter. Download Repeater 20691*g* executes Multiple Software Download Controller 20691*b* which reactivates Download Software List Displaying Software 20691*c*, Download Software Selector 20691*d*, Download Software Storage Area Selector 20691*e*, and Download Implementer 20691*f* of which the sequence is explained in paragraph [0596] hereinafter.

This paragraph [0593] illustrates the sequence of Download Software List Displaying Software 20691*c* (paragraph [0592]). CPU 211 (FIG. 1), under the command of Download Software List Displaying Software 20691*c*, displays a list of a certain amount or all software programs to implement all modes, functions, and systems described in this specification on LCD 201 (FIG. 1).

This paragraph [0594] illustrates the sequence of Download Software Selector 20691*d* (paragraph [0592]). The user of Communication Device 200 inputs an input signal by utilizing Input Device 210 (FIG. 1) or via voice recognition system identifying one of the software programs displayed on LCD 201 (FIG. 1) (S1), and CPU 211, under the command of Download Software Selector 20691*d*, interprets the input signal and selects the corresponding software program (S2).

This paragraph [0595] illustrates the sequence of Download Software Storage Area Selector 20691*e* (paragraph [0592]). CPU 211 (FIG. 1), under the command of Download Software Storage Area Selector 20691*e*, selects a specific storage area in RAM 206 (FIG. 1) where the downloaded software program is to be stored. The selection of the specific storage area in RAM 206 may be done automatically by CPU 211 or manually by the user of Communication Device 200 by utilizing Input Device 210 (FIG. 1) or via voice recognition system.

This paragraph [0596] illustrates the sequence of Download Implementer 20691*f* (paragraph [0592]). CPU 211 (FIG. 1), under the command of Download Implementer 20691*f*, implements the download process of the software program selected by Download Software Selector 20691*d* (paragraph [0594]) and stores the software program in the storage area selected by Download Software Storage Area Selector 20691*e* (paragraph [0595]).

This paragraph [0597] illustrates the sequence of Download Repeater 20691*g* (paragraph [0592]). The user of Communication Device 200 inputs an input signal by utilizing Input Device 210 (FIG. 1) or via voice recognition system when the downloading process of the software program is completed (S1). If the input signal indicates to repeat the process to download another software program, CPU 211 (FIG. 1), under the command of Download Repeater 20691*g*, executes Multiple Software Download Controller 20691*b* (paragraph [0592]), which reactivates Download Software List Displaying Software 20691*c* (paragraph [0592]), Download Software Selector 20691*d* (paragraph [0592]), Download Software Storage Area Selector 20691*e* (paragraph [0592]), and Download Implementer 20691*f* (paragraph [0592]) to download the second software program while the downloading process of the first software program is still in progress by utilizing the method so-called 'time sharing' (S3). Download Software List Displaying Software 20691*c*, Download Software Selector 20691*d*, Download Software Storage Area Selector 20691*e*, and Download Implementer 20691*f* can be repeatedly executed until all software programs displayed on LCD 201 (FIG. 1) are selected and downloaded. The downloading process is not repeated if the input signal explained in S2 so indicates.

As another embodiment, as described in this paragraph [0598], Multiple Software Download Controller 20691*b*, Download Software List Displaying Software 20691*c*, Download Software Selector 20691*d*, Download Software Storage Area Selector 20691*e*, Download Implementer 20691*f*, and Download Repeater 20691*g* may be integrated into a single software program, Multiple Software Download Controller 20691*b*. First of all, CPU 211 (FIG. 1) displays a list of all software programs downloadable from a host or server on LCD 201 (FIG. 1) (S1). The user of Communication Device 200 inputs an input signal by utilizing Input Device 210 (FIG. 1) or via voice recognition system identifying one of the software programs displayed on LCD 201 (S2), and CPU 211 interprets the input signal and selects the corresponding software program (S3) and selects the storage area in RAM 206 (FIG. 1) where the downloaded software program is to be stored (S4). The selection of the specific storage area in RAM 206 may be done automatically by CPU 211 or manually by the user of Communication Device 200 by utilizing Input Device 210 (FIG. 1) or via voice recognition system. CPU 211 then implements the download process of the software program selected in S3 and stores the software program in the storage area selected in S4 (S5). The user of Communication Device 200 inputs an input signal by utilizing Input Device 210 or via voice recognition system when the activation of downloading process of the software program described in S5 is completed (S6). If the input signal indicates to repeat the process to download another software program, CPU 211 repeats the steps of S1 through S5 to download the second software program while the downloading process of the first software program is still in progress by utilizing the method so-called 'time sharing' (S7). The steps of S1 through S5 can be repeated until all software programs displayed on LCD 201 are selected and downloaded. The downloading process is not repeated if the input signal explained in S6 so indicates.

For the avoidance of doubt, paragraph [0592] through paragraph [0598] are also applicable to download data and any types of information other than software programs.

<<Incorporation by Reference>>

The following paragraphs and drawings described in U.S. Ser. No. 10/708,285, filed 2004 Feb. 23, are incorporated to this application by reference: the preamble described in paragraph (no drawings); Communication Device 200 (Voice Communication Mode) described in paragraphs [0885] through [0890] (FIGS. 1 through 2*c*); Voice Recognition System described in paragraphs [0891] through [0923] (FIGS. 3 through 19); Positioning System described in paragraphs through [0955] (FIGS. 20*a* through 32*e*); Auto Backup System described in paragraphs through [0965] (FIGS. 33 through 37); Signal Amplifier described in paragraphs [0966] through [0971] (FIG. 38); Audio/Video Data Capturing System described in paragraphs [0972] through [0984] (FIGS. 39 through 44*b*); Digital Mirror Function (1) described in paragraphs [0985] through [0993] (FIGS. 44*c* through 44*e*); Caller ID System described in paragraphs [0994] through (FIGS. 45 through 47); Stock Purchasing Function described in paragraphs [1002] through (FIGS. 48 through 52); Timer Email Function described in paragraphs [1012] through [1018] (FIGS. 53*a* and 53*b*); Call Blocking Function described in paragraphs [1019] through [1032] (FIGS. 54 through 59); Online Payment Function described in paragraphs [1033] through [1042] (FIGS. 60 through 64); Navigation System described in paragraphs [1043] through [1065] (FIGS. 65 through 74*a*); Remote Controlling System described in paragraphs [1066] through [1084] (FIGS. 75 through 85); Auto Emergency Calling System described in paragraphs [1085] through [1093] (FIGS. 86 and 87); Cellular TV Function described in paragraphs [1094] through [1178] (FIGS. 88 through 135); 3D Video Game Function described in paragraphs [1179] through [1191] (FIGS. 136 through 144); Digital Mirror Function (2) described in paragraphs [1192] through [1201] (FIGS. 145 through 155); Voice Recognition Sys—E-mail (2) described in paragraphs [1202] through [1210] (FIGS. 156 through 160); Positioning System—GPS Search Engine described in paragraphs [1211] through (FIGS. 161 through 182); Mobile Ignition Key Function described in paragraphs [1254] through [1276] (FIGS. 183 through 201); Voice Print Authentication System described in paragraphs [1277] through [1287] (FIGS. 202 through 211); Fingerprint Authentication System described in paragraphs [1288] through [1300] (FIGS. 212 through 221); Auto Time Adjust Function described in paragraphs [1301] through [1305] (FIGS. 222 through 224); Video/Photo Mode described in paragraphs [1306] through [1334] (FIGS. 225 through 242); Call Taxi Function described in paragraphs [1335] through [1375] (FIGS. 243 through 269); Shooting Video Game Function described in paragraphs [1376] through [1392] (FIGS. 270 through 283); Driving Video Game Function described in paragraphs [1393] through [1406] (FIGS. 284 through 294); Address Book Updating Function described in paragraphs [1407] through [1427] (FIGS. 295 through 312); Batch Address Book Updating Function—With Host described in paragraphs [1428] through (FIGS. 313 through 329); Batch Address Book Updating Function—Peer-To-Peer Connection described in paragraphs [1450] through [1454] (FIGS. 329a through 329c); Batch Scheduler Updating Function—With Host described in paragraphs [1455] through [1478] (FIGS. 330 through 350); Batch Scheduler Updating Function—Peer-To-Peer Connection described in paragraphs [1479] through [1483] (FIGS. 351 and 352); Calculator Function described in paragraphs through [1489] (FIGS. 353 through 356); Spreadsheet Function described in paragraphs through [1497] (FIGS. 357 through 360); Word Processing Function described in paragraphs through [1513] (FIGS. 361 through 373); TV Remote Controller Function described in paragraphs [1514] through [1536] (FIGS. 374 through 394); CD/PC Inter-communicating Function described in paragraphs [1537] through [1561] (FIGS. 413 through 427); PDWR Sound Selecting Function described in paragraphs [1562] through [1598] (FIGS. 428 through 456); Start Up Software Function described in paragraphs [1599] through [1615] (FIGS. 457 through 466); Another Embodiment Of Communication Device 200 described in paragraphs [1616] through [1620] (FIGS. 467a through 467d); Stereo Audio Data Output Function described in paragraphs [1621] through (FIGS. 468 through 479); Stereo Visual Data Output Function described in paragraphs through [1660] (FIGS. 480 through 491); Multiple Signal Processing Function described in paragraphs [1661] through [1733] (FIGS. 492 through 529); Positioning System—Pin-pointing Function described in paragraphs [1734] through [1767] (FIGS. 530 through 553); Artificial Satellite Host described in paragraphs [1768] through [1786] (FIGS. 554 through 567); CCD Bar Code Reader Function described in paragraphs [1787] through [1808] (FIGS. 568 through 579); Online Renting Function described in paragraphs [1809] through [1886] (FIGS. 580 through 633); SOS Calling Function described in paragraphs [1887] through [1907] (FIGS. 634 through 645); Input Device described in paragraphs [1908] through [1913] (FIGS. 646 through 650); PC Remote Controlling Function described in paragraphs [1914] through [1949] (FIGS. 651 through 670); PC Remote Downloading Function described in paragraphs [1950] through [1999] (FIGS. 671 through 701); Audiovisual Playback Function described in paragraphs [2000] through [2025] (FIGS. 702 through 716); Audio Playback Function described in paragraphs [2026] through [2050] (FIGS. 717 through 731); Ticket Purchasing Function described in paragraphs [2051] through [2080] (FIGS. 732 through 753); Remote Data Erasing Function described in paragraphs [2081] through [2110] (FIGS. 754 through 774); Business Card Function described in paragraphs [2111] through [2127] (FIGS. 775 through 783); Game Vibrating Function described in paragraphs [2128] through [2138] (FIGS. 784 through 786); Multiple Mode Implementing Function described in paragraphs [2140] through [2147] (FIGS. 395 through 400); Multiple Software Download Function described in paragraphs [2148] through [2157] (FIGS. 401 through 407); Selected Software Distributing Function described in (FIGS. 1376 through 1393d); Multiple Software Download And Mode Implementation Function described in paragraphs [2158] through [2165] (FIGS. 408 through 412); and the last sentence described in paragraph [2167] (no drawings).

Having thus described a presently preferred embodiment of the present invention, it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. For the avoidance of doubt, the applicant has no intent to surrender any equivalent of any element included in the claims by any amendment of the claims unless expressly and unambiguously stated otherwise in the amendment.

The invention claimed is:

1. A video game device, which is a device operable to implement video game and phone communication, comprising:
    an input device;
    a display;
    a three-dimensional game space generator;
    a game object locator;
    a game object entering detector; and
    a game vibrator;
    wherein said three-dimensional game space generator produces a three-dimensional game space which is a computer-generated three-dimensional space;
    wherein said game object locator locates multiple game objects in said three-dimensional game space, wherein said multiple game objects include a user controlled game object which is a three-dimensional game object controlled by the user and a certain two-dimensional area which is a two-dimensional game object controlled by said game device;
    wherein said game object entering detector identifies whether said user controlled game object moving within said three-dimensional game space enters said certain two-dimensional area located within said three-dimensional game space by identifying the locations of said user controlled game object and said certain two-dimensional area in said three-dimensional game space;
    wherein said game object entering detector activates said game vibrator when said game object entering detector identifies that said user controlled game object enters said certain two-dimensional area by identifying the locations of said user controlled game object and said certain two-dimensional area in said three-dimensional game space; and
    wherein when said video game device detects a phone call, said game object entering detector activates said game vibrator and generates a specific pattern of vibration where said specific pattern is determined by said video game device.

2. A system comprising:
    a video game device, which is a device operable to implement video game and phone communication, comprising an input device, a display, and a game vibrator;
    a three-dimensional game space generator;
    a game object locator;
    a game object entering detector; and
    wherein said three-dimensional game space generator produces a three-dimensional game space which is a computer-generated three-dimensional space;
    wherein said game object locator locates multiple game objects in said three-dimensional game space, wherein said multiple game objects include a user controlled game object which is a three-dimensional game object controlled by the user and a certain two-dimensional area which is a two-dimensional game object controlled by said game device;

wherein said game object entering detector identifies whether said user controlled game object moving within said three-dimensional game space enters said certain two-dimensional area located within said three-dimensional game space by identifying the locations of said user controlled game object and said certain two-dimensional area in said three-dimensional game space;

wherein said game object entering detector activates said game vibrator when said game object entering detector identifies that said user controlled game object enters said certain two-dimensional area by identifying the locations of said user controlled game object and said certain two-dimensional area in said three-dimensional game space; and wherein when said video game device detects a phone call, said game object entering detector activates said game vibrator and generates a specific pattern of vibration where said specific pattern is determined by said video game device.

3. A method for a video game device, which is a device operable to implement video game and phone communication, comprising an input device, a display, and a game vibrator, said method comprising:

a three-dimensional game space generating step, wherein a three-dimensional game space which is a computer-generated three-dimensional space is produced;

a game object locating step, wherein multiple game objects are located in said three-dimensional game space, wherein said multiple game objects include a user controlled game object which is a three-dimensional game object controlled by the user and a certain two-dimensional area which is a two-dimensional game object controlled by said game device; and a game object enter detecting step, wherein whether said user controlled game object moving within said three-dimensional game space is identified to be entering said certain two-dimensional area located within said three-dimensional game space by identifying the locations of said user controlled game object and said certain two-dimensional area in said three-dimensional game space;

wherein said game vibrator is activated when said user controlled game object is identified to be entering said certain two-dimensional area by identifying the locations of said user controlled game object and said certain two-dimensional area in said three-dimensional game space; and wherein when said video game device detects a phone call, said game vibrator is activated and generates a specific pattern of vibration where said specific pattern is determined by said video game device.

* * * * *